US012627916B2

(12) United States Patent
Yuan et al.

(10) Patent No.: US 12,627,916 B2
(45) Date of Patent: *May 12, 2026

(54) VIBRATION SENSOR

(71) Applicant: SHENZHEN SHOKZ CO., LTD., Shenzhen (CN)

(72) Inventors: Yongshuai Yuan, Shenzhen (CN); Wenjun Deng, Shenzhen (CN); Yujia Huang, Shenzhen (CN); Wenbing Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 206 days.

This patent is subject to a terminal disclaimer.

(21) Appl. No.: 18/351,489

(22) Filed: Jul. 12, 2023

(65) Prior Publication Data

US 2023/0362525 A1 Nov. 9, 2023

Related U.S. Application Data

(63) Continuation of application No. PCT/CN2021/138440, filed on Dec. 15, 2021.

(30) Foreign Application Priority Data

Jun. 18, 2021 (CN) ......................... 202110677119.2
Jul. 16, 2021 (WO) ................ PCT/CN2021/106947
(Continued)

(51) Int. Cl.
*H04R 1/08* (2006.01)
*H04R 1/02* (2006.01)
(Continued)

(52) U.S. Cl.
CPC ............. *H04R 1/083* (2013.01); *H04R 1/021* (2013.01); *H04R 7/26* (2013.01); *H04R 21/028* (2013.01)

(58) Field of Classification Search
CPC .......... H04R 1/083; H04R 1/021; H04R 7/26; H04R 21/028
See application file for complete search history.

(56) References Cited

U.S. PATENT DOCUMENTS 4,012,604 A 3/1977 Speidel
4,211,898 A 7/1980 Atoji et al.
(Continued)

FOREIGN PATENT DOCUMENTS

CN 104300831 A 1/2015
CN 104374498 A 2/2015
(Continued)

OTHER PUBLICATIONS

International Search Report in PCT/CN2021/138440 mailed on Mar. 9, 2022, 7 pages.
(Continued)

*Primary Examiner* — Carolyn R Edwards
*Assistant Examiner* — Dylan Maguire Neece
(74) *Attorney, Agent, or Firm* — METIS IP LLC

(57) ABSTRACT

The present disclosure provides a vibration sensor including a vibration assembly including a mass element and an elastic element, a first acoustic chamber, an acoustic transducer, and a buffer member. In response to an external vibration signal, the vibration assembly vibrates such that a volume of the first acoustic chamber changes. The acoustic transducer is in communication with the first acoustic chamber. In response to a volume change of the first acoustic chamber, the acoustic transducer may generate an electrical signal. The buffer member is connected to the mass element or the
(Continued)

2900 elastic element. The buffer member reduces an impact force of the mass element acting on the elastic element during a vibration process of the vibration assembly. The acoustic transducer has a first resonance frequency, the vibration assembly has a second resonance frequency, and the second resonance frequency is less than the first resonance frequency.

20 Claims, 40 Drawing Sheets

(30) Foreign Application Priority Data

| | | |
|---|---|---|
| Aug. 11, 2021 | (CN) | 202110917789.7 |
| Aug. 11, 2021 | (WO) | PCT/CN2021/112014 |
| Aug. 11, 2021 | (WO) | PCT/CN2021/112017 |
| Aug. 19, 2021 | (WO) | PCT/CN2021/113419 |

(51) Int. Cl.

*H04R 7/26* (2006.01)
*H04R 21/02* (2006.01)

(56) References Cited

U.S. PATENT DOCUMENTS

| | | | | |
|---|---|---|---|---|
| 4,596,903 | A | 6/1986 | Yoshizawa | |
| 4,885,781 | A | 12/1989 | Seidel | |
| 5,146,435 | A | 9/1992 | Bernstein | |
| 5,533,381 | A | 7/1996 | Seale | |
| 5,852,229 | A | 12/1998 | Josse et al. | |
| 5,940,347 | A | 8/1999 | Raida et al. | |
| 6,408,496 | B1 * | 6/2002 | Maynard | H04R 23/00 29/25.35 |
| 8,599,025 | B2 | 12/2013 | Cipriano | |
| 9,433,357 | B2 | 9/2016 | Yuen et al. | |
| 9,661,411 | B1 | 5/2017 | Han et al. | |
| 10,141,007 | B1 | 11/2018 | Kim et al. | |
| 10,527,484 | B2 | 1/2020 | Bottomly | |
| 10,722,405 | B2 | 7/2020 | Pepin et al. | |
| 11,601,073 | B2 | 3/2023 | Karami et al. | |
| 11,662,248 | B2 | 5/2023 | Yuan et al. | |
| 11,698,292 | B2 | 7/2023 | Deng et al. | |
| 2002/0124656 | A1 | 9/2002 | McIntosh | |
| 2004/0140415 | A1 | 7/2004 | Watson | |
| 2006/0219016 | A1 | 10/2006 | Wang et al. | |
| 2009/0085442 | A1 | 4/2009 | Kozinsky et al. | |
| 2009/0211838 | A1 | 8/2009 | Bilan | |
| 2010/0089665 | A1 | 4/2010 | Tanaka | |
| 2011/0235841 | A1 | 9/2011 | Tanaka et al. | |
| 2011/0266919 | A1 | 11/2011 | Ikehara et al. | |
| 2013/0301856 | A1 | 11/2013 | Kim et al. | |
| 2014/0028459 | A1 | 1/2014 | Solomon | |
| 2014/0119577 | A1 | 5/2014 | Gao et al. | |
| 2014/0233756 | A1 | 8/2014 | Inoda | |
| 2015/0016656 | A1 | 1/2015 | Chen et al. | |
| 2015/0276529 | A1 | 10/2015 | Wiesbauer et al. | |
| 2015/0350792 | A1 | 12/2015 | Grosh et al. | |
| 2015/0377693 | A1 | 12/2015 | Rose | |
| 2016/0069734 | A1 | 3/2016 | Harry, Jr. | |
| 2016/0316300 | A1 | 10/2016 | Qi et al. | |
| 2017/0006382 | A1 | 1/2017 | Luzzato et al. | |
| 2017/0156002 | A1 | 6/2017 | Han et al. | |
| 2018/0058915 | A1 | 3/2018 | Mögelin et al. | |
| 2018/0131347 | A1 | 5/2018 | Rhee et al. | |
| 2018/0160209 | A1 | 6/2018 | Ogata et al. | |
| 2019/0174244 | A1 | 6/2019 | Kim et al. | |
| 2019/0182597 | A1 | 6/2019 | Ko et al. | |
| 2019/0335271 | A1 | 10/2019 | Post et al. | |
| 2020/0281558 | A1 | 9/2020 | Bian et al. | |
| 2021/0160608 | A1 | 5/2021 | Zhang et al. | |
| 2021/0167275 | A1 | 6/2021 | Kim et al. | |
| 2021/0297788 | A1 | 9/2021 | Chou et al. | |
| 2021/0302227 | A1 | 9/2021 | Chen et al. | |
| 2021/0382085 | A1 | 12/2021 | Bretthauer et al. | |
| 2022/0127135 | A1 | 4/2022 | Mogelin et al. | |
| 2022/0345830 | A1 | 10/2022 | Banerjee et al. | |
| 2022/0386038 | A1 | 12/2022 | Du et al. | |
| 2022/0386039 | A1 | 12/2022 | Krajewski et al. | |
| 2023/0046902 | A1 | 2/2023 | Yuan et al. | |
| 2024/0377243 | A1 | 11/2024 | Yuan et al. | |

FOREIGN PATENT DOCUMENTS

| | | | | |
|---|---|---|---|---|
| CN | 104378724 | A | 2/2015 | |
| CN | 104602172 | A | 5/2015 | |
| CN | 105072551 | A | 11/2015 | |
| CN | 204887455 | U | 12/2015 | |
| CN | 205547358 | | 9/2016 | |
| CN | 106454651 | A | 2/2017 | |
| CN | 106954164 | A | 7/2017 | |
| CN | 106982399 | A | 7/2017 | |
| CN | 206728276 | U | 12/2017 | |
| CN | 108337617 | A | 7/2018 | |
| CN | 108471258 | A | 8/2018 | |
| CN | 109141696 | A | 1/2019 | |
| CN | 208434106 | U | 1/2019 | |
| CN | 110022045 | A | 7/2019 | |
| CN | 209314103 | U | * 8/2019 | |
| CN | 209526834 | U | 10/2019 | |
| CN | 209526837 | U | 10/2019 | |
| CN | 209526861 | U | 10/2019 | |
| CN | 209526879 | U | * 10/2019 | |
| CN | 209659621 | U | 11/2019 | |
| CN | 110536220 | A | 12/2019 | |
| CN | 110603818 | A | 12/2019 | |
| CN | 110603819 | A | * 12/2019 | H04R 19/04 |
| CN | 110631685 | A | 12/2019 | |
| CN | 110972045 | A | 4/2020 | |
| CN | 111131988 | A | 5/2020 | |
| CN | 210641073 | U | 5/2020 | |
| CN | 210958708 | U | 7/2020 | |
| CN | 111510834 | A | 8/2020 | |
| CN | 111741418 | A | 10/2020 | |
| CN | 111818409 | A | * 10/2020 | H04R 1/08 |
| CN | 111988717 | A | 11/2020 | |
| CN | 211930820 | U | 11/2020 | |
| CN | 211930871 | U | * 11/2020 | |
| CN | 212086490 | U | 12/2020 | |
| CN | 212572961 | U | 2/2021 | |
| CN | 112565995 | A | 3/2021 | |
| CN | 212785847 | U | 3/2021 | |
| CN | 112601169 | A | 4/2021 | |
| CN | 213186548 | U | 5/2021 | |
| CN | 213280084 | U | 5/2021 | |
| CN | 213342678 | U | 6/2021 | |
| CN | 216852329 | U | 6/2022 | |
| CN | 115706907 | A | 2/2023 | |
| DE | 102015217741 | A1 | 3/2017 | |
| EP | 1067513 | A1 | 1/2001 | |
| EP | 1748287 | A1 | 1/2007 | |
| EP | 2505003 | B1 | 1/2020 | |
| JP | H02155400 | A | 6/1990 | |
| JP | H07244168 | A | 9/1995 | |
| JP | H08195995 | A | 7/1996 | |
| JP | 2008150072 | A | 7/2008 | |
| RU | 198558 | U1 | 7/2020 | |
| TW | 201924468 | A | 6/2019 | |
| WO | 2007111405 | A1 | 10/2007 | |
| WO | 2020000594 | A1 | 1/2020 | |

OTHER PUBLICATIONS

Written Opinion in PCT/CN2021/138440 mailed on Mar. 9, 2022, 8 pages.
International Search Report in PCT/CN2021/106947 mailed on Apr. 13, 2022, 8 pages.
Written Opinion in PCT/CN2021/106947 mailed on Apr. 13, 2022, 9 pages.
International Search Report in PCT/CN2021/112014 mailed on Jan. 19, 2022, 8 pages.

(56) References Cited

OTHER PUBLICATIONS

Written Opinion in PCT/CN2021/112014 mailed on Jan. 19, 2022, 7 pages.
International Search Report in PCT/CN2021/112017 mailed on May 5, 2022, 7 pages.
Written Opinion in PCT/CN2021/112017 mailed on May 5, 2022, 8 pages.
International Search Report in PCT/CN2021/113419 mailed on Mar. 28, 2022, 8 pages.
Written Opinion in PCT/CN2021/113419 mailed on Mar. 28, 2022, 8 pages.
Office Action in Russian Application No. 2022121169 mailed on Mar. 10, 2023, 14 pages.
Notice of Rejection in Japanese Application No. 2022-559379 mailed on Oct. 23, 2023, 8 pages.
Notice of Rejection in Japanese Application No. 2022-559379 mailed on Feb. 13, 2024, 10 pages.
Notice of Preliminary Rejection in Korean Application No. 10-2022-7032951 mailed on Oct. 29, 2024, 12 pages.
First Office Action in Chinese Application No. 202110809269.4 mailed on May 23, 2025, 19 pages.
First Office Action in Chinese Application No. 202180012406.X mailed on Apr. 26, 2025, 29 pages.
Office Action in Russian Application No. 2022121511 mailed on Mar. 17, 2023, 22 pages.
Notice of Preliminary Rejection in Korean Application No. 10-2022-7033038 mailed on Apr. 30, 2024, 14 pages.
Communication Pursuant to Article 94(3) EPC in European Application No. 21921636.3 mailed on Mar. 24, 2025, 5 pages.
First Examination Report in Indian Application No. 202217044660 mailed on Oct. 10, 2025, 6 pages.
First Office Action in Chinese Application No. 202110751143.6 mailed on Mar. 20, 2025, 16 pages.
The Second Office Action in Chinese Application No. 202110751143.6 mailed on Jul. 10, 2025, 15 pages.
Ki Woong Seong et al., A Vibro-Acoustic Hybrid Implantable Microphone for Middle Ear Hearing Aids and Cochlear Implants, Sensors, 2019, 14 pages.
Fang, Huabin et al., Study of Micro Vibration Pickup Sensor Fabricated by MEMS Technique, Electronic Components & Materials, 25(7): 69-71, 2006.
Du, Yangbo, Main Factors Influencing Dynamic Loudspeaker Tone Quality, Audio Engineering, 41(9/10): 45-48, 2017.
Zhang, Qichang et al., Nonlinear in Vibration Energy Collection Application in The Field, Nonlinear Dynamics and Applications, Tianjin University Press, 2021, 10 Pages.
Zhou, Jianmin, Improving the Sensitivity of MEMS Microphones Design Method, Integrated Circuit Applications, 2014, 6 pages.
Wang, Hongbin et al., Appliance of the Senser Technology in the Yang-Stgle Fazzy Variable, Physical Experiment of College, 16(2): 52-54, 2003.
Sun, Quansheng, Capacitive MEMS Microphones with a Low-stress Ultra-thin Vibrating Membrane, Dissertation Submitted to Hangzhou Dianzi University for the Degree of Master, 2019, 65 pages.

* cited by examiner

500

2900

3300

VIBRATION SENSOR

CROSS-REFERENCE TO RELATED APPLICATIONS

This application is a continuation of International Application No. PCT/CN2021/138440, filed on Dec. 15, 2021, which claims priority to Chinese Patent Application No. 202110677119.2, filed on Jun. 18, 2021, International Application No. PCT/CN2021/106947, filed on Jul. 16, 2021, Chinese Patent Application No. 202110917789.7, filed on Aug. 11, 2021, International Application No. PCT/CN2021/112014, filed on Aug. 11, 2021, International Application No. PCT/CN2021/112017, filed on Aug. 11, 2021, and International Application No. PCT/CN2021/113419, filed on Aug. 19, 2021, the contents of each of which are hereby incorporated by reference.

TECHNICAL FIELD

The present disclosure relates to the acoustic field, and in particular, relates to a vibration sensor.

BACKGROUND

A vibration sensor is one of the commonly used vibration detection devices. The vibration sensor converts collected vibration signals into output electrical signals or other forms of information through its internal transducer member. Sensitivity can indicate a ratio of an output signal strength to an input signal strength of a sensor device. If the sensitivity is too small, it may affect the user experience. In order to improve the user experience, a mass of a vibration pickup member (such as a mass block) in the vibration sensor is usually set larger, so that a resonance peak of the vibration sensor moves to a low frequency to improve a low-frequency sensitivity of the vibration sensor. However, due to the larger mass of the mass block, the impact of the mass block on a diaphragm during a vibration process of the vibration pickup member is also relatively large, which is easy to damage the diaphragm and affects the reliability of the vibration sensor.

Thus, it is desirable to provide a vibration sensor that is able to improve the reliability of the vibration sensor.

SUMMARY

An aspect of the present disclosure provides a vibration sensor. The vibration sensor may include a vibration assembly including a mass element and an elastic element. The mass element may be connected to the elastic element. The vibration sensor may also include a first acoustic chamber. The elastic element may constitute one of sidewalls of the first acoustic chamber, and in response to an external vibration signal, the vibration assembly vibrates such that a volume of the first acoustic chamber changes. The vibration sensor may also include an acoustic transducer being in communication with the first acoustic chamber. In response to a volume change of the first acoustic chamber, the acoustic transducer may generate an electrical signal. The vibration sensor may further include a buffer member being connected to the mass element or the elastic element. The buffer member may reduce an impact force of the mass element acting on the elastic element during a vibration process of the vibration assembly. The acoustic transducer may have a first resonance frequency, the vibration assembly may have a second resonance frequency, and the second resonance frequency may be less than the first resonance frequency.

In some embodiments, at a frequency less than 1000 Hz, a sensitivity of the vibration assembly may be greater than or equal to −40 dB.

In some embodiments, the second resonance frequency may be 1 kHz~10 kHz less than the first resonance frequency.

In some embodiments, the vibration sensor may include a housing, and the housing may receive the external vibration signal and transmit the external vibration signal to the vibration assembly.

In some embodiments, the housing may form an acoustic chamber, and the vibration assembly may be located within the acoustic chamber and divide the acoustic chamber into the first acoustic chamber and a second acoustic chamber.

In some embodiments, the buffer member may include a buffer connection layer. The buffer connection layer may be arranged between the mass element and the elastic element, and the mass element may be fixed on the elastic element through the buffer member.

In some embodiments, the buffer connection layer may include an elastic connection sheet and an adhesive layer wrapped an outside of the elastic connection sheet.

In some embodiments, a Young's modulus of the buffer connection layer may be within a range of 0.01 MPa-100 MPa.

In some embodiments, the buffer member may include a buffer adhesive layer, and the buffer adhesive layer may be arranged on a region of the elastic element excluding a region corresponding to a projection region of the mass element along a vibration direction.

In some embodiments, the buffer adhesive layer and the mass element may be located at a same side and/or opposite sides of the elastic element.

In some embodiments, the vibration assembly further may include a supporting member arranged along a circumferential direction of the elastic element. An end of the supporting member may be connected to the elastic element, and another end of the supporting member may be connected to the housing or the acoustic transducer.

In some embodiments, the buffer member may include a first extension arm. The first extension arm may be arranged on a surface of the elastic element where the mass element is arranged, and the first extension arm and the mass element may be located at an inner side of the supporting member. An end of the first extension arm may be connected to the mass element, and the first extension arm may be arranged in a spiral shape along the circumferential direction of the elastic element from the mass element to an edge of the elastic element.

In some embodiments, a count of spiral turns in the spiral shape presented by the first extension arm may be greater than 0.33.

In some embodiments, the count of spiral turns in the spiral shape presented by the first extension arm may be greater than 0.66.

In some embodiments, another end of the first extension arm may be connected to the supporting member.

In some embodiments, the buffer member further may include a second extension arm. The second extension arm may be arranged on the surface of the elastic element where the mass element is arranged, and the second extension arm may be located at the inner side of the supporting member. An end of the second extension arm may be connected to the mass element, and the second extension arm may be arranged in a spiral shape along the circumferential direction of the elastic element from the mass element to the edge of the elastic element.

In some embodiments, a count of spiral turns in the spiral shape presented by the second extension arm may be equal to a count of spiral turns in the spiral shape presented by the first extension arm.

In some embodiments, another end of the second extension arm may be connected to the supporting member.

In some embodiments, a thickness of the second extension arm along a vibration direction of the vibration assembly and a width of the second extension arm on a plane perpendicular to the vibration direction of the vibration assembly may be equal to that of the first extension arm.

In some embodiments, a width of the first extension arm on a plane perpendicular to a vibration direction of the vibration assembly may be within a range of 0.03 mm-2 mm, and a thickness of the first extension arm along the vibration direction of the vibration assembly may be within a range of 0.03 mm-0.5 mm.

In some embodiments, the buffer member may include a cantilever beam. An end of the cantilever beam may be connected to the supporting member, and another end of the cantilever beam may be connected to the mass element.

In some embodiments, a thickness of the cantilever beam along a vibration direction of the vibration assembly may be less than a thickness of the mass element along the vibration direction of the vibration assembly.

In some embodiments, the thickness of the cantilever beam may be within a range of 0.01 mm-0.5 mm.

In some embodiments, a gap may exist between the cantilever beam and the mass element.

In some embodiments, a mass proportion of polymer materials in the mass element may be greater than 80%.

In some embodiments, a mass proportion of polymer materials in the elastic element may be greater than 80%.

In some embodiments, a material of the mass element may be the same as a material of the elastic element.

In some embodiments, the vibration assembly may include a plurality of mass elements, and the plurality of mass elements may be connected to the elastic element.

In some embodiments, a count of the plurality of mass elements may be greater than or equal to 3, and the plurality of mass elements may be in a non-collinear arrangement.

In some embodiments, at least one structural parameter of the plurality of mass elements may be different, and the at least one structural parameter may include a size, a mass, a density, or a shape.

In some embodiments, one or more cantilever beams and one or more mass blocks physically connected to each of the one or more cantilever beams may be arranged inside the first acoustic chamber.

In some embodiments, the vibration assembly may include one or more groups of diaphragms and mass blocks, and for each group of the one or more groups of diaphragms and mass blocks, the mass block may be physically connected to the diaphragm.

In some embodiments, the one or more groups of diaphragms and mass blocks may be arranged along a vibration direction of the diaphragm in sequence, and a distance between adjacent diaphragms of the vibration assembly may be not less than a maximum vibration amplitude of the adjacent diaphragms.

In some embodiments, each group of the one or more groups of diaphragms and mass blocks may correspond to a target frequency band, and a sensitivity of the vibration sensor may be greater than a sensitivity of the acoustic transducer within the target frequency band.

In some embodiments, at least two groups of the one or more groups of diaphragms and mass blocks may have different resonance frequencies.

In some embodiments, the vibration assembly may include a supporting member configured to support the one or more groups of diaphragms and mass blocks. The supporting member may be physically connected to the acoustic transducer, and the one or more groups of diaphragms and mass blocks may be connected to the supporting member.

In some embodiments, the supporting member may be made of an air-impermeable material, and the diaphragm may include an air-permeable membrane.

In some embodiments, the elastic element may include a first elastic element and a second elastic element, and the first elastic element and the second elastic element may be connected to two opposite sides of the mass element respectively along the vibration direction of the vibration assembly.

In some embodiments, the first elastic element and the second elastic element may have a same size, shape, material, or thickness.

In some embodiments, the first elastic element may be connected to a first buffer member, and the second elastic element may be connected to a second buffer member.

In some embodiments, the mass element may include a first mass element and a second mass element, and the first mass element and the second mass element may be connected to two opposite sides of the elastic element respectively along the vibration direction of the vibration assembly.

In some embodiments, the first mass element and the second mass element may have a same size, shape, material, or thickness.

In some embodiments, the elastic element may be arranged opposite to the acoustic transducer. A side of the elastic element facing the first acoustic chamber may be arranged with a convex structure. The elastic element may drive the convex structure to move in response to the external vibration signal, and the movement of the convex structure may change the volume of the first acoustic chamber.

In some embodiments, the convex structure may abut against a sidewall of the first acoustic chamber opposite to the elastic element.

In some embodiments, the convex structure may have elasticity. In response to the movement of the convex structure, the convex structure may generate an elastic deformation, and the elastic deformation may change the volume of the first acoustic chamber.

In some embodiments, the vibration assembly further may include a supporting member. The mass element and the supporting member may be physically connected to two sides of the elastic element respectively, the supporting member may be physically connected to the acoustic transducer, and the supporting member, the elastic element, and the acoustic transducer may form the first acoustic chamber.

In some embodiments, an area of a cross-section of the mass element perpendicular to a vibration direction of the vibration assembly is greater than an area of a cross-section of the first acoustic chamber perpendicular to the vibration direction of the vibration assembly. An area of a cross-section of the elastic element perpendicular to the vibration direction of the vibration assembly is greater than the area of the cross-section of the first acoustic chamber perpendicular to the vibration direction of the vibration assembly. The mass element is configured to cause a compression deformation of a region where the elastic element contacts with the supporting member in response to the external vibration signal, and the elastic element vibrates to change the volume of the first acoustic chamber.

In some embodiments, the supporting member includes a ring structure.

In some embodiments, the area of the cross-section of the mass element perpendicular to the vibration direction of the vibration assembly is greater than or equal to an area of a cross-section of an outer ring of the ring structure perpendicular to the vibration direction of the vibration assembly, and the area of the cross-section of the elastic element perpendicular to the vibration direction of the vibration assembly is greater than or equal to the area of the cross-section of the outer ring of the ring structure perpendicular to the vibration direction of the vibration assembly.

In some embodiments, the area of the cross-section of the mass element perpendicular to the vibration direction of the vibration assembly is equal to the area of the cross-section of the elastic element perpendicular to the vibration direction of the vibration assembly.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
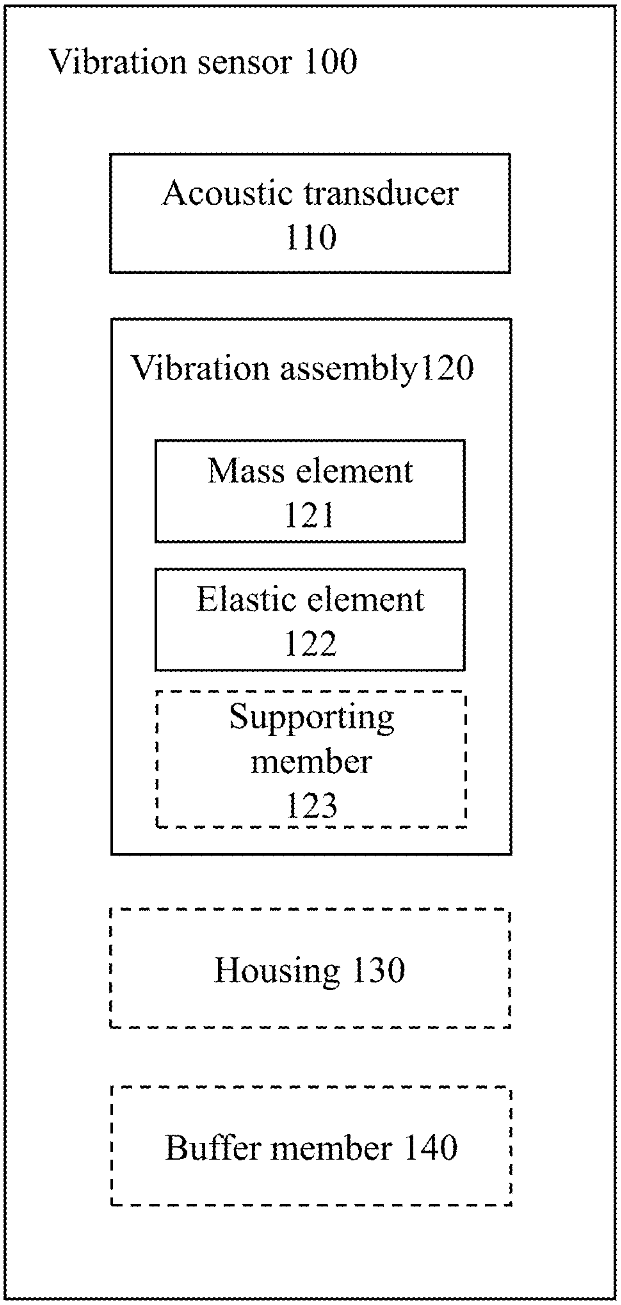
FIG. 1 is a block diagram illustrating an exemplary vibration sensor according to some embodiments of the present disclosure.

In order to more clearly illustrate the technical solutions of the embodiments of the present application, the following briefly introduces the drawings that need to be used in the description of the embodiments. Obviously, the drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit" and/or "module" as used herein is a method for distinguishing different components, elements, components, parts, or assemblies of different levels. However, the words may be replaced by other expressions if other words can achieve the same purpose.

As used in the disclosure and the appended claims, the singular forms "a," "an," and "the" include plural referents unless the content clearly dictates otherwise. In general, the terms "comprise" and "include" imply the inclusion only of clearly identified steps and elements that do not constitute an exclusive listing. A method or equipment may also include other steps or elements.

The flowcharts used in the present disclosure illustrate operations that the system implements according to the embodiment of the present disclosure. It should be understood that the previous or subsequent operations may not be accurately implemented in order. Instead, various steps may be processed in reverse order or simultaneously. Meanwhile, other operations may also be added to these processes, or a certain step or several steps may be removed from these processes.

The embodiments of the present disclosure provide a vibration sensor. The vibration sensor may include an acoustic transducer and a vibration assembly. In some embodiments, the vibration assembly may include a mass element and an elastic element, and the mass element may be connected to the elastic element. A first acoustic chamber may be formed between the elastic element and the acoustic transducer. The elastic element and the acoustic transducer may respectively constitute one of sidewalls of the first acoustic chamber, and in response to an external vibration signal, the vibration assembly may vibrate such that a volume of the first acoustic chamber changes. The acoustic transducer may be in communication with the first acoustic chamber (e.g., through a sound inlet), and the acoustic transducer may generate an electrical signal in response to a volume change in the first acoustic chamber. In some embodiments, the acoustic transducer may have a first resonance frequency, the vibration assembly may have a second resonance frequency, and the second resonance frequency may be different from the first resonance frequency. In some embodiments, the second resonance frequency may be less than the first resonance frequency. The arrangement illustrated above may improve the sensitivity of the vibration sensor in one or more target frequency bands (e.g., a frequency band lower than the second resonance frequency).

In some embodiments, the vibration sensor may also include a buffer member. In some embodiments, the buffer member may be connected to the mass element and/or the elastic element. The buffer member may reduce an impact force of the mass element acting on the elastic element during the vibration of the vibration assembly. In some embodiments, the buffer element may be arranged between the mass element and the elastic element, and the mass element may be fixed on the elastic element through the buffer element (e.g., a buffer connection layer). In some embodiments, the buffer member (e.g., a buffer adhesive layer) may also be arranged on a region of the elastic element excluding a region corresponding to a projection region of the mass element along a vibration direction, so that the impact force of the mass element acting on the elastic element may be dispersed. In some embodiments, the buffer member may also be connected to the mass element and the elastic element in a form of an extension arm, so as to increase a connection area between the mass element and the elastic element and disperse the impact force of the mass element acting on the elastic element. In some embodiments, the buffer member may also be connected to the mass element in a form of a cantilever beam structure, and may not be connected to the elastic element, so as to reduce the impact force of the mass element acting on the elastic element by mitigating the vibration of the mass element. In some embodiments, by arranging the buffer member in the vibration sensor and connecting the buffer member to the mass element and/or the elastic element, the impact force acting on the elastic element when the mass element vibrates can be dispersed, thereby avoiding the elastic element from entering a fatigued state or being damaged due to a large impact force, thus improving the reliability of the vibration sensor.

In some embodiments, as illustrated in FIG. 1, a vibration sensor 100 may include an acoustic transducer 110 and a vibration assembly 120. In some embodiments, the vibration assembly 120 may pick up an external vibration signal and drive the acoustic transducer 110 to generate an electrical signal. When vibration occurs in an external environment, in response to the vibration in the external environment, the vibration assembly 120 may transmit the signal to the acoustic transducer 110, and then the acoustic transducer 110 may convert the signal into an electrical signal. In some embodiments, the vibration sensor 100 may be applied to mobile devices, wearable devices, virtual reality devices, augmented reality devices, or the like, or any combination thereof.

In some embodiments, a mobile device may include a smartphone, a tablet computer, a personal digital assistant (PDA), a gaming device, a navigation device, or the like, or any combination thereof. In some embodiments, a wearable device may include a smart bracelet, an earphone, a hearing aid, a smart helmet, a smart watch, smart clothing, a smart backpack, a smart accessory, or the like, or any combination thereof. In some embodiments, a virtual reality device and/or an augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google Glass, Oculus Rift, Hololens, Gear VR, etc.

In some embodiments, the acoustic transducer 110 may be used to convert a signal (e.g., a vibration signal, an air conduction sound) into an electrical signal. In some embodiments, the acoustic transducer 110 may include a microphone. In some embodiments, the microphone may be a microphone with bone conduction as one of the main modes of sound transmission or a microphone with air conduction as one of the main modes of sound transmission. Taking the microphone with air conduction as one of the main modes of sound transmission as an example, the microphone may obtain a sound pressure change of a conduction channel (e.g., a sound pick-up hole) and convert the sound pressure change into an electrical signal. In some embodiments, the acoustic transducer 110 may be an accelerometer. The accelerometer is a specific application of a spring-vibration system, which receives a vibration signal through a sensitive device to obtain the electrical signal, and then processes the electrical signal to obtain an acceleration. In some embodiments, the acoustic transducer 110 may have a first resonance frequency. The first resonance frequency may be related to a property (e.g., the shape, material, structure, etc.) of the acoustic transducer 110. In some embodiments, the acoustic transducer 110 may have a relatively high sensitivity around the first resonance frequency.

In some embodiments, the vibration assembly 120 may have a second resonance frequency. The second resonance frequency may be lower than the first resonance frequency. In some embodiments, the property of the vibration sensor 100 and/or the vibration assembly 120 may be adjusted, for example, the structure, material, or the like, of the vibration assembly 120 may be adjusted to adjust the relationship between the second resonance frequency and the first resonance frequency, so that the second resonance frequency may be lower than the first resonance frequency, thereby improving the sensitivity of the vibration sensor 100 in a lower frequency band. Merely by way of example, when the vibration sensor 100 is used as a microphone, a target frequency band may be within a range of 200 Hz~2 kHz. Specifically, in some embodiments, if the first resonance frequency of the acoustic transducer 110 is 2 kHz, the second resonance frequency of the vibration assembly 120 may be configured as 800 Hz, 1 kHz, 1.7 kHz, etc.

In some embodiments, the second resonance frequency may be 1 kHz-10 kHz lower than the first resonance frequency. In some embodiments, the second resonance frequency may be 0.5 kHz-15 kHz lower than the first resonance frequency. In some embodiments, the second resonance frequency may be 2 kHz-8 kHz lower than the first resonance frequency. In some embodiments, the sensitivity of the vibration assembly 120 may be adjusted by adjusting the structure, parameter, or the like, of the vibration assembly 120.

The vibration assembly 120 may include a mass element 121 and an elastic element 122. The mass element 121 may be arranged on the elastic element 122. Specifically, the mass element 121 may be arranged on an upper surface and/or a lower surface of the elastic element 122 along a vibration direction of the mass element 121. In some embodiments, the upper surface of the elastic element 122 along the vibration direction of the mass element 121 may be a surface of the elastic element 122 close to the acoustic transducer 110 along the vibration direction of the mass element 121. The lower surface of the elastic element 122 along the vibration direction of the mass element 121 may be a surface of the elastic element 122 away from the acoustic transducer 110 along the vibration direction of the mass element 121.

The mass element 121 may also be referred to as a mass block. In some embodiments, the material of the mass element 121 may be a material with a density greater than a certain density threshold (e.g., 1 g/cm$^3$). In some embodiments, the material of the mass element 121 may be metallic or non-metallic material. The metallic material may include, but is not limited to, steel (e.g., stainless steel, carbon steel, etc.), a light alloy (e.g., an aluminum alloy, a beryllium copper, a magnesium alloy, a titanium alloy, etc.), or the like, or any combination thereof. The non-metallic material may include, but is not limited to, a polymer material, a glass fiber, a carbon fiber, a graphite fiber, a silicon carbide fiber, etc. In some embodiments, a mass proportion of the polymer materials in the mass element 121 may be greater than 80%. In some embodiments, the polymer material may include, but is not limited to, Poly urethane (PU), Poly amide (PA, commonly known as nylon), Poly tetrafluoroethylene (PTFE), Phenol~Formaldehyde (PF), or the like. When the vibration assembly 120 receives a vibration signal, the mass element 121 may vibrate in response to the vibration signal. In some embodiments, when the vibration assembly 120 is applied to the vibration sensor or a sound transmission device, a material density of the mass element 121 may have a great influence on the resonance peak and sensitivity of a frequency response curve of the vibration sensor or the sound transmission device. Under the same volume, the greater the density of the mass element 121 is, the greater the mass may be, and the resonance peak of the vibration sensor or the sound transmission device may move to a low-frequency, so that the low-frequency sensitivity of the vibration sensor or the sound transmission device may increase. In some embodiments, the material density of the mass element 121 may be within a range of 1~20 g/cm$^3$. In some embodiments, the material density of the mass element 121 may be within a range of 6~20 g/cm$^3$. In some embodiments, the material density of the mass element 121 may be within a range of 6~15 g/cm$^3$. In some embodiments, the material density of the mass element 121 may be within a range of 6~10 g/cm$^3$. In some embodiments, the material density of the mass element 121 may be within a range of 6~8 g/cm$^3$.

In some embodiments, a projection of the mass element 121 along the vibration direction of the mass element 121 may be in a shape of a regular and/or irregular polygon, such as a circle, a rectangle, a pentagon, a hexagon, or the like.

In some embodiments, a thickness of the mass element 121 along the vibration direction of the mass element 121 may be within a range of 6~1400 um. In some embodiments, the thickness of the mass element 121 along the vibration direction of the mass element 121 may be within a range of 10~1000 um. In some embodiments, the thickness of the mass element 121 along the vibration direction of the mass element 121 may be within a range of 50~1000 um. In some embodiments, the thickness of the mass element 121 along the vibration direction of the mass element 121 may be within a range of 60~900 um. In some embodiments, the thickness of the mass element 121 along the vibration direction of the mass element 121 may be within a range of 70~800 um. In some embodiments, the thickness of the mass element 121 along the vibration direction of the mass element 121 may be within a range of 80~700 um. In some embodiments, the thickness of the mass element 121 along the vibration direction of the mass element 121 may be within a range of 90~600 um. In some embodiments, the thickness of the mass element 121 along the vibration direction of the mass element 121 may be within a range of 100~500 um. In some embodiments, the thickness of the mass element 121 along the vibration direction of the mass element 121 may be within a range of 100~400 um. In some embodiments, to ensure a vibration performance of the vibration assembly 120, the thickness of the mass element 121 may be set relatively large to improve the mass of the mass element 121. In some embodiments, to package the vibration assembly 120 conveniently, the thickness of the mass element 121 may be set to be relatively small to reduce a package volume of the vibration assembly 120. In some embodiments, the thickness of the mass element 121 along the vibration direction of the mass element 121 may be within a range of 100~300 um. In some embodiments, the thickness of the mass element 121 along the vibration direction of the mass element 121 may be within a range of 100~200 um. In some embodiments, the thickness of the mass element 121 along the vibration direction of the mass element 121 may be within a range of 100~150 um. In some embodiments, to ensure the vibration performance of the vibration assembly 120 and facilitate the package of the vibration assembly 120, the thickness of the mass element 121 along the vibration direction of the mass element 121 may be within a range of 150~300 um.

The elastic element 122 may also be referred to as an elastic membrane, a diaphragm, or the like. The elastic element 122 may be a member capable of elastic deformation under an action of an external load. In some embodiments, the elastic element 122 may be a material with good elasticity (i.e., the elastic deformation is easy to occur), so that the vibration assembly 120 may have a good vibration response capability. In some embodiments, the material of the elastic element 122 may be one or more of the polymer material, the rubber material, or the like. In some embodiments, the polymer material may be Polycarbonate (PC), Polyamides (PA), Acrylonitrile Butadiene Styrene (ABS), Polystyrene (PS), High Impact Polystyrene (HIPS), Polypropylene (PP), Polyethylene Terephthalate (PET), Polyvinyl Chloride (PVC), Polyurethanes (PU), Polyethylene (PE), Phenol-Formaldehyde (PF), Urea-Formaldehyde (UF), Melamine-Formaldehyde (MF), polyarylate (PAR), Polyetherimide (PEI), Polyimide (PI), Polyethylene Naphthalate two formic acid glycol ester (PEN), Polyetheretherketone (PEEK), silica gel, or the like, or any combination thereof. PET is a kind of thermoplastic polyester, which is well-formed. The diaphragm made of PET is often referred as to a Mylar membrane. PC has strong impact resistance and stable size after being molded. PAR is an advanced version of PC, which is mainly for environmental protection considerations. PEI is softer than PET, which has higher internal damping. PI has high-temperature resistance, a molding temperature for PI is higher, and a processing duration for PI is longer. PEN has high strength, which is relatively hard. A characteristic of PEN is that PEN may be painted, dyed, and plated. PU is usually used in a damping layer or a folded ring of a composite material, which has high elasticity and high internal damping. PEEK is a new type of material, which is resistant to friction and fatigue. It should be noted that the composite material may generally take into account the characteristics of various materials, such as a double-layer structure (PU is generally hot pressed to increase an internal resistance), a three-layer structure (a sandwich structure, a damping layer PU, an acrylic adhesive, a UV adhesive, and pressure-sensitive adhesive are clamped in the middle), and a five-layer structure (a membrane with two layers is bonded by a double-sided adhesive, and the double-sided adhesive has a base layer, which usually is PET).

In some embodiments, a Shore hardness of the elastic element 122 may be within a range of 1~50 HA. In some embodiments, the Shore hardness of the elastic element 122 may be within a range of 1~45 HA. In some embodiments, the Shore hardness of the elastic element 122 may be within a range of 1~40 HA. In some embodiments, the Shore hardness of the elastic element 122 may be within a range of 1~35 HA. In some embodiments, the Shore hardness of the elastic element 122 may be within a range of 1~30 HA. In some embodiments, the Shore hardness of the elastic element 122 may be within a range of 1~25 HA. In some embodiments, the Shore hardness of the elastic element 122 may be within a range of 1~20 HA. In some embodiments, the Shore hardness of the elastic element 122 may be within a range of 1~15 HA. In some embodiments, the Shore hardness of the elastic element 122 may be within a range of 1~10 HA. In some embodiments, the Shore hardness of the elastic element 122 may be within a range of 1~5 HA. In some embodiments, the Shore hardness of the elastic element 122 may be within a range of 14.9~15.1 HA.

In some embodiments, the projection of the elastic element 122 along the vibration direction of the mass element 121 may be in a shape of a regular and/or irregular polygon, such as a circle, a rectangle, a pentagon, a hexagon, or the like.

In some embodiments, the structure of the elastic element 122 may be a membrane-shaped structure, a plate-shaped structure, or the like. Taking the elastic element 122 in a form of the plate-shaped structure as an example, the plate-shaped structure may refer to a structure made of flexible or rigid material that is used to carry one or more mass elements 121. The elastic element 122 may include one or more plate-shaped structures, and each of the one or more plate-shaped structures may be connected to the one or more mass elements 121. In some embodiments, a structure formed by the plate-shaped structure and the mass element 121 physically connected to the plate-shaped structure may be referred to as a resonant structure. Each of the one or more plate-shaped structures may be connected to one or more mass elements 121, so that the vibration assembly 120 may include one or more resonant structures, thereby improving the sensitivity of the vibration sensor 100 in one or more target frequency bands.

In some embodiments, the vibration assembly 120 may further include a supporting member 123. The supporting member 123 may be connected to the elastic element 122 to support the elastic element 122. In some embodiments, the supporting member 123 may be physically connected to two sides of the elastic element 122 respectively. For example, the supporting member 123 may be connected to the upper surface and/or the lower surface of the elastic element 122 respectively. In some embodiments, the supporting member 123 may be physically connected to the acoustic transducer 110. For example, an end of the supporting member 123 may be connected to a surface of the elastic element 122, and another end of the supporting member 123 may be connected to the acoustic transducer 110. In some embodiments, the supporting member 123, the elastic element 122, and the acoustic transducer 110 may form the first acoustic chamber. In some embodiments, the first acoustic chamber may be in acoustic communication with the acoustic transducer 110. For example, the acoustic transducer 110 may be provided with a sound inlet (also referred to as a sound pick-up hole or a conduction channel). The sound inlet may refer to a hole on the acoustic transducer 110 used to receive a volume change signal of an acoustic chamber. The first acoustic chamber may be in communication with the sound inlet arranged on the acoustic transducer 110. The acoustic communication between the first acoustic chamber and the acoustic transducer 110 may cause the acoustic transducer 110 to sense the volume change of the first acoustic chamber (i.e., a change of the sound pressure in the first acoustic chamber), and generate the electrical signal based on the volume change of the first acoustic chamber.

In some embodiments, the material of the supporting member 123 may be one or more of the rigid material, semiconductor material, organic polymer material, rubber material, or the like. In some embodiments, the rigid material may include, but is not limited to, metal material, alloy material, or the like. The semiconductor material may include, but is not limited to, one or more of silicon, silicon dioxide, silicon nitride, silicon carbide, or the like. The organic polymer material may include, but is not limited to, one or more of polyimide (PI), Parylene, Polydimethylsiloxane (PDMS), hydrogel, or the like. The rubber material may include, but is not limited to, one or more of gel, silicone, acrylic, polyurethane, rubber, epoxy, hot melt, light curing, or the like. In some embodiments, a cross-section shape of the supporting member 123 along the vibration direction of the mass element 121 may be in a shape of regular and/or irregular geometric shape, such as a rectangle, a circle, an ellipse, a pentagon, or the like.

It should be noted that the supporting member 123 is not a necessary member of the vibration assembly 120. That is, the vibration assembly 120 may not include the supporting member 123.

In some embodiments, the vibration sensor 100 may further include a housing 130. In some embodiments, the housing 130 may be a regular or irregular three-dimensional structure with a chamber (i.e., a hollow portion) inside of the three-dimensional structure. In some embodiments, the housing 130 may be a hollow frame structure. In some embodiments, the hollow frame structure may include, but is not limited to, a regular shape such as a rectangular frame, a circular frame, a regular polygonal frame, or the like, or any irregular shape. In some embodiments, the housing 130 may be made of metal (e.g., stainless steel, copper, etc.), plastic (e.g., polyethylene (PE), polypropylene (PP), polyvinyl chloride (PVC), polystyrene (PS), acrylonitrile-butadiene-styrene copolymer (ABS), etc.), composite material (e.g., metal matrix composite material or non-metal matrix composite material), or the like. In some embodiments, the vibration assembly 120 and/or the acoustic transducer 110 may be located in the chamber formed by the housing 130 or at least partially suspended in the chamber of the housing 130.

In some embodiments, the supporting member 123 may also not be connected to the acoustic transducer 110, but connected to the housing 130. For example, an end surface of the supporting member 123 perpendicular to the vibration direction of the vibration assembly 120 may be connected to the surface of the elastic element 122, and a side (or a peripheral side) of the supporting member 123 parallel to the vibration direction of the vibration assembly 120 may be connected to the housing 130. In some embodiments, the supporting member 123 may also be connected to the acoustic transducer 110 and the housing 130 simultaneously.

It should be noted that the housing 130 may not be a necessary member of the vibration sensor 100. That is, the vibration sensor 100 may not include the housing 130.

In some embodiments, the housing 130 may be physically connected to the acoustic transducer 110. At least part of the housing 130 and the acoustic transducer 110 may form an acoustic chamber, and the vibration assembly 120 may be located in the acoustic chamber formed by the housing 130 and the acoustic transducer 110.

In some embodiments, the vibration assembly 120 may be located in the chamber formed by the housing 130 or at least partially suspended in the chamber of the housing 130. The vibration assembly 120 may be directly or indirectly connected to the housing 130 to divide the acoustic chamber into a plurality of acoustic chambers including a first acoustic chamber and a second acoustic chamber.

In some embodiments, when the vibration assembly 120 includes the supporting member 123, an end of the supporting member 123 may be connected to the elastic element 122, and another end of the supporting member 123 may be connected to the acoustic transducer 110, so that the supporting member 123, the elastic element 122, and the acoustic transducer 110 may form the first acoustic chamber, and the supporting member 123, the elastic element 122, and the housing 130 may form the second acoustic chamber. In some embodiments, when the vibration assembly 120 does not include the supporting member 123, the peripheral side of the elastic element 122 may be connected to the acoustic transducer 110, so that the first acoustic chamber may be formed between the elastic element 122 and the acoustic transducer 110, and another portion of the acoustic chamber may form the second acoustic chamber. In some embodiments, when the vibration assembly 120 does not include the supporting member 123, the peripheral side of the elastic element 122 may be connected to the housing 130, so that the first acoustic chamber may be formed between the elastic element 122, the acoustic transducer 110, and the housing 130, and another portion of the acoustic chamber may form the second acoustic chamber.

In some embodiments, the vibration sensor 100 may further include a buffer member 140. The buffer member 140 may be connected to the vibration assembly 120 (e.g., the mass element and/or the elastic element). During the vibration process of the vibration assembly 120, the buffer member 140 may vibrate along the vibration direction under the action of the vibration assembly 120, so that the impact force generated by the vibration of the mass element may be jointly borne by the elastic element and the buffer member 140 to disperse the impact force acting on the elastic element when the mass element vibrates and prevent the elastic element from entering the fatigue state or being damaged due to the large impact force, thereby improving the reliability of the vibration sensor 100.

In some embodiments, the buffer member 140 may include a buffer connection layer. The buffer connection layer may be arranged between the mass element and the elastic element, and the mass element may be fixed on the elastic element through the buffer connection layer. In some embodiments, the buffer member 140 may include a buffer adhesive layer. The buffer adhesive layer may be arranged in a region of the elastic element excluding a region corresponding to the projection region of the mass element along the vibration direction. In some embodiments, the buffer member 140 may include an extension arm. The extension arm may be arranged on a surface of the elastic element provided with the mass element. An end of the extension arm may be connected to the mass element, and another end of the extension arm may be connected to the supporting member (or the housing). The extension arm may be arranged in a spiral shape along a circumferential direction of the elastic element from the mass element to an edge of the elastic element. In some embodiments, the buffer member 140 may also include a cantilever beam. An end of the cantilever beam may be connected to the mass element, and another end of the cantilever beam may be connected to the supporting member or the housing. A gap may be formed between the cantilever beam and the elastic element.

In some embodiments, the material of the buffer member 140 may be one or more of the polymer material, the rubber material, or the like. In some embodiments, the polymer material may include, but is not limited to, one or more of polyimide (PI), Parylene, Polydimethylsiloxane (PDMS), hydrogel, or the like. The rubber material may include, but is not limited to, one or more of gel, silicone, acrylic, polyurethane, rubber, epoxy, hot melt, light curing, or the like. In some embodiments, a Young's modulus of the buffer member 140 may be within a range of 0.005 MPa~200 MPa. In some embodiments, the Young's modulus of the buffer member 140 may be within a range of 0.008 MPa~150 MPa. In some embodiments, the Young's modulus of the buffer member 140 may be within a range of 0.01 MPa~100 MPa. In some embodiments, the Young's modulus of the buffer member 140 may be within a range of 0.05 MPa~90 MPa. In some embodiments, the Young's modulus of the buffer member 140 may be within a range of 0.1 MP~80 MPa. In some embodiments, the Young's modulus of the buffer member 140 may be within a range of 1 MPa~60 MPa. In some embodiments, the Young's modulus of the buffer member 140 may be within a range of 5 MPa~50 MPa. In some embodiments, the Young's modulus of the buffer member 140 may be within a range of 10 MPa~40 MPa.

Figure 2:
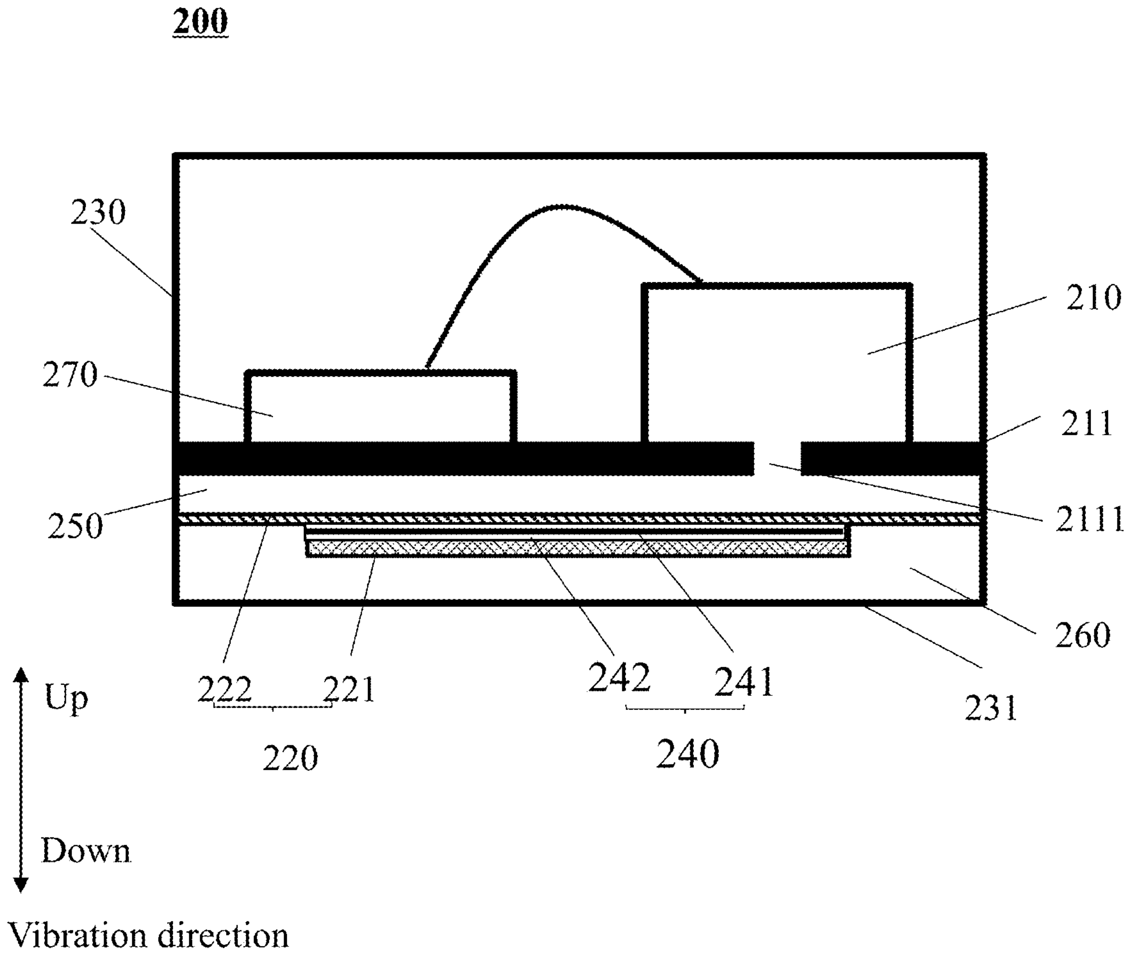
FIG. 2 is a schematic diagram illustrating an exemplary structure of a vibration sensor according to some embodiments of the present disclosure.
Figure 3:
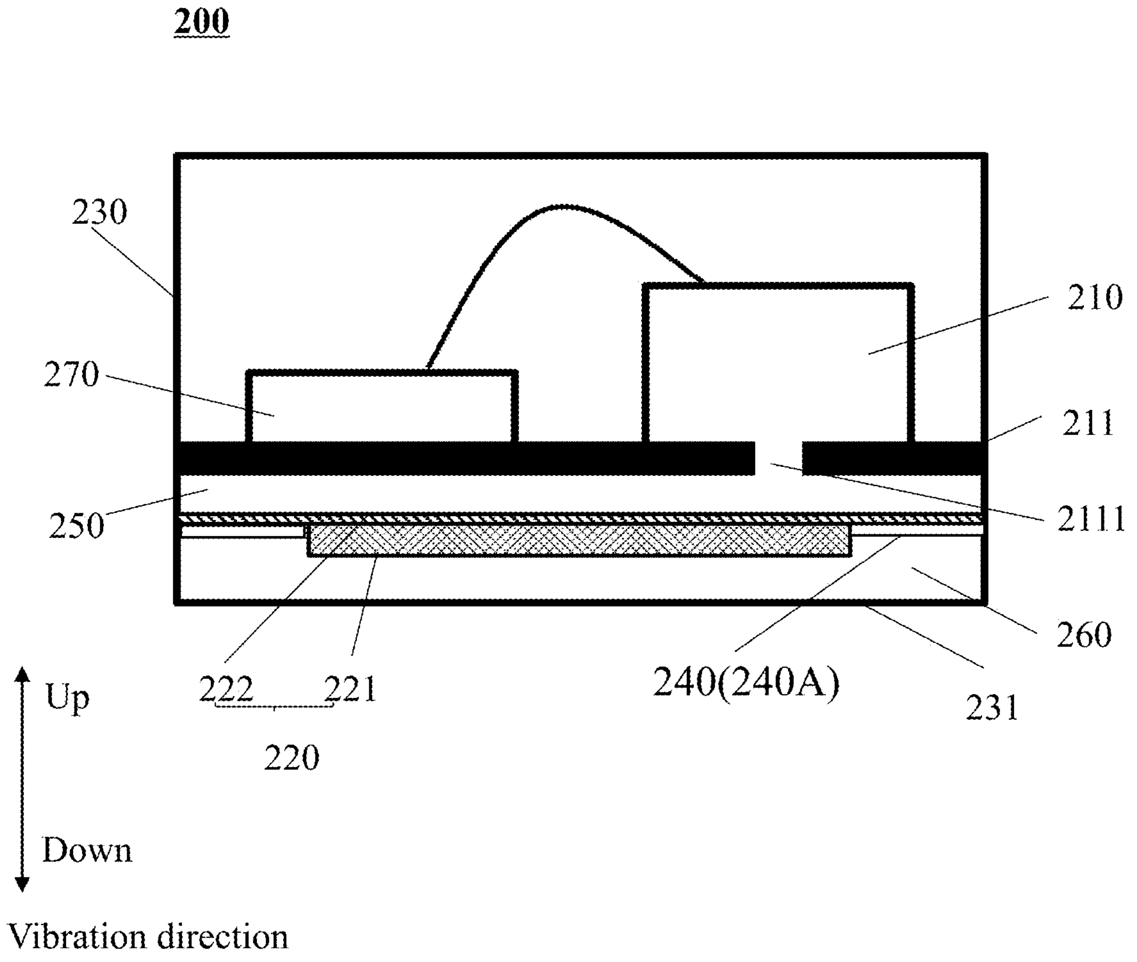
FIG. 3 is a schematic diagram illustrating an exemplary structure of a vibration sensor according to some embodiments of the present disclosure.
Figure 4A:
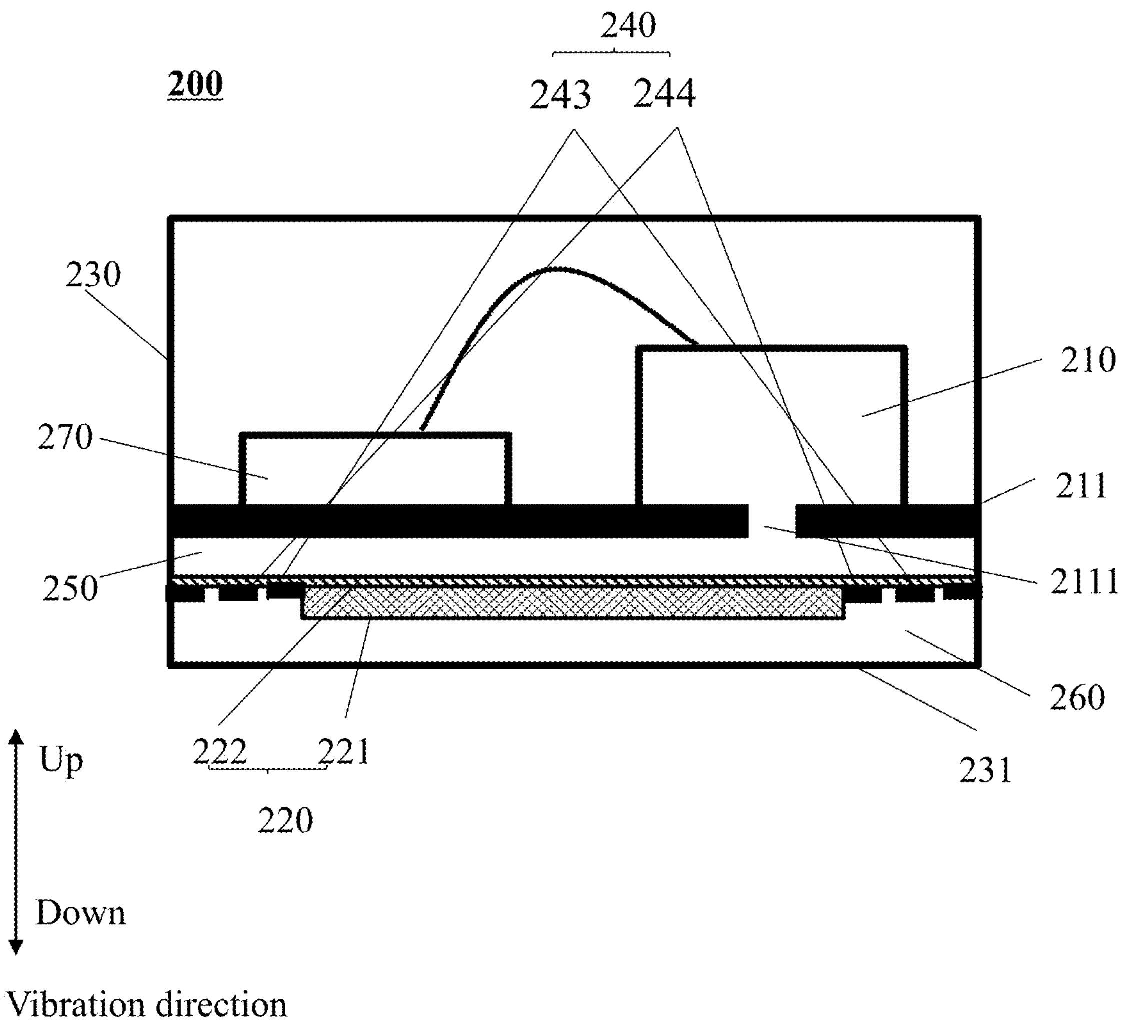
FIG. 4A is a schematic diagram illustrating an exemplary structure of a vibration sensor according to some embodiments of the present disclosure.
Figure 4B:
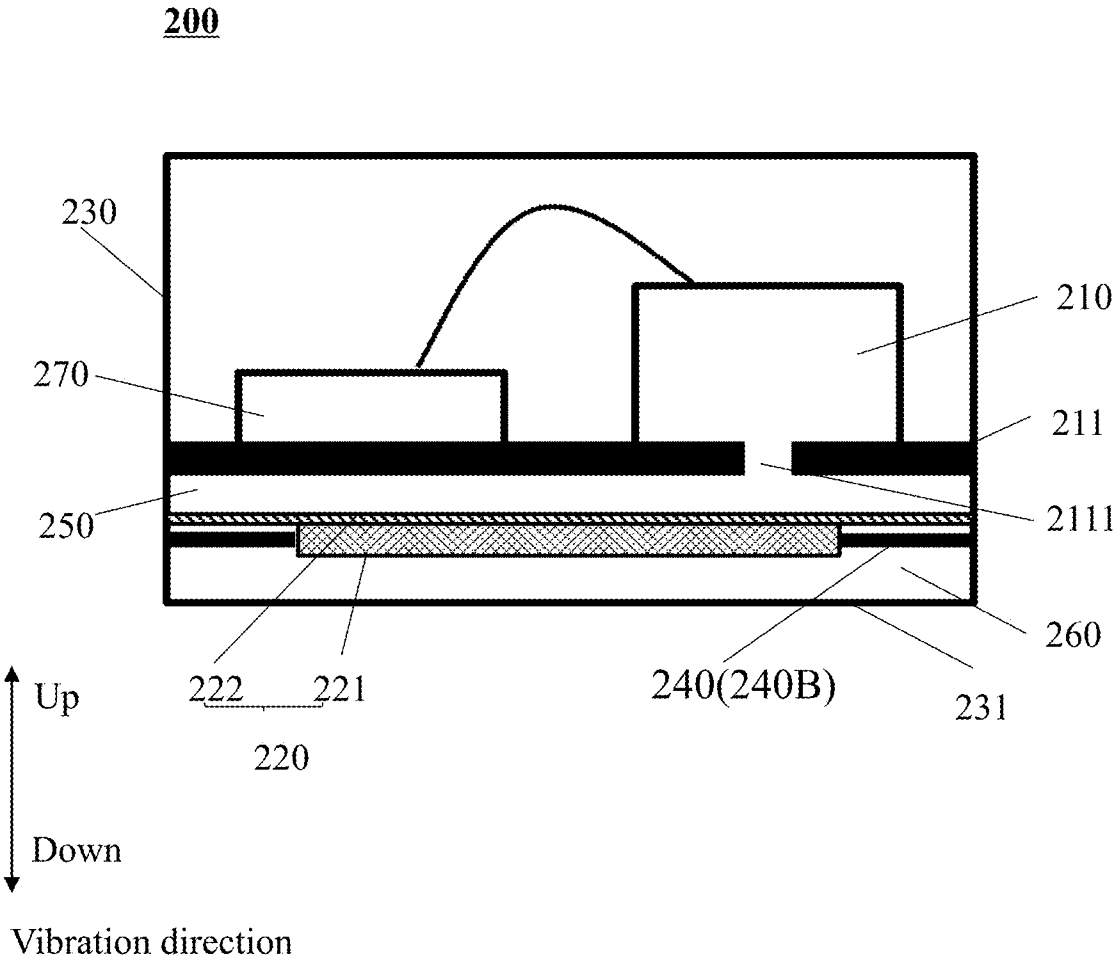
FIG. 4B is a schematic diagram illustrating an exemplary structure of a vibration sensor according to some embodiments of the present disclosure.

FIG. 2 is a schematic diagram illustrating an exemplary structure of a vibration sensor according to some embodiments of the present disclosure. FIG. 3 is a schematic diagram illustrating an exemplary structure of a vibration sensor according to some embodiments of the present disclosure. FIG. 4A is a schematic diagram illustrating an exemplary structure of a vibration sensor according to some embodiments of the present disclosure. FIG. 4B is a schematic diagram illustrating an exemplary structure of a vibration sensor according to some embodiments of the present disclosure.

In some embodiments, as illustrated in FIGS. 2-4B, a vibration sensor 200 may include an acoustic transducer 210, a vibration assembly 220, a housing 230, and a buffer member 240. In some embodiments, the acoustic transducer 210 and a processor 270 may be connected to an upper surface of a substrate 211 of the acoustic transducer 210 respectively. The substrate 211 may be located in a cavity inside the housing 230. The acoustic transducer 210, the processor 270, the substrate 211, and a circuit or other members arranged on the substrate 211 may be sealed by the housing 230. The substrate 211 may divide the cavity inside the housing 230 into two chambers arranged up and down. The vibration assembly 220 may be located in a chamber corresponding to a lower surface of the substrate 211. In some embodiments, the acoustic transducer 210 may also include a housing. The housing may be connected to the substrate 211 to package internal members of the acoustic transducer 210. In some embodiments, the housing 230 of the vibration sensor 200 may be a non-closed half-housing structure. The substrate 211 of the acoustic transducer 210 may be connected to the housing 230 to form a closed cavity, and the vibration assembly 220 may be arranged in the cavity.

In some embodiments, the vibration assembly 220 may include an elastic element 222 and a mass element 221. The elastic element 222 may be connected to the housing 230 through its peripheral side. For example, the elastic element 222 may be connected to an inner wall of the housing 220 in a manner such as gluing, clamping, or the like. The mass element 221 may be arranged on the elastic element 222. Specifically, the mass element 221 may be arranged on the upper surface or the lower surface of the elastic element 222. The upper surface of the elastic element 222 may refer to a surface of the elastic element 222 facing the substrate 211, and the lower surface of the elastic element 222 may refer to a surface of the elastic element 222 away from the substrate 211. In some embodiments, the vibration assembly may include a plurality of mass elements 221, and the plurality of mass elements 221 may be arranged on the upper surface or the lower surface of the elastic element 222 simultaneously. In some embodiments, a part of the plurality of mass elements 221 may be arranged on the upper surface of the elastic element 222, and another part of the mass elements 221 may be arranged on the lower surface of the elastic element 222. In some implementations, the mass element 221 may also be embedded in the elastic element 222.

In some embodiments, a first acoustic chamber 250 may be formed between the elastic element 222 and the substrate 211. Specifically, the upper surface of the elastic element 222, the substrate 211, and the housing 230 may form the first acoustic chamber 250, and the lower surface of the elastic element 222 and the housing 230 may form a second acoustic chamber 260. In response to an external sound signal, when the vibration sensor 200 (e.g., the housing 230 of the vibration sensor 200) vibrates, since characteristics of the vibration assembly 220 (the elastic element 222 and the mass element 221) and the housing 230 are different, the elastic element 222 and the mass element 221 of the vibration assembly 220 may move relative to the housing 230, and during the vibration process of the housing 230, a volume change of the first acoustic chamber 250 may be caused by the movement of the elastic element 222 and the mass element 221. The acoustic transducer 210 may convert the external sound signal into an electrical signal based on the volume change of the first acoustic chamber 250. Specifically, the vibration of the elastic element 222 and the mass element 221 may cause the air in the first acoustic chamber 250 to vibrate, and the vibration of air may act on the acoustic transducer 210 through the sound inlet 2111 arranged on the substrate 211. The acoustic transducer 210 may convert the air vibration into an electrical signal or generate the electrical signal based on the volume change of the first acoustic chamber 250, and then the electrical signal may be processed by the processor 270.

In some embodiments, the vibration sensor 200 may obtain an ideal frequency response by adjusting a mechanical parameter (e.g., material, size, shape, etc.) of the mass element 221, so that a resonance frequency and a sensitivity of the vibration sensor 200 may be adjusted and the reliability of the vibration sensor 200 may be ensured. In some embodiments, the mass element 221 may be in a regular or irregular shape such as a cuboid, cylinder, sphere, ellipsoid, triangle, or the like. In some embodiments, a thickness of the mass element 221 may be within a certain range. In some embodiments, the thickness of the mass element 221 may be within a range of 1 μm~5000 μm. In some embodiments, the thickness of the mass element 221 may be within a range of 1 μm~3000 μm. In some embodiments, the thickness of the mass element 221 may be within a range of 1 μm~1000 μm. In some embodiments, the thickness of the mass element 221 may be within a range of 1 μm~500 μm. In some embodiments, the thickness of the mass element 221 may be within a range of 1 μm~200 μm. In some embodiments, the thickness of the mass element 221 may be within a range of 1 μm~50 μm.

In some embodiments, the thickness of the mass element 221 may have a great influence on the resonance peak and the sensitivity of the frequency response curve of the vibration sensor 200. Under the same area, the thicker the mass element 221 is, the greater the total mass may be, the resonance peak of the vibration sensor 200 may move forward (also may be understood as the resonance frequency decreases), and the sensitivity may increase. In some embodiments, an area of the mass element 221 may be within a certain range. In some embodiments, the area of the mass element 221 may be within a range of 0.1 $mm^2$~100 $mm^2$. In some embodiments, the area of the mass element 221 may be within a range of 0.1 $mm^2$~50 $mm^2$. In some embodiments, the area of the mass element 221 may be within a range of 0.1 $mm^2$~10 $mm^2$. In some embodiments, the area of the mass element 221 may be within a range of 0.1 $mm^2$~6 $mm^2$. In some embodiments, the area of the mass element 221 may be within a range of 0.1 $mm^2$~3 $mm^2$. In some embodiments, the area of the mass element 221 may be within a range of 0.1 $mm^2$~1 $mm^2$.

In some embodiments, the mass element 221 may include a polymer material. In some embodiments, the polymer material may include an elastic polymer material, and an elastic property of the elastic polymer material may absorb an external impact load, thereby effectively reducing a stress concentration at a connection position between the elastic element 222 and the housing 230 and reducing a possibility of damage to the vibration sensor 200 due to the external impact. In some embodiments, a mass proportion of the polymer material in the mass element 221 may exceed 85%. In some embodiments, the mass proportion of the polymer material in the mass element 221 may exceed 80%. In some embodiments, the mass proportion of the polymer material in the mass element 221 may exceed 75%. In some embodiments, the mass proportion of the polymer material in the mass element 221 may exceed 70%. In some embodiments, the mass proportion of the polymer material in the mass element 221 may exceed 60%. In some embodiments, the mass element 221 and the elastic element 222 may be made of the same polymer material.

In some embodiments, a stiffness of the elastic element 222 may be adjusted by adjusting the mechanical parameter of the elastic element 222 (e.g., a Young's modulus, a tensile strength, an elongation at break, and a hardness shore A), thereby adjusting the resonance frequency and the sensitivity of the vibration sensor 200. In some embodiments, the sensitivity of the vibration sensor 200 in the target frequency band (e.g., a frequency band of human voice) may be improved by adjusting the Young's modulus of the elastic element 222. In some embodiments, the greater the Young's modulus of the elastic element 222, the greater the stiffness, and the higher the sensitivity of the vibration sensor 200. In some embodiments, the Young's modulus of the elastic element 222 may be within a range of 1 Mpa~10 GPa. In some embodiments, the Young's modulus of the elastic element 222 may be within a range of 100 Mpa~8 GPa. In some embodiments, the Young's modulus of the elastic element 222 may be within a range of 1 Gpa~8 GPa. In some embodiments, the Young's modulus of the elastic element 222 may be within a range of 2 Gpa~5 GPa. It should be noted that the target frequency band may be adapted and adjusted according to different application scenarios of the vibration sensor 200. For example, when the vibration sensor 200 is applied to pick up a sound signal when a user is talking, a specific frequency band may be the frequency band of the human voice. As another example, when the vibration sensor 200 is applied to pick up a sound signal from the external environment, the specific frequency band may be within a range of 20 Hz-10000 Hz.

In some embodiments, the sensitivity of the vibration sensor 200 in the target frequency band (e.g., the frequency band of the human voice) may be improved by adjusting the tensile strength of the elastic element 222. The tensile strength of the elastic element 222 may be the maximum tensile stress that the elastic element 222 is able to withstand when a necking phenomenon occurs (i.e., a concentrated deformation occurs). In some embodiments, the greater the tensile strength of the elastic element 222, the higher the sensitivity of the vibration sensor 200 in a specific frequency band (e.g., the frequency band of the human voice). In some embodiments, the tensile strength of the elastic element 222 may be within a range of 0.5 Mpa~100 MPa. In some embodiments, the tensile strength of the elastic element 222 may be within a range of 5 Mpa~90 MPa. In some embodiments, the tensile strength of the elastic element 222 may be within a range of 10 Mpa~80 MPa. In some embodiments, the tensile strength of the elastic element 222 may be within a range of 20 Mpa~70 MPa. In some embodiments, the tensile strength of the elastic element 222 may be within a range of 30 Mpa~60 MPa.

In some embodiments, the sensitivity of the vibration sensor 200 in the target frequency band (e.g., the frequency band of the human voice) may be improved by adjusting the elongation at break of the elastic element 222. The elongation at break of the elastic element 222 may refer to a ratio of an elongation length before and after being stretched to a length before being stretched during a process of the material of the elastic element 222 being subjected to an external force until it is broken. In some embodiments, the greater the elongation at break of the elastic element 222, the higher the sensitivity of the vibration sensor 200 in the target frequency band (e.g., the frequency band of the human voice), and the better the reliability of the vibration sensor 200. In some embodiments, the elongation at break of the elastic element 222 may be within a range of 10%~600%. In some embodiments, the elongation at break of the elastic element 222 may be within a range of 20%~500%. In some embodiments, the elongation at break of the elastic element 222 may be within a range of 50%~400%. In some embodiments, the elongation at break of the elastic element 222 may be within a range of 80%~200%.

In some embodiments, the sensitivity of the vibration sensor 200 in the target frequency band (e.g., the frequency band of the human voice) may be improved by adjusting the hardness of the elastic element 222. The hardness of the elastic element 222 may refer to the Shore hardness (i.e., the hardness Shore A) of the elastic element 222. In some embodiments, the smaller the hardness of the elastic element 222 is, the higher the sensitivity of the vibration sensor 200 may be. In some embodiments, the hardness Shore A of the elastic element 222 may be less than 200. In some embodiments, the hardness Shore A of the elastic element 222 may be less than 150. In some embodiments, the hardness Shore A of the elastic element 222 may be less than 100. In some embodiments, the hardness Shore A of the elastic element 222 may be less than 60. In some embodiments, the hardness Shore A of the elastic element 222 may be less than 30. In some embodiments, the hardness Shore A of the elastic element 222 may be less than 10.

In some embodiments, the mass element 221 and the elastic element 222 may be made of the same material. In some embodiments, the mass element 221 and the elastic element 222 may be partially made of the same material. In some embodiments, the materials of the mass element 221 and the elastic element 222 may be different.

In some embodiments, as illustrated in FIG. 2, the buffer member 240 may be arranged between the mass element 221 and the elastic element 222. In some embodiments, the buffer member 240 may include a buffer connection layer. The upper surface and the lower surface of the buffer connection layer along the vibration direction of the vibration assembly 220 may be connected to the elastic element 222 and the mass element 221 respectively, and the mass element 221 may be fixed on the elastic element 222 through the buffer connection layer.

In some embodiments, the buffer connection layer may include a flexible film layer, and the elastic element 222 and the mass element 221 may be directly connected through the flexible film layer. In some embodiments, the flexible film layer may include, but is not limited to, one or more of gel, silicone, acrylic, polyurethane, rubber, epoxy, hot melt, light curing, or the like.

In some embodiments, the buffer connection layer may also include an elastic connection sheet 241 and an adhesive layer 242. The adhesive layer 242 may be wrapped outside the elastic connection sheet 241. The buffer member 240 may be connected between the mass element 221 and the elastic element 222 through the adhesive layer 242. In some embodiments, the material of the elastic connection sheet 241 may include one or more of the polymer material, the rubber material, or the like. In some embodiments, the polymer material may include, but is not limited to, one or more of polyimide (PI), Parylene, Polydimethylsiloxane (PDMS), hydrogel, or the like. The rubber material may include, but is not limited to, one or more of gel, silicone, acrylic, polyurethane, rubber, epoxy, hot melt, light curing, or the like. In some embodiments, the material of the adhesive layer 242 may be a liquid adhesive material (e.g., glue) to improve connection forces among the buffer member 240, the mass element 221, and the elastic element 222, and prevent the mass element 221 from separating from the elastic element 222 during the vibration process of the vibration assembly 220.

In some embodiments, to reduce a plasticity of the elastic element 222 and reduce the influence of the flow and deformation of a colloid (e.g., the adhesive layer 242) on the performance of the vibration sensor 200, the Young's modulus of the buffer connection layer may be controlled within an appropriate range. In some embodiments, the Young's modulus of the buffer connection layer may be within a range of 0.008 MPa~150 MPa. In some embodiments, the Young's modulus of the buffer connection layer may be within a range of 0.01 MPa~100 MPa. In some embodiments, the Young's modulus of the buffer connection layer may be within a range of 0.05 MPa~90 MPa. In some embodiments, the Young's modulus of the buffer connection layer may be within a range of 0.1 MPa~80 MPa. In some embodiments, the Young's modulus of the buffer connection layer may be within a range of 1 MPa~60 MPa. In some embodiments, the Young's modulus of the buffer connection layer may be within a range of 5 MPa~50 MPa. In some embodiments, the Young's modulus of the buffer connection layer may be within a range of 10 MPa~40 MPa.

In some embodiments, the thickness of the buffer connection layer along the vibration direction of the vibration assembly 220 may affect the performance of the vibration assembly 220. In some embodiments, if the buffer connection layer is relatively thin, the function of reducing the impact force of the mass element 221 acting on the elastic element 222 may be weakened. If the buffer connection layer is relatively thick, the sensitivity of the vibration assembly 220 may be reduced. In some embodiments, the thickness of the buffer connection layer along the vibration direction of the vibration assembly 220 may be smaller than the thickness of the mass element 221 along the vibration direction of the vibration assembly 220. In some embodiments, the thickness of the buffer connection layer along the vibration direction of the vibration assembly 220 may be within a range of 6-1000 um. In some embodiments, the thickness of the buffer connection layer along the vibration direction of the vibration assembly 220 may be within a range of 20-800 um. In some embodiments, the thickness of the buffer connection layer along the vibration direction of the vibration assembly 220 may be within a range of 50-500 um. In some embodiments, the thickness of the buffer connection layer along the vibration direction of the vibration assembly 220 may be within a range of 80-300 um. In some embodiments, the thickness of the buffer connection layer along the vibration direction of the vibration assembly 220 may be within a range of 90-200 um.

In some embodiments, a projection area of the buffer connection layer along the vibration direction of the mass element 221 may be equal to a projection area of the mass element 221 along the vibration direction of the mass element 221, and the buffer connection layer may completely cover the mass element 221. In some embodiments, the projection area of the buffer connection layer along the vibration direction of the mass element 221 may be greater than the projection area of the mass element 221 along the vibration direction of the mass element 221, and the buffer connection layer may exceed a region where the mass element 221 is located. In some embodiments, a part of the projection area of the buffer connection layer along the vibration direction of the mass element 221 exceeding the mass element 221 may be smaller than or equal to the projection area of the mass element 221 along the vibration direction of the mass element 221. In some embodiments, the projection area of the buffer connection layer along the vibration direction of the mass element 221 may be smaller than the projection area of the mass element 221 along the vibration direction of the mass element 221. At this time, the buffer connection layer may not completely cover the mass element 221, or the buffer connection layer may be arranged intermittently between the mass element 221 and the elastic element 222.

In some embodiments, the buffer connection layer may be arranged between the mass element 221 and the elastic element 222. The impact force generated during the vibration of the mass element 221 may act on the elastic element 222 through the buffer member 240, so that the buffer member 240 may disperse the impact force acting on the elastic element 222 when the mass element 221 vibrates, thereby preventing the elastic element 222 from entering a fatigued state or being damaged due to a large impact force, and improving the reliability of the vibration sensor 200.

In some embodiments, as illustrated in FIG. 3, the buffer member 240 may include a buffer adhesive layer 240A. The buffer adhesive layer 240A may be arranged in a region of the elastic element 222 excluding a region corresponding to a projection region of the mass element 221 along the vibration direction. It can also be understood that the buffer adhesive layer 240A may be arranged on a region of the elastic element 222 that is not covered by the mass element 221. In some embodiments, the buffer member 240 may be arranged on any surface of the elastic element 222 perpendicular to the vibration direction of the elastic element 222.

In some embodiments, the buffer adhesive layer 240A and the mass element 221 may be located on the same side of the elastic element 222. Specifically, the mass element 221 and the buffer adhesive layer 240A may be arranged on the same side of the elastic element 222 along the vibration direction of the mass element 221. At this time, the buffer adhesive layer 240A may be arranged to surround the mass element 221 on the elastic element 222 along the peripheral side of the mass element 221. In some embodiments, the buffer adhesive layer 240A and the mass element 221 may also be located on the opposite side of the elastic element 222. Specifically, the mass element 221 may be located at a side of the elastic element 222 along the vibration direction of the mass element 221, and the buffer adhesive layer 240A may be located at another side of the elastic element 222 along the vibration direction of the mass element 221. The buffer adhesive layer 240A may be arranged to be opposite to the mass element 221. At this time, the buffer adhesive layer 240A may be arranged at a side of the elastic element 222 and surround the projection region along the peripheral side of the projection region of the mass element 221. In some embodiments, when the buffer adhesive layer 240A and the mass element 221 are located on the opposite side of the elastic element 222, the buffer adhesive layer 240A may also cover the side of the elastic element 222 where the buffer adhesive layer 240A is located. In some embodiments, the buffer adhesive layer 240A may also be arranged on two sides of the elastic element 222. Specifically, on the two sides of the elastic element 222, the buffer adhesive layer 240A may be arranged in regions that are not covered by the projection region of the mass element 221 along the vibration direction. Under the arrangement illustrated above, the plasticity of the elastic element 222 may be reduced more effectively, and the impact force of the mass element 221 acting on the elastic element 222 may be dispersed. In some embodiments, when the mass of the mass element 221 is relatively great, an arrangement manner of arranging the buffer adhesive layers 240A at the two sides of the elastic element 222 may be adopted.

In some embodiments, the buffer adhesive layer 240A may adhere to the surface of the elastic element 222. In some embodiments, the buffer adhesive layer 240A may also be arranged on the elastic element 222 in a manner of dispensing. The buffer adhesive layer 240A may be arranged on the elastic element 222 in the manner of dispensing, so that the buffer adhesive layer 240A may be dense and uniform, and the buffer adhesive layer 240A may not fall off from the elastic element 222 easily.

In some embodiments, the buffer adhesive layer 240A may be a single-layer structure or a multi-layer composite structure. In some embodiments, the buffer adhesive layer 240A may be made of a single material or different materials through composition. The structure, the material, or the like, of the buffer adhesive layer 240A may be arranged according to a requirement (e.g., the sensitivity) of the vibration sensor 200, which is not limited herein.

In some embodiments, to reduce the plasticity of the elastic element 222 and reduce the influence of the flow and deformation of the colloid (e.g., the buffer adhesive layer 240A) on the performance of the vibration sensor 200, the Young's modulus of the buffer adhesive layer 240A may be controlled within an appropriate range. In some embodiments, the Young's modulus of the buffer adhesive layer 240A may be within a range of 0.008 MPa~150 MPa. In some embodiments, the Young's modulus of the buffer adhesive layer 240A may be within a range of 0.01 MPa~100 MPa. In some embodiments, the Young's modulus of the buffer adhesive layer 240A may be within a range of 0.05 MPa~90 MPa. In some embodiments, the Young's modulus of the buffer adhesive layer 240A may be within a range of 0.1 MPa~80 MPa. In some embodiments, the Young's modulus of the buffer adhesive layer 240A may be within a range of 1 MPa~60 MPa. In some embodiments, the Young's modulus of the buffer adhesive layer 240A may be within a range of 5 MPa-50 MPa. In some embodiments, the Young's modulus of the buffer adhesive layer 240A may be within a range of 10 MPa-40 MPa.

In some embodiments, the thickness of the buffer adhesive layer 240A along the vibration direction of the vibration assembly 220 may affect the performance (e.g., the sensitivity) of the vibration sensor 200 (the vibration assembly 220). In some embodiments, if the buffer adhesive layer 240A is relatively thin, the function of reducing the impact force of the mass element 221 acting on the elastic element 222 may be weakened. If the buffer adhesive layer 240A is relatively thick, the sensitivity of the vibration assembly 220 may be reduced. In some embodiments, the thickness of the buffer adhesive layer 240A along the vibration direction of the vibration assembly 220 may be within a range of 0.1~1000 um. In some embodiments, the thickness of the buffer adhesive layer 240A along the vibration direction of the vibration assembly 220 may be within a range of 1~800 um. In some embodiments, the thickness of the buffer adhesive layer 240A along the vibration direction of the vibration assembly 220 may be within a range of 10~500 um. In some embodiments, the thickness of the buffer adhesive layer 240A along the vibration direction of the vibration assembly 220 may be within a range of 50~300 um. In some embodiments, the thickness of the buffer adhesive layer 240A along the vibration direction of the vibration assembly 220 may be within a range of 90~200 um.

In some embodiments, the buffer adhesive layer 240A may be arranged on the elastic element 222 to disperse the impact force of the mass element 221 acting on the elastic element 222 and improve the performance of the elastic element 222 against the impact of the mass element 221, thereby preventing the elastic element 222 from being damaged due to the large impact of the mass element 221 and prolonging the service life of the elastic element 222. In addition, by arranging the buffer adhesive layer 240A on the elastic element 222, the plasticity of the elastic element 222 may be reduced, and the resonance frequency of the elastic element 222 may be increased, thereby helping to reduce the noise of the vibration sensor 200 and improving the high-frequency characteristic of the vibration sensor 200.

In some embodiments, as illustrated in FIG. 4A, the buffer member 240 may include a first extension arm 243, and the first extension arm 243 may be arranged on the surface of the elastic element 222 where the mass element 221 is arranged.

In some embodiments, an end of the first extension arm 243 may be connected to the mass element 221. In some embodiments, another end of the first extension arm 243 may be connected to the housing 230. The first extension arm 243 may be arranged in a spiral shape along the circumferential direction of the elastic element 222 from the mass element 221 to the edge of the elastic element 222.

In some embodiments, the first extension arm 243 may be bonded to the surface of the elastic element 222 by means of an adhesive connection. In some embodiments, the material of the first extension arm 243 may be metallic material, plastic material, or the like. Exemplary metallic materials may include, but are not limited to, stainless steel, copper, or the like. Exemplary plastic materials may include, but are not limited to, Polyethylene terephthalate (PET), Polyphenylene sulfide (PPS), or the like. In some embodiments, the first extension arm 243 may be an integral structure integrally formed with the mass element 221. In some embodiments, the first extension arm 243 may also be a single structure independent of the mass element 221. The first extension arm 243 and the mass element 221 may be assembled together by means of an assembly relationship (e.g., a snap connection, a screw connection, an adhesive connection, etc.).

Figure 4C:
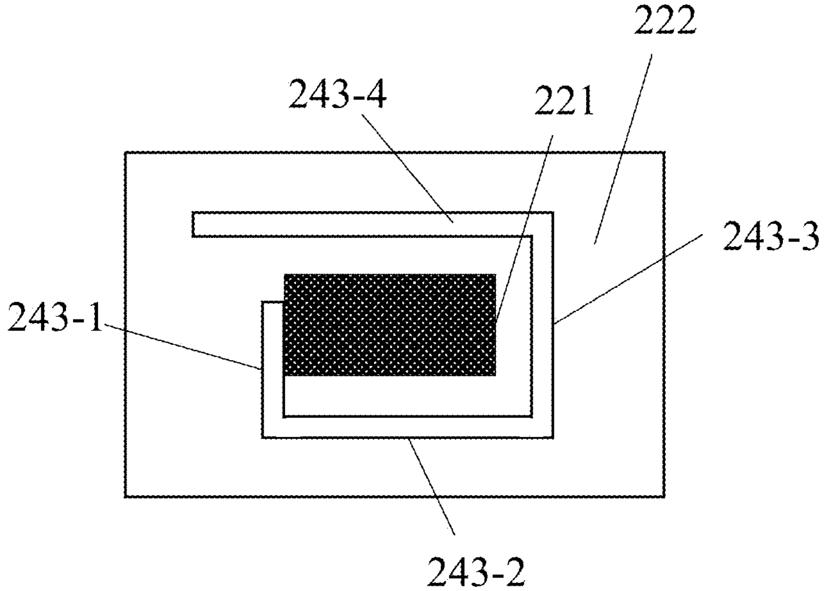
FIG. 4C is a top view illustrating an exemplary structure of a first extension arm according to some embodiments of the present disclosure.

In some embodiments, when the first extension arm 243 is arranged in the spiral shape from the mass element 221 to the edge of the elastic element 222 along the circumferential direction of the elastic element 222, the first extension arm 243 in the spiral shape may be arranged to expand and extend from the mass element 221 to the peripheral side of the elastic element 222. Taking the elastic element 222 in the form of a rectangle structure as an example, the elastic element 222 may include a first side, a second side, a third side, and a fourth side arranged in sequence along the circumferential direction of the elastic element 222. The first side may be arranged opposite to the third side, and the second side may be arranged opposite to the fourth side. FIG. 4C is a top view illustrating an exemplary structure of a first extension arm according to some embodiments of the present disclosure. As illustrated in FIG. 4C, the first extension arm 243 in the spiral shape may include a first lead-out segment 243-1, a first transition segment 243-2, and a first extension segment 243-3. The first lead-out segment 243-1 may be arranged on a side of the mass element 221 close to the first side. An end of the first lead-out segment 243-1 may be connected to the mass element 221, and another end of the first lead-out segment 243-1 may be arranged to extend facing the second side along a length direction of the first side. An end of the first transition segment 243-2 may be connected to the end of the first lead-out segment 243-1 extending toward the second side, and another end of the first transition segment 243-2 may be arranged to extend facing the third side along the length direction of the second side. An end of the first extension segment 243-3 may be connected to the end of the first transition segment 243-2 extending toward the third side, and another end of the first extension segment 243-3 may be arranged to extend facing toward the fourth side along a length direction of the third side. In some embodiments, an ending point of the first extension arm 243 may extend to the edge of the elastic element 222 and may be connected to the housing 230 or a supporting member (not shown in FIG. 4A) arranged on the housing 230. Under the arrangement illustrated above, a length of the first extension arm 243 may be increased to ensure that the first extension arm 243 may disperse the impact force of the mass element 221 acting on the elastic element 222. In addition, the first lead-out segment 243-1, the first transition segment 243-2, and the first extension segment 243-3 of the first expansion arm 243 may be arranged along the length direction of the first side, the second side, and the third side of the elastic element 222 respectively, so that the impact of the mass element 221 acting on the elastic element 222 may be dispersed more evenly along the circumferential direction of the elastic element 222, thereby further avoiding the damage to the elastic element 222.

In some embodiments, the spiral shape of the first extension arm 243 may correspond to the projection shape of the peripheral side of the elastic element 222 along the vibration direction of the vibration assembly 220. In some embodiments, the projection shape of the peripheral side of the elastic element 222 along the vibration direction of the vibration assembly 220 may be in a quadrilateral shape, so that the first extension arm 243 may be in a shape of a quadrilateral spiral line. In some embodiments, the projection shape of the peripheral side of the elastic element 222 along the vibration direction of the vibration assembly 220 may be in a shape of a circle, so that the first extension arm 243 may be a shape of a circular spiral line. In some embodiments, the projection shape of the peripheral side of the elastic element 222 along the vibration direction of the vibration assembly 220 may be in a shape of a pentagon, so that the first extension arm 243 may be in a shape of a pentagonal spiral line. In some embodiments, the projection shape of the peripheral side of the elastic element 222 along the vibration direction of the vibration assembly 220 may be in a shape of a hexagon, so that the first extension arm 243 may be in a shape of a hexagonal spiral line. In some embodiments, in order to effectively disperse the impact force exerted by the mass element 221 on the elastic element 222 by the first extension arm 243, a count of spiral turns in the spiral shape presented by the first extension arm 243 may be arranged within an appropriate range. The count of spiral turns may be obtained by calculating based on a starting point of the first extension arm 243 (e.g., an endpoint of the end of the first lead-out segment 243-1 connected to the mass element 221) and an ending point (e.g., an endpoint of the end of the first extension segment 243-3 extending towards the fourth side) of the first extension segment 243-3 of the first extension arm 243. In some embodiments, the count of spiral turns in the spiral shape may be 1, which may indicate a spiral shape when a twist angle of a connecting line between a starting point and an ending point of the first extension arm 243 is 270°. It should be understood that, if the first extension arm 243 is in the shape of a quadrilateral, when the starting point and the ending point of the first extension arm 243 are on the first lead-out segment 243-1, a twist angle of the connecting line between the starting point and the ending point of the first extension arm 243 may be 0. That is, the count of spiral turns in the spiral shape is 0 (i.e., the spiral shape is not formed by the first extension arm 243). When the starting point of the first extension arm 243 is on the first lead-out segment 243-1, and the ending point is on the first transition segment 243-2 (or the first extension segment 243-3), the count of spiral turns of the connecting line between the starting point and the ending point of the first extension arm 243 may be greater than 0. That is, the count of spiral turns in the spiral shape is greater than 0 (i.e., the spiral shape is formed by the first extension arm 243). In some embodiments, the count of spiral turns in the spiral shape may be determined by a ratio of a twist angle of the connecting line between the starting point and the ending point of the first extension arm 243 to 270°.

In some embodiments, the count of spiral turns in the spiral shape presented by the first extension arm 243 may be greater than 0.01. In some embodiments, the count of spiral turns in the spiral shape presented by the first extension arm 243 may be greater than 0.1. In some embodiments, the count of spiral turns in the spiral shape presented by the first extension arm 243 may be greater than 0.2. In some embodiments, the count of spiral turns in the spiral shape presented by the first extension arm 243 may be greater than 0.25. In some embodiments, the count of spiral turns in the spiral shape presented by the first extension arm 243 may be greater than 0.33. In some embodiments, the count of spiral turns in the spiral shape presented by the first extension arm 243 may be greater than 0.4. In some embodiments, the count of spiral turns in the spiral shape presented by the first extension arm 243 may be greater than 0.66.

In some embodiments, the count of spiral turns in the spiral shape presented by the first extension arm 243 may be greater than 0.66. In some embodiments, when the first extension arm 243 includes the first lead-out segment 243-1, the first transition segment 243-2, and the first extension segment 243-3, the count of spiral turns in the spiral shape presented by the first extension arm 243 may be greater than 0.33.

In some embodiments, the first extension arm 243 may further include a first reinforcement segment 243-4. An end of the first reinforcement segment 243-4 may be connected to the end of the first extension segment 243-3 extending toward the fourth side, and another end of the first reinforcement segment 243-4 may extend toward the first side along the length direction of the fourth side. In some embodiments, the end of the first reinforcement segment 243-4 extending toward the first side along the length direction of the fourth side may extend to the edge of the elastic element 222, which may be connected to the housing 230 or the supporting member (not shown in FIG. 4A) arranged on the housing 230. In some embodiments, by adding the first reinforcement segment 243-4 after the first extension segment 243-3, not only the length of the first extension arm 243 can be increased to further disperse the impact of the mass element 221 acting on the elastic element 222, but also the first lead-out segment 243-1, the first transition segment 243-2, the first extension segment 243-3, and the first reinforcement segment 243-4 of the first extension arm 243 can be arranged to correspond to the first side, the second side, the third side, and the fourth side of the elastic element 222, respectively, which is arranged in a structural form surrounding the mass element 221. On the one hand, the impact of the mass element 221 acting on the elastic element 222 may be dispersed more uniformly along the circumferential direction of the elastic element 222. On the other hand, the mass element 221 may also be supported in four directions along the circumferential direction, so that the balance may be improved and the vibration may be more stable. In some embodiments, when the first extension arm 243 includes the first lead-out segment 243-1, the first transition segment 243-2, the first extension segment 243-3, and the first reinforcement segment 243-4, the count of spiral turns in the spiral shape presented by the first extension arm 243 may be greater than 0.66.

In some embodiments, a width of the first extension arm 243 on a plane perpendicular to the vibration direction of the vibration assembly 220 may affect a damping of the vibration assembly 220. Specifically, when the width of the first extension arm 243 is relatively small, the damping of the elastic element 222 on the first extension arm 243 may be weak, the damping of the vibration assembly 220 may be small, and the sensitivity of the vibration assembly 220 may be relatively high. When the width of the first extension arm 243 is relatively great, the damping of the elastic element 222 on the first extension arm 243 may be relatively strong, the damping of the vibration assembly 220 may be relatively great, and the sensitivity of the vibration assembly 220 may be relatively low. Accordingly, in some embodiments, the width of the first extension arm 243 may be within a range of 0.03 mm~2 mm. In some embodiments, the width of the first extension arm 243 may be within a range of 0.06 mm~1.8 mm. In some embodiments, the width of the first extension arm 243 may be within a range of 0.1 mm~1.5 mm. In some embodiments, the width of the first extension arm 243 may be within a range of 0.15 mm~1 mm. In some embodiments, the width of the first extension arm 243 may be within a range of 0.2 mm~0.8 mm.

In some embodiments, the thickness of the first extension arm 243 along the vibration direction of the vibration assembly 220 may affect the damping of the vibration assembly 220. Specifically, when the thickness of the first extension arm 243 is relatively small, the damping of the elastic element 222 on the first extension arm 243 may be weak, the damping of the vibration assembly 220 may be relatively small, and the sensitivity of the vibration assembly 220 may be relatively high. When the thickness of the first extension arm 243 is relatively great, the damping of the first extension arm 243 on the elastic element 222 may be stronger, the damping of the vibration assembly 220 may be relatively great, and the sensitivity of the vibration assembly 220 may be relatively low. Accordingly, in some embodiments, the thickness of the first extension arm 243 may be within a range of 0.03 mm~0.5 mm. In some embodiments, the thickness of the first extension arm 243 may be within a range of 0.05 mm~0.45 mm. In some embodiments, the thickness of the first extension arm 243 may be within a range of 0.1 mm~0.4 mm. In some embodiments, the thickness of the first extension arm 243 may be within a range of 0.15 mm~0.35 mm. In some embodiments, the thickness of the first extension arm 243 may be within a range of 0.2 mm~0.3 mm.

In some embodiments, as illustrated in FIG. 4A, the buffer member 240 may include a second extension arm 244, and the second extension arm 244 may be arranged on a surface of the elastic element 222 where the mass element 221 is located. In some embodiments, an end of the second extension arm 244 may be connected to the mass element 221. In some embodiments, another end of the second extension arm 244 may be connected to the housing 230. The second extension arm 244 may be arranged in a spiral shape along the circumferential direction of the elastic element 222 from the mass element 221 to an edge of the elastic element 222. In some embodiments, a connection position of the second extension arm 244 connected to the mass element 221 may be different from a connection position of the first extension arm 243 connected to the mass element 221. In some embodiments, a connection point of the second extension arm 244 connected to the mass element 221 and a connection point of the first extension arm 243 connected to the mass element 221 may be located on different sides of the mass element 221. In some embodiments, the connection point of the second extension arm 244 connected to the mass element 221 and the connection point of the first extension arm 243 connected to the mass element 221 may be located on opposite sides of the mass element 221. In some embodiments, an ending point of the second extension arm 244 may extend to the edge of the elastic element 222 and connect with the housing 230 or the supporting member (not shown in FIG. 4A). A structural shape and an arrangement of the second extension arm 244 may be substantially the same as those of the first extension arm 243. More details may be found elsewhere in the present disclosure, such as the descriptions of the first extension arm 243.

In some embodiments, the count of spiral turns in the spiral shape presented by the first extension arm 243 may be equal to the count of spiral turns in the spiral shape presented by the second extension arm 244. For example, the first extension arm 243 and the second extension arm 244 may be symmetrically distributed along two sides of the mass element 221 perpendicular to the vibration direction. In some embodiments, the count of spiral turns in the spiral shape presented by the first extension arm 243 may be not equal to the count of spiral turns in the spiral shape presented by the second extension arm 244.

In some embodiments, a thickness of the second extension arm 244 along the vibration direction of the vibration assembly 220 may be the same as a thickness of the first extension arm 243 along the vibration direction of the vibration assembly 220. In some embodiments, a width of the second extension arm 244 on a plane perpendicular to the vibration direction of the vibration assembly 220 may be the same as a width of the first extension arm 243 on a plane perpendicular to the vibration direction of the vibration assembly 220. More details about the thickness of the second extension arm 244 along the vibration direction of the vibration assembly 220 and the width of the second extension arm 244 on a plane perpendicular to the vibration direction of the vibration assembly 220 may be found elsewhere in the present disclosure, such as the descriptions of the first extension arm 243.

In some embodiments, under the arrangement illustrated in FIG. 4A, the buffer member 240 (e.g., the first extension arm 243 and the second extension arm 243) may be arranged on the surface of the elastic element 222 where the mass element 221 is located, and an end of the buffer member 240 may be connected to the mass element 221. The buffer member 240 and the mass element 221 may provide mass for the vibration assembly 220. Since the first extension arm 243 and/or the second extension arm 244 are arranged in a spiral shape along the circumferential direction of the elastic element 222 from the mass element 221 to the edge of the elastic element 222, the length of the first extension arm 243 and/or the second extension arm 243 may be increased, such that when the mass element 221 vibrates, the first extension arm 243 and/or the second extension arm 244 may disperse the impact of the mass element 221 acting on the elastic element 222 to the surroundings of the mass element 221, thereby avoiding the too concentrated impact of the mass element 221 acting on the elastic element 222 caused by the mass element 221 and improving the reliability of the vibration sensor 200.

In some embodiments, as illustrated in FIG. 4B, the buffer member 240 may include a cantilever beam 240B. The cantilever beam 240B may be located on a side of the mass element 221. One end of the cantilever beam 240B may be connected to the housing 230 or a supporting element (not shown in FIG. 4B) arranged on the housing 230, and another end of the cantilever beam 240B may be connected to the mass element 221. During the vibration process of the vibration assembly 220, the cantilever beam 240B may vibrate under the action of the mass element 221. In some embodiments, a gap may be formed between the cantilever beam 240B and the elastic element 222, so that the vibration of the cantilever beam 240B may not interfere with the vibration of the elastic element 222, thereby avoiding an influence on the mechanical property of the elastic element 222.

In some embodiments, a thickness of the cantilever beam 240B along the vibration direction of the vibration assembly 220 may be smaller than a thickness of the mass element 221 along the vibration direction of the vibration assembly 220. In some embodiments, the thickness of the cantilever beam 240B along the vibration direction of the vibration assembly 220 may be within a range of 0.01 mm~0.5 mm. In some embodiments, the thickness of the cantilever beam 240B along the vibration direction of the vibration assembly 220 may be within a range of 0.05 mm~0.45 mm. In some embodiments, the thickness of the cantilever beam 240B along the vibration direction of the vibration assembly 220 may be within a range of 0.1 mm~0.4 mm. In some embodiments, the thickness of the cantilever beam 240B along the vibration direction of the vibration assembly 220 may be within a range of 0.15 mm~0.35 mm. In some embodiments, the thickness of the cantilever beam 240B along the vibration direction of the vibration assembly 220 may be within a range of 0.2 mm~0.3 mm.

In some embodiments, when the mass element 221 vibrates, the elastic element 222 and the cantilever beam 240B may jointly bear the impact force generated during the vibration of the mass element 221, which effectively reduces the impact of the vibration of the mass element 221 acting on the elastic element 222, thereby avoiding the damage to the elastic element 222 and improving the reliability of the vibration sensor 200.

Figure 5:
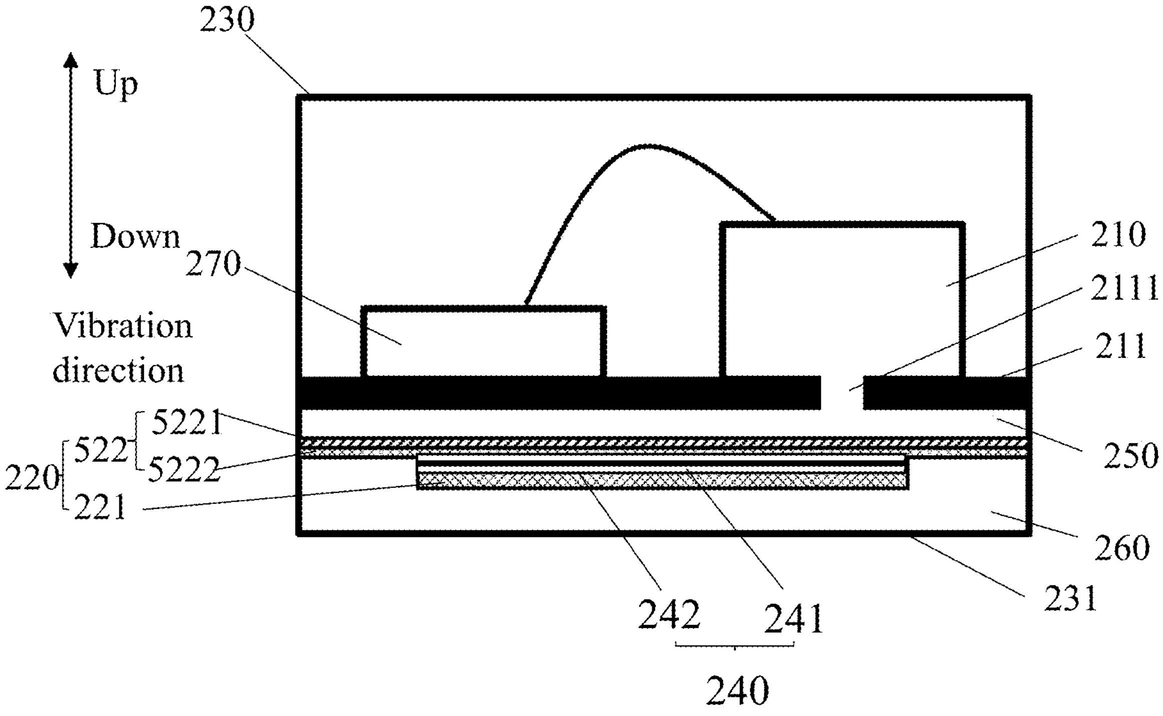
FIG. 5 is a schematic diagram illustrating an exemplary structure of a vibration sensor according to some embodiments of the present disclosure.
Figure 6:
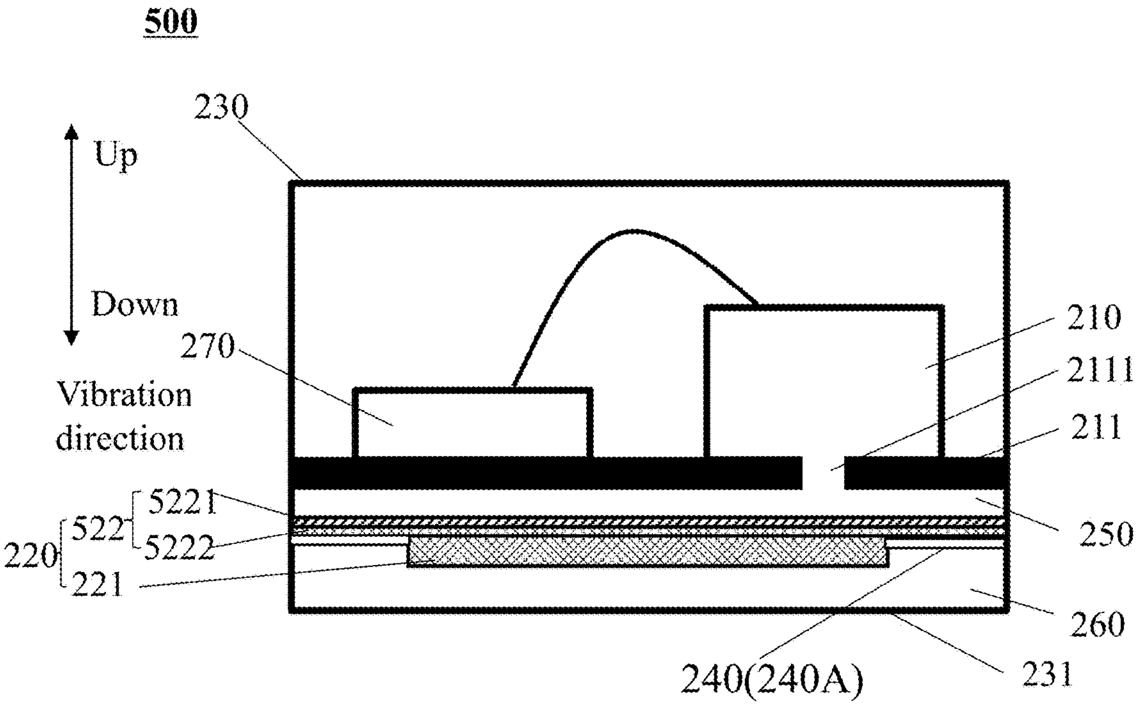
FIG. 6 is a schematic diagram illustrating an exemplary structure of a vibration sensor according to some embodiments of the present disclosure.
Figure 7A:
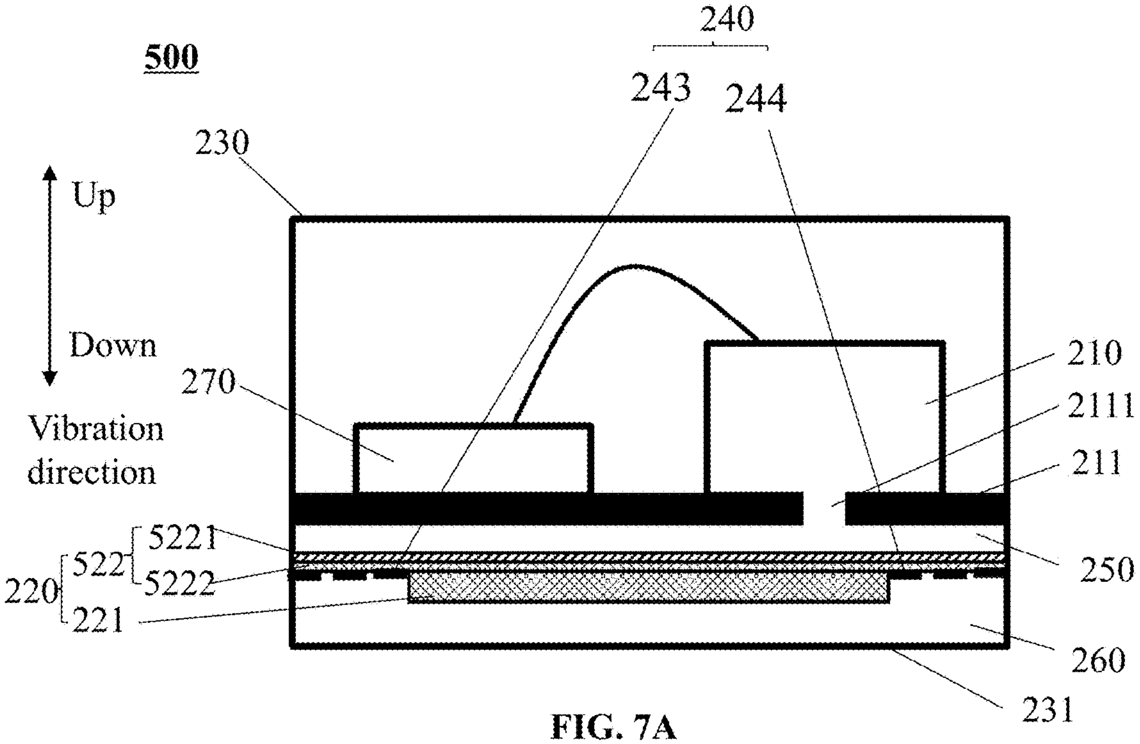
FIG. 7A is a schematic diagram illustrating an exemplary structure of a vibration sensor according to some embodiments of the present disclosure.
Figure 7B:
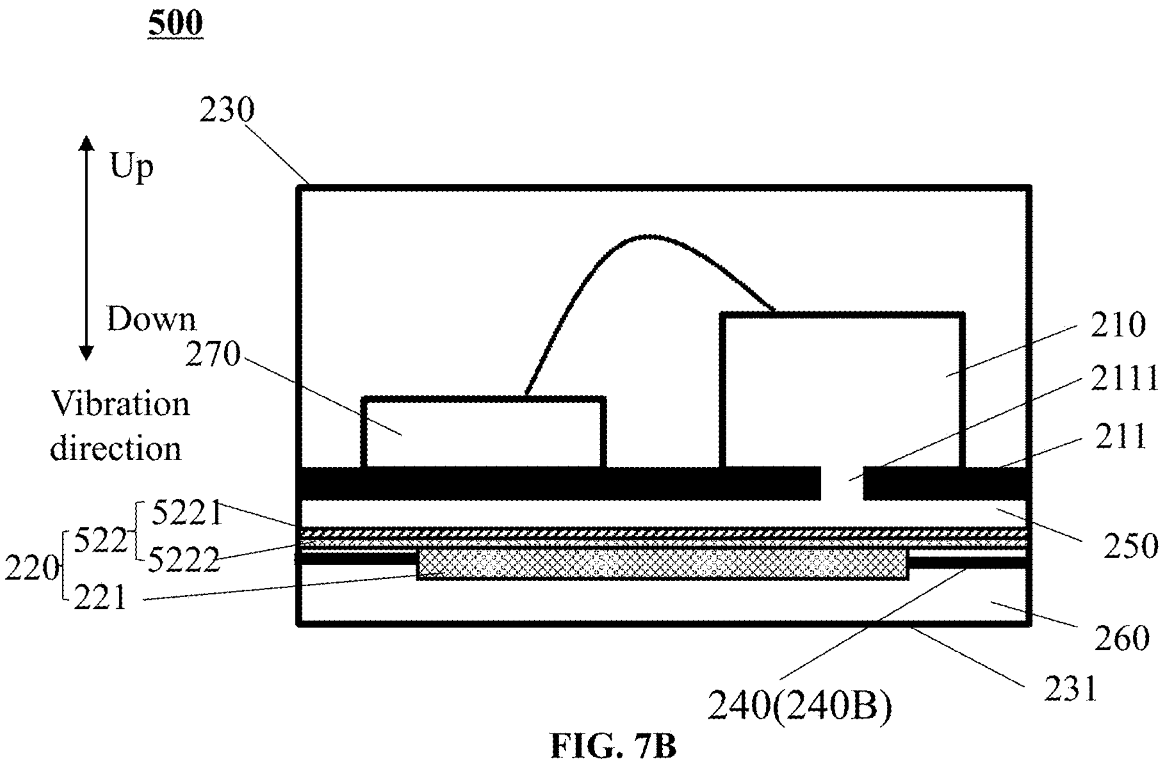
FIG. 7B is a schematic diagram illustrating an exemplary structure of a vibration sensor according to some embodiments of the present disclosure.

FIG. 5 is a schematic diagram illustrating an exemplary structure of a vibration sensor according to some embodiments of the present disclosure. FIG. 6 is a schematic diagram illustrating an exemplary structure of a vibration sensor according to some embodiments of the present disclosure. FIG. 7A is a schematic diagram illustrating an exemplary structure of a vibration sensor according to some embodiments of the present disclosure. FIG. 7B is a schematic diagram illustrating an exemplary structure of a vibration sensor according to some embodiments of the present disclosure.

A structure of a vibration sensor 500 illustrated in FIGS. 5-7B is substantially the same as a structure of the vibration sensor 200 illustrated in FIGS. 2-4B, except that elastic elements are different. In some embodiments, as illustrated in FIGS. 5-7B, an elastic element 522 may be a multi-layer composite elastic element. The elastic element 522 may include a first elastic element 5221 and a second elastic element 5222. In some embodiments, the first elastic element 5221 and the second elastic element 5222 may be made of the same or different materials. In some embodiments, a stiffness of the first elastic element 5221 may be different from a stiffness of the second elastic element 5222. For example, the stiffness of the first elastic element 5221 may be greater or smaller than the stiffness of the second elastic element 5222. In the embodiment, taking the stiffness of the first elastic element 5221 greater than that of the second elastic element 5222 as an example, the second elastic element 5222 may provide a required damping for the vibration assembly 220. A higher stiffness of the first elastic element 5221 may ensure that the elastic element 522 has a higher strength, thereby ensuring the reliability of the vibration assembly 220 and even the entire vibration sensor 500.

It should be noted that a count of elastic elements included in the elastic element 522 illustrated in FIGS. 5-7B and related descriptions thereof are merely for exemplary description, which does not limit the present disclosure to the scope of the illustrated embodiments. In some embodiments, the count of elastic elements in the embodiment may also be more than two. For example, the count of elastic elements may be three layers, four layers, five layers, or more. Merely by way of example, the elastic element may include a first elastic element, a second elastic element, and a third elastic element connected in sequence from top to bottom. The material, the mechanical parameter, and the size of the first elastic element may be the same as those of the third elastic element, and the material, the mechanical parameter, and the dimension of the second elastic element may be different from those of the first elastic element or the third elastic element. For example, the stiffness of the first elastic element or the third elastic element may be greater than the stiffness of the second elastic element. In some embodiments, the mechanical parameter of the elastic element may be adjusted by adjusting the material, the mechanical parameter, the size, or the like, of the first elastic element, the second elastic element, and/or the third elastic element to ensure the stability of the vibration sensor 500.

The elastic element 522 may be configured as a multi-layer elastic element, which is convenient to adjust the stiffness of the elastic element 522. For example, the count of elastic elements (e.g., the first elastic element 5221 and/or the second elastic element 5222) may be increased or reduced to realize the adjustment of the stiffness and damping of the vibration assembly 220, so that the vibration sensor 500 may generate a new resonance peak in a desired frequency band (e.g., near the target frequency band) and improve the sensitivity of the vibration sensor 500 in a specific frequency range. In some embodiments, two adjacent elastic elements (e.g., the first elastic element 5221 and the second elastic element 5222) in the multi-layer composite elastic element may form the elastic element 522 through an adhesive connection.

In some embodiments, the mechanical parameter (e.g., the material, the Young's modulus, the tensile strength, the elongation at break, and the hardness shore A) of at least one elastic element (the first elastic element 5221 and/or the second elastic element 5222) in the elastic element 522 may be adjusted to adjust the stiffness of the elastic element 522, so that the vibration sensor 500 may obtain a more ideal frequency response to adjust the resonance frequency and sensitivity of the vibration sensor 500.

In some embodiments, the tensile strength of at least one elastic element in the elastic element 522 may be adjusted, so that the overall tensile strength of the elastic element 522 may be within a certain range to improve the vibration performance of the vibration assembly 220 within the desired frequency range and further improve the sensitivity of the vibration sensor 500. In some embodiments, the material, the thickness, or the size of the first elastic element 5221 and/or the second elastic element 5222 of the elastic element 522 may be adjusted, so that the overall tensile strength of the elastic element 522 may be within a range of 0.5 MPa~100 MPa. In some embodiments, the material or size of the first elastic element 5221 and/or the second elastic element 5222 of the elastic element 522 may be adjusted, so that the overall tensile strength of the elastic element 522 may be within a range of 5 MPa~90 MPa. In some embodiments, the material or size of the first elastic element 5221 and/or the second elastic element 5222 of the elastic element 522 may be adjusted, so that the overall tensile strength of the elastic element 522 may be within a range of 10 MPa~80 MPa. In some embodiments, the material or size of the first elastic element 5221 and/or the second elastic element 5222 of the elastic element 522 may be adjusted, so that the overall tensile strength of the elastic element 522 may be within a range of 20 MPa~70 MPa. In some embodiments, the material, the thickness, or the size of the first elastic element 5221 and/or the second elastic element 5222 of the elastic element 522 may be adjusted, so that the overall tensile strength of the elastic element 522 may be within a range of 30 MPa~60 MPa.

In some embodiments, the elongation at break of at least one elastic element in the elastic element 522 may be adjusted, so that the overall elongation at break of the elastic element 522 may be within a certain range to improve the sensitivity of the vibration sensor 500 within the desired frequency range. In some embodiments, the greater the elongation at break of at least one elastic element of the elastic element 522, the higher the sensitivity and the better the stability of the vibration sensor 500. In some embodiments, the overall elongation at break of the elastic element 522 may be within a range of 10%~600%. In some embodiments, the overall elongation at break of the elastic element 522 may be within a range of 20%~500%. In some embodiments, the overall elongation at break of the elastic element 522 may be within a range of 50%~400%. In some embodiments, the overall elongation at break of the elastic element 522 may be within a range of 80%~200%.

In some embodiments, the sensitivity of the vibration sensor 500 in a desired frequency range may be improved by adjusting the hardness of at least one elastic element in the elastic element 522, so that the overall hardness of the elastic element 522 may be within a certain range. In some embodiments, the lower the hardness of at least one elastic element in the elastic element 522 is, the higher the sensitivity of the vibration sensor 500 is. In some embodiments, the overall hardness Shore A of the elastic element 522 may be less than 200. In some embodiments, the overall hardness Shore A of the elastic element 522 may be less than 150. In some embodiments, the overall hardness Shore A of the elastic element 522 may be less than 100. In some embodiments, the overall hardness Shore A of the elastic element 522 may be less than 60. In some embodiments, the overall hardness Shore A of the elastic element 522 may be less than 30. In some embodiments, the overall hardness Shore A of the elastic element 522 may be less than 10.

In some embodiments, the sensitivity of the vibration sensor 500 may also be adjusted by adjusting the mechanical parameter (e.g., material, size, shape, etc.) of the mass element 221. More details about adjusting the mechanical parameter of the mass element 221 to adjust the sensitivity of the vibration sensor 500 may be found elsewhere in the present disclosure. For example, the sensitivity of the vibration sensor 500 may be adjusted by adjusting the mechanical parameter of the mass element 221 as illustrated in FIG. 2 and the related descriptions thereof.

In some embodiments, when parameters of the elastic element (e.g., the Young's modulus, the tensile strength, the hardness, the elongation at break, etc.) and volume or mass of the mass element are constant, the electrical signal of the vibration sensor may be increased by improving the elastic deformation efficiency of the elastic element, thereby improving the acoustic-electric conversion effect of the vibration sensor. In some embodiments, a contact area between the mass element and the elastic element may be reduced to increase the elastic deformation efficiency of the elastic element, thereby increasing the electrical signal output by the sensor device. More details may be found elsewhere in the present disclosure, such as FIG. 8, FIG. 9, and the related descriptions thereof.

In some embodiments, as illustrated in FIG. 5-FIG. 7B, the buffer member 240 may be arranged in the vibration sensor 500. The buffer member 240 may be connected with the vibration assembly 220. The buffer member 240 and the elastic element 522 may bear the impact force generated by the vibration of the mass element 221 during the vibration process of the vibration assembly 220. That is, the buffer member 240 may disperse the impact force of the mass element 221 acting on the elastic element 522 and improve the performance of the elastic element 522 against the impact of the mass element 221, thereby preventing the elastic element 522 from being damaged caused by a greater impact of the mass element 221, increasing the service life of the elastic element 522, and improving the reliability of the vibration sensor 500.

In some embodiments, as illustrated in FIG. 5, the structure and arrangement of the buffer member 240 are similar to those illustrated in FIG. 2. The buffer member 240 may include a buffer connection layer. An upper surface and a lower surface of the buffer connection layer along the vibration direction of the vibration assembly 220 may be connected to the second elastic element 5222 and the mass element 221 respectively, and the mass element 221 may be fixed on the second elastic element 5222 through the buffer connection layer. In some embodiments, the buffer connection layer may include a flexible film layer. The second elastic element 5222 may be connected to the mass element 221 through the flexible film layer directly. In some embodiments, the buffer connection layer may include an elastic connection sheet 241 and an adhesive layer 242. The adhesive layer 242 may be wrapped outside the elastic connection sheet 241. The buffer member 240 may be connected between the mass element 221 and the second elastic element 5222 through the adhesive layer 242.

In some embodiments, as illustrated in FIG. 6, the structure and arrangement of the buffer member 240 are similar to those illustrated in FIG. 3. In some embodiments, the buffer member 240 may include a buffer adhesive layer 240A. The buffer adhesive layer 240A may be arranged in a region of the elastic element 522 excluding a region corresponding to a projection region to the mass element along a vibration direction. In some embodiments, the buffer adhesive layer 240A and the mass element 221 may be arranged on the same side of the elastic element 522. For example, the buffer adhesive layer 240A and the mass element 221 may be arranged on the lower surface of the second elastic element 5222, and the buffer adhesive layer 240A may be arranged around the mass element 221 along the peripheral side of the mass element 221. In some embodiments, the buffer adhesive layer 240A and the mass element 221 may also be located on a side opposite to the elastic element 522. For example, the mass element 221 may be located on the lower surface of the second elastic element 5222, the buffer adhesive layer 240A may be located on the upper surface of the first elastic element 5221, and the buffer adhesive layer 240A may be arranged opposite to the mass element 221. The buffer adhesive layer 240A may be arranged around the projection region of the mass element 221 along the vibration direction on the upper surface of the first elastic element 5221, or the buffer adhesive layer 240A may completely cover the upper surface of the first elastic element 5221. In some embodiments, the buffer adhesive layer 240A may also be arranged on two sides of the elastic element 522. Specifically, on the two sides of the elastic element 522, that is, on the upper surface of the first elastic element 5221 and the lower surface of the second elastic element 5222, a region of the projection region of the mass element 221 that is not covered along the vibration direction may be provided with the buffer adhesive layer 240A.

In some embodiments, as illustrated in FIG. 7A, the structure and arrangement of the buffer member 240 are similar to those illustrated in FIG. 4A. The buffer member 240 may include the first extension arm 243 and the second extension arm 244. The first extension arm 243 and the second extension arm 244 may be arranged on the surface of the elastic element 522 where the mass element 221 is located. In some embodiments, an end of the first extension arm 243 may be connected to the mass element 221. In some embodiments, another end of the first extension arm 243 may be connected to the housing 230 or the supporting member, and the first extension arm 243 may be arranged in a spiral shape along the circumferential direction of the elastic element 522 from the mass element 221 to the edge of the elastic element 522. An end of the second extension arm 244 may be connected to the mass element 221. In some embodiments, another end of the second extension arm 244 may be connected to the housing 230 or the supporting member arranged on the housing 230, and the second extension arm 244 may be arranged in a spiral shape along the circumferential direction of the elastic element 522 from the mass element 221 to the edge of the elastic element 522. In some embodiments, a connection position of the second extension arm 244 connected to the mass element 221 may be different from a connection position of the first extension arm 243 connected to the mass element 221.

In some embodiments, as illustrated FIG. 7B, the structure and arrangement of the buffer member 240 are similar to those illustrated in FIG. 4B. The buffer member 240 may include a cantilever beam 240B. The cantilever beam 240B may be located on a side of the mass element 221. An end of the cantilever beam 240B may be connected to the housing 230 or the supporting member arranged on the housing 230, and another end of the cantilever beam 240B may be connected to the mass element 221. During the vibration process of the vibration assembly 220, the cantilever beam 240B may vibrate under the action of the mass element 221. In some embodiments, a gap may be formed between the cantilever beam 240B and the second elastic element 5222, so that the vibration of the cantilever beam 240B may not interfere with the vibration of the second elastic element 5222 to avoid affecting the mechanical property of the elastic element 522.

Figure 8:
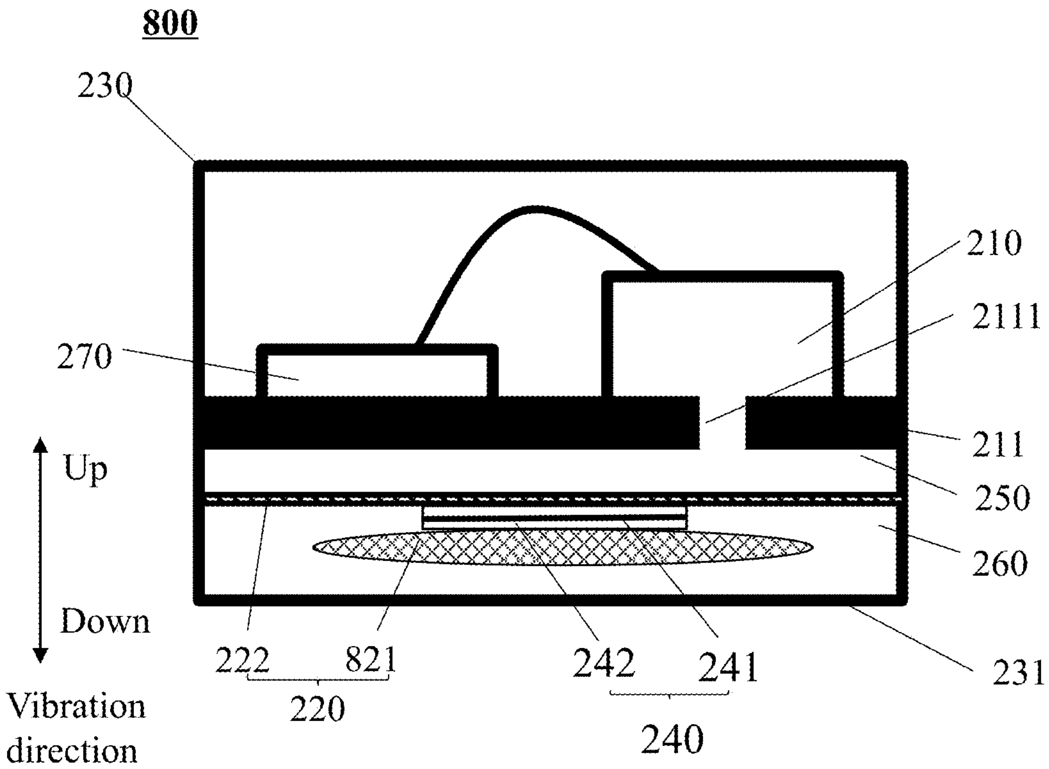
FIG. 8 is a schematic diagram illustrating an exemplary structure of a vibration sensor according to some embodiments of the present disclosure.
Figure 9:
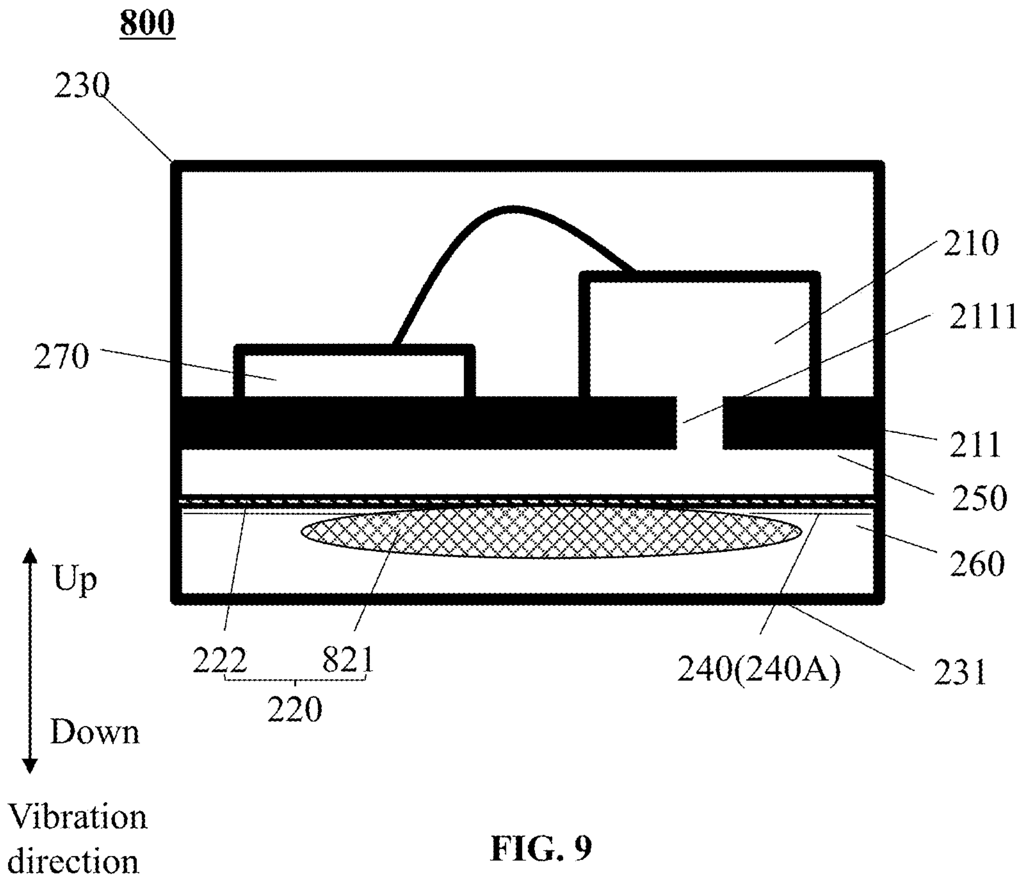
FIG. 9 is a schematic diagram illustrating an exemplary structure of a vibration sensor according to some embodiments of the present disclosure.

FIG. 8 is a schematic diagram illustrating an exemplary structure of a vibration sensor according to some embodiments of the present disclosure. FIG. 9 is a schematic diagram illustrating an exemplary structure of a vibration sensor according to some embodiments of the present disclosure.

A structure of a vibration sensor 800 illustrated in FIGS. 8-9 is substantially the same as the structure of the vibration sensor 200 illustrated in FIGS. 2-4B, except that the mass elements are different. In some embodiments, as illustrated in FIG. 8-FIG. 9, a mass element 821 may be an ellipsoid. A contact area between the mass element 821 and the elastic element 222 may be smaller than a projection area of the mass element 821 on the elastic element 222, which ensures that the contact area may be smaller when a volume or mass of the mass element 821 is the same as those of the elastic element 222. When the vibration of the housing 230 of the vibration sensor 800 drives the mass element 821 to vibrate, a deformation of the contact area between the elastic element 222 and the mass element 821 may be approximately regarded as not occurring. The contact area between the elastic element 222 and the mass element 821 may be reduced to increase an area where the elastic element 222 does not contact the mass element 821, thereby increasing an area (i.e., an area of a region where the elastic element 222 does not contact the mass element 821) of a region where the elastic element 222 deforms during the vibration process and increasing the amount of compressed air in the first acoustic chamber 250, so that the acoustic transducer 210 may output a larger electrical signal to improve the acoustic-electric conversion effect of the vibration sensor 800.

In some embodiments, the mass element 821 may also be a trapezoidal body. A side of the trapezoidal body with a smaller area may be connected to the elastic element 222, so that the contact area between the mass element 821 and the elastic element 222 may be smaller than the projection area of the mass element 821 on the elastic element 222. In some embodiments, the mass element 821 may also be an arch structure. When the mass element 821 is in a shape of the arch structure, two arch feet of the arch structure may be connected to an upper surface or a lower surface of the elastic element 822. A contact area between the two arch feet and the elastic element 222 may be smaller than a projection area of an arch waist on the elastic element 222. That is, the contact area between the mass element 821 in the shape of the arch structure and the elastic element 222 may be smaller than the projection area of the mass element 821 on the elastic element 222. It should be noted that in the embodiment, any regular or irregular shape or structure that satisfies a requirement that the contact area between the mass element 821 and the elastic element is smaller than the projection area of the mass element 821 on the elastic element 222 may belong to the variation of the embodiment of the present disclosure, which is not limited herein.

In some embodiments, the mass element 821 may be a solid structure. For example, the mass element 821 may be a regular or irregular structure such as a solid cylinder, a solid cuboid, a solid ellipsoid, a solid triangle, or the like. In some embodiments, to reduce the contact area between the mass element 821 and the elastic element 222 and improve the sensitivity of the vibration sensor 800 in a specific frequency range under a condition that the mass of the mass element 821 is not changed, the mass element 821 may also be a partially hollow structure. For example, the mass element 821 may be an annular cylinder, a rectangular cylindrical structure, or the like.

In some embodiments, the mass element 821 may include a plurality of sub-mass blocks separated from each other and the plurality of sub-mass blocks may be located in different regions of the elastic element 222. In some embodiments, the mass element 821 may include two or more sub-mass elements separated from each other. For example, a count of the sub-mass elements may be 3, 4, 5, or the like. In some embodiments, the mass, size, shape, material, or the like, of the plurality of separated sub-mass elements may be the same or different. In some embodiments, the plurality of separated sub-mass elements may be distributed on the elastic element 222 at equal intervals, at uneven intervals, symmetrically, or asymmetrically. In some embodiments, the plurality of separated sub-mass elements may be arranged on the upper surface and/or the lower surface of the elastic element 222. The plurality of separated sub-mass elements may be arranged in the middle region of the elastic element 222, which not only increases an area of a deformation region of the elastic element 222 under the vibration driven by the housing 230 but also improves the deformation efficiency of the elastic element 222, so that the sensitivity of the vibration sensor 800 and the reliability of the vibration assembly 220 and the vibration sensor 800 may be improved. In some embodiments, a parameter such as the mass, size, shape, material, or the like, of the plurality of mass elements may be adjusted so that the plurality of sub-mass elements may have different frequency responses, thereby further improving the sensitivity of the vibration sensor 800 in different frequency ranges.

In some embodiments, as illustrated in FIGS. 8-9, the buffer member 240 may be arranged in the vibration sensor 800. The buffer member 240 may be connected to the vibration assembly 220. During the vibration process of the vibration assembly 220, the buffer member 240 and the elastic element 222 may bear the impact force generated by the vibration of the mass element 821. That is, the buffer member 240 may disperse the impact force of the mass element 821 acting on the elastic element 222 and improve the performance of the elastic element 222 against the impact of the mass element 821, thereby preventing the elastic element 222 from being damaged caused by a greater impact of the mass element 821, increasing the service life of the elastic element 222, and improving the reliability of the vibration sensor 800.

In some embodiments, as illustrated in FIG. 8, the structure and arrangement of the buffer member 240 are similar to those illustrated in FIG. 2. The buffer member 240 may include the buffer connection layer. The upper surface and the lower surface of the buffer connection layer along the vibration direction of the vibration assembly 220 may be connected to the elastic element 222 and the mass element 821 respectively, and the mass element 821 may be fixed on the elastic element 222 through the buffer connection layer. In some embodiments, the buffer connection layer may include the flexible film layer. The elastic element 222 may be connected to the mass element 821 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the mass element 821 and the elastic element 222 through the adhesive layer 242. In some embodiments, when the buffer member 240 is not provided, since the contact area between the mass element 821 and the elastic element 222 is smaller than the projection area of the mass element 821 on the elastic element 222, thus when the buffer member 240 is provided, the contact area between the buffer member 240 and the elastic element 222 may be different from the contact area between the buffer member 240 and the mass element 821. In some embodiments, the contact area between the buffer member 240 and the elastic element 222 may be greater than the contact area between the buffer member 240 and the mass element 821.

In some embodiments, as illustrated in FIG. 9, the structure and arrangement of the buffer member 240 are similar to those illustrated in FIG. 3. In some embodiments, the buffer member 240 may include a buffer adhesive layer 240A. The buffer adhesive layer 240A may be arranged in a region of the elastic element 222 excluding a region corresponding to a contact region between the mass element 821 and the elastic element 222. In some embodiments, the buffer adhesive layer 240A and the mass element 821 may be located on the same side of the elastic element 222. Specifically, the mass element 821 and the buffer adhesive layer 240A may be arranged on the same side of the elastic element 222. The buffer adhesive layer 240A may be arranged on the elastic element 222 to surround the contact region along the peripheral side of the contact region between the mass element 821 and the elastic element 222.

In some embodiments, the buffer adhesive layer 240A and the mass element 821 may also be located on the opposite side of the elastic element 222. Specifically, the mass element 821 may be located on a side of the elastic element 222, and the buffer adhesive layer 240A may be located on another side of the elastic element 222. The buffer adhesive layer 240A may be arranged opposite to the mass element 821. The buffer adhesive layer 240A may be arranged to surround the projection region on the side of the elastic element 222 along the peripheral side of the projection region of the contact region between the mass element 821 and the elastic element 222 along the vibration direction, or the buffer adhesive layer 240A may be arranged on the overall region of the side of the elastic element where the buffer adhesive layer 240A is located. In some embodiments, the buffer adhesive layer 240A may also be located on two sides of the elastic element 222. Specifically, on the two sides of the elastic element 222, the buffer adhesive layer 240A may be arranged on the contact region between the mass element 821 and the elastic element 222 and a region that is not covered by the projection region of the contact region along the vibration direction respectively.

Figure 10:
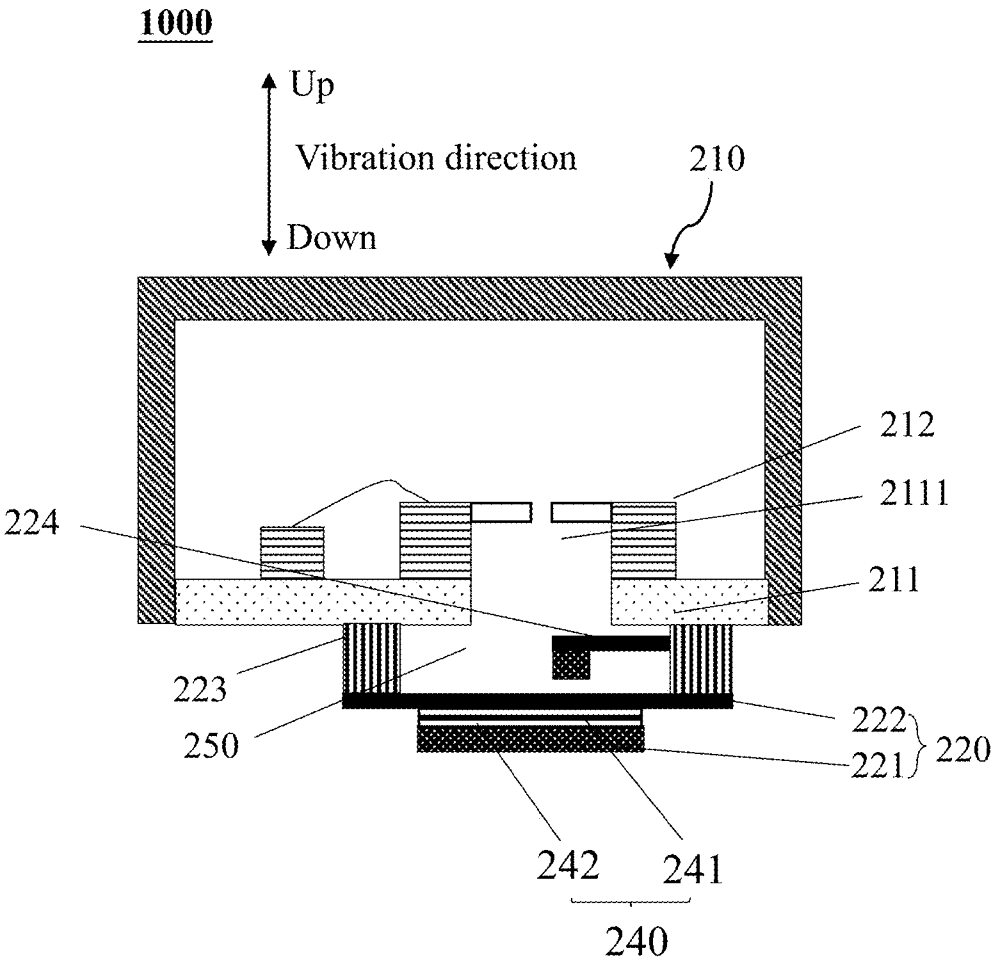
FIG. 10 is a schematic diagram illustrating an exemplary structure of a vibration sensor according to some embodiments of the present disclosure.
Figure 11:
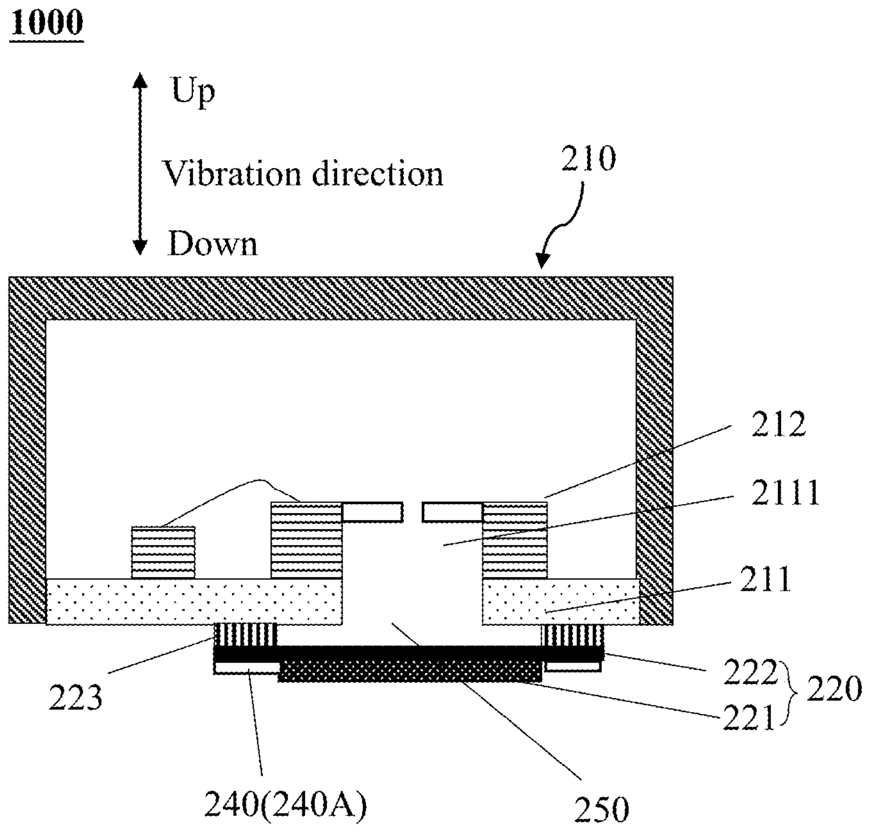
FIG. 11 is a schematic diagram illustrating an exemplary structure of a vibration sensor according to some embodiments of the present disclosure.
Figure 12A:
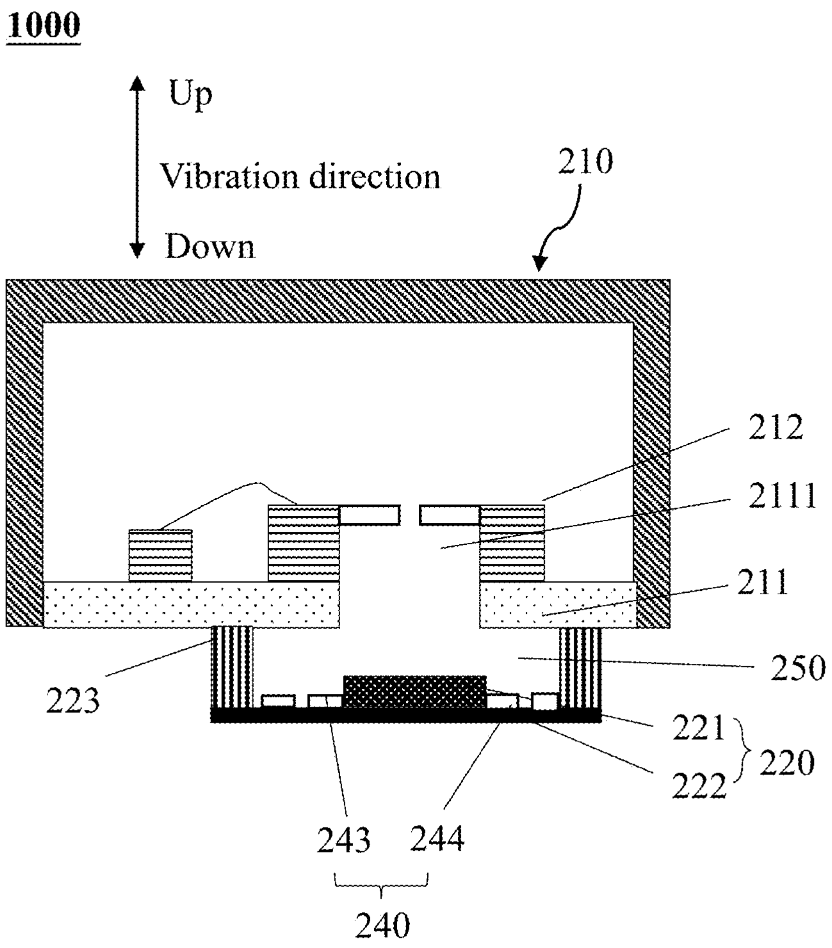
FIG. 12A is a schematic diagram illustrating an exemplary structure of a vibration sensor according to some embodiments of the present disclosure.
Figure 12B:
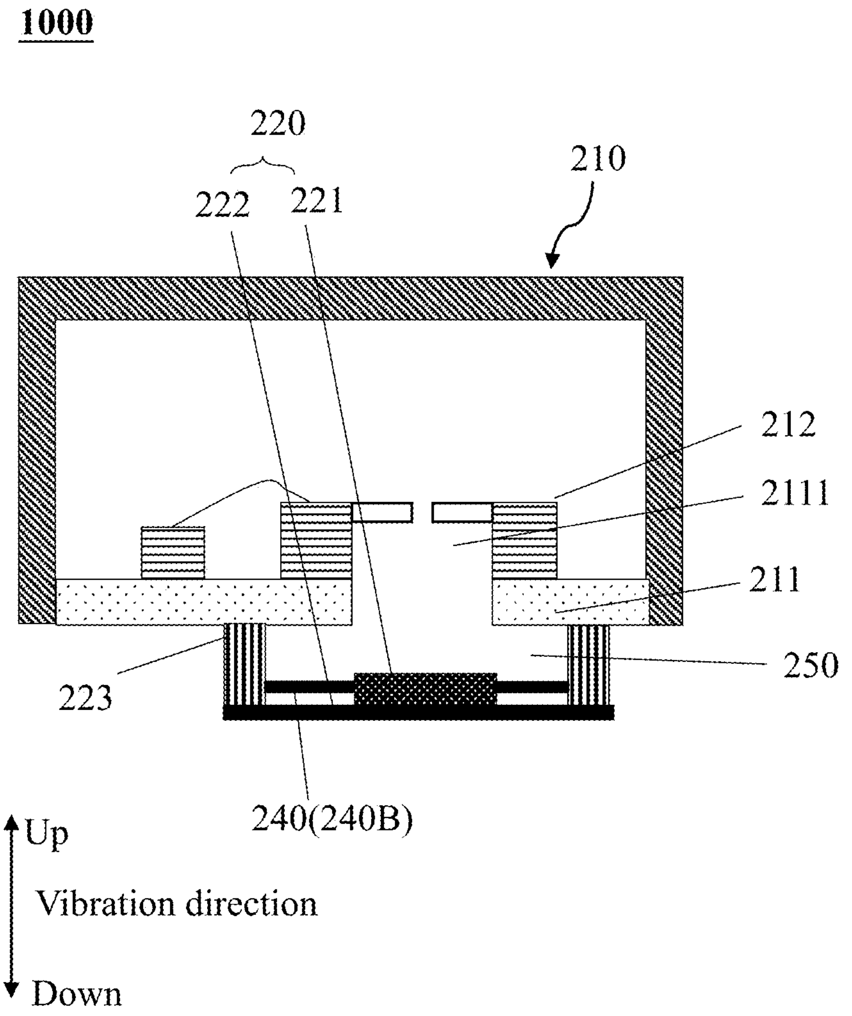
FIG. 12B is a schematic diagram illustrating an exemplary structure of a vibration sensor according to some embodiments of the present disclosure.
Figure 13:
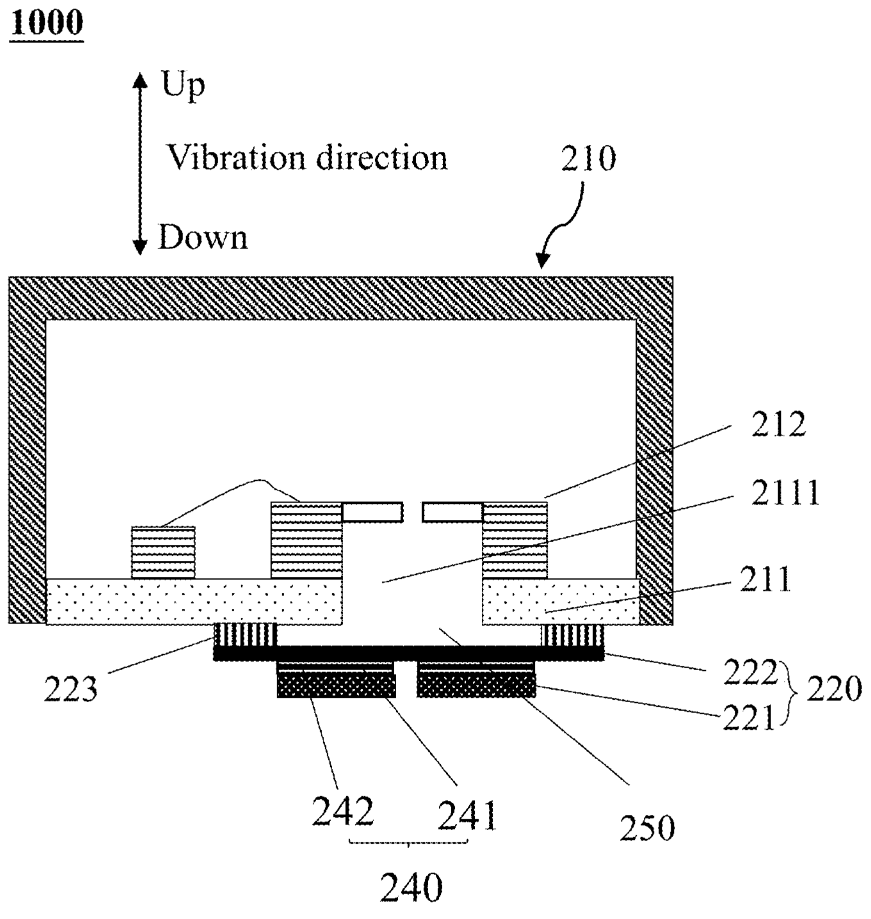
FIG. 13 is a schematic diagram illustrating an exemplary structure of a vibration sensor according to some embodiments of the present disclosure.
Figure 14:
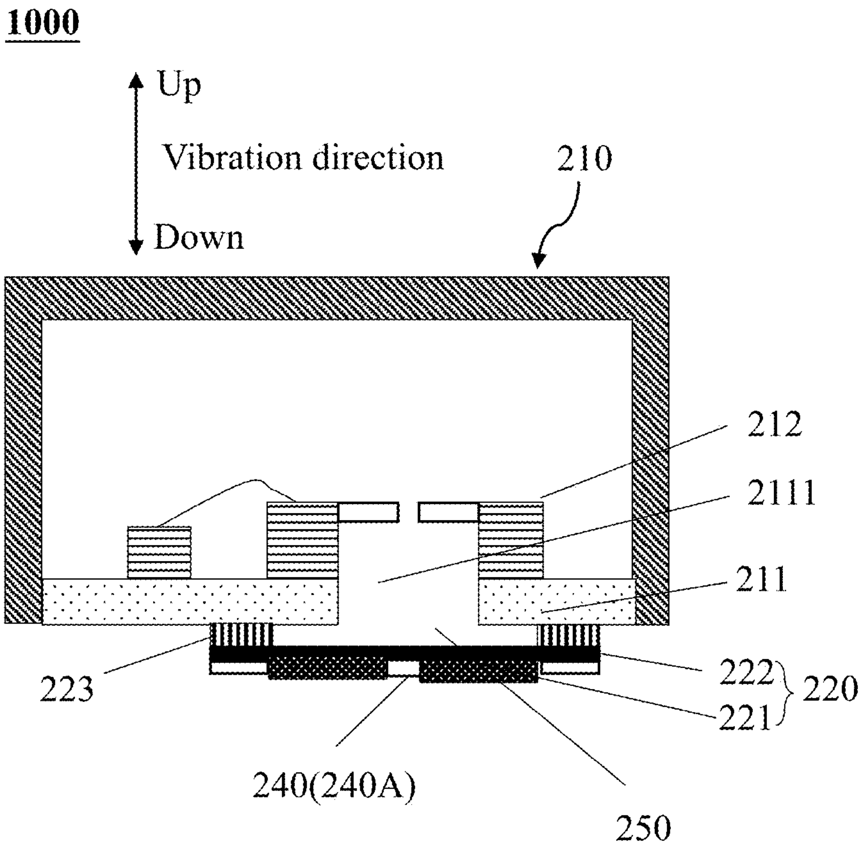
FIG. 14 is a schematic diagram illustrating an exemplary structure of a vibration sensor according to some embodiments of the present disclosure.

FIG. 10 is a schematic diagram illustrating an exemplary structure of a vibration sensor according to some embodiments of the present disclosure. FIG. 11 is a schematic diagram illustrating an exemplary structure of a vibration sensor according to some embodiments of the present disclosure. FIG. 12A is a schematic diagram illustrating an exemplary structure of a vibration sensor according to some embodiments of the present disclosure. FIG. 12B is a schematic diagram illustrating an exemplary structure of a vibration sensor according to some embodiments of the present disclosure. FIG. 13 is a schematic diagram illustrating an exemplary structure of a vibration sensor according to some embodiments of the present disclosure. FIG. 14 is a schematic diagram illustrating an exemplary structure of a vibration sensor according to some embodiments of the present disclosure.

In some embodiments, as illustrated in FIGS. 10-12B, a vibration sensor 1000 may include the acoustic transducer 210 and the vibration assembly 220. A difference between the vibration sensor 1000 illustrated in FIGS. 10-12B and the vibration sensor 200 illustrated in FIG. 2 may be that the vibration assembly 220 is arranged in a sound inlet 2111 of the acoustic transducer 210 along the vibration direction of the vibration assembly 220 or arranged on an outer side of the sound inlet 2111 as illustrated in FIGS. 10-12B. A first acoustic chamber 250 may be formed between the vibration assembly 220 and a substrate 211 of the acoustic transducer 210.

In some embodiments, the vibration assembly 220 may include the elastic element 222 and the mass element 221. In some embodiments, the elastic element 222 may include a plate-shaped structure connected to the mass element 221. In some embodiments, the plate-shaped structure may be connected to the mass element 221 by clamping, bonding, integral molding, or the like, which is not limited herein. In some embodiments, the elastic element 222 may be arranged to be air-permeable or air-impermeable. Merely by way of example, to achieve a better sound pick-up effect, in some embodiments, the elastic element 222 may be air-impermeable.

It should be noted that an elastic element or a plate-shaped structure illustrated in FIG. 10 is only for convenience of description, but does not limit the scope of the present disclosure. In some embodiments, the vibration assembly 220 may include a plurality of mass elements. In some embodiments, the plurality of mass elements may be arranged on two sides of the elastic element 222. In some embodiments, the plurality of mass elements may also be arranged on the same side of the elastic element 222.

In some embodiments, as illustrated in FIGS. 13-14, the vibration assembly 220 may include the elastic element 222 and two mass elements 221 arranged on the elastic element 222. In some embodiments, the structural parameters of the two mass elements 221 may be the same or different. In some embodiments, the two mass elements 221 may be connected to the elastic element 222 respectively, and the two mass elements 221 may be arranged on the same side of the elastic element 222 along the vibration direction. In some embodiments, the two mass elements 221 may be physically connected to the elastic element 222, and the two mass elements 221 may be arranged on two sides of the elastic element 222 along the vibration direction respectively. In some embodiments, the two mass elements 221 may have the same cross-sectional shape in the vibration direction, such as a circular shape. In some embodiments, the two mass elements 221 may have different heights in a horizontal direction (a direction perpendicular to the vibration direction). The two mass elements 221 may make the vibration assembly 220 have a plurality of vibration modes in the target frequency band, so that the frequency response curve of the vibration sensor 1000 may have two resonance peaks, thereby increasing the frequency range of high sensitivity of the vibration sensor 1000. Accordingly, the sensitivity of the vibration sensor 1000 in the frequency range (i.e., the target frequency band) near the two resonance frequencies may be improved to achieve the effect of expanding the bandwidth of the frequency band and improving the sensitivity.

In some embodiments, by setting parameters of the elastic element 222 and the plurality of mass elements 221, at least two resonance peaks may be formed on the frequency response curve of the vibration sensor 1000 including the vibration assembly 220, thereby forming a plurality of high-sensitivity frequency ranges and wider frequency bands. In some embodiments, a plurality of resonance frequencies of the elastic element 222 and the plurality of mass elements 221 physically connected to the elastic element 222 may be related to parameters of the elastic element 222 and/or the mass elements 221. The parameters may include at least one of a Young's modulus of the elastic element 222, a volume of a chamber formed between the acoustic transducer 210 and the elastic element 222, a radius of the mass element 221, a height of the mass element 221, and a density of the mass element 221.

In some embodiments, the parameters of the two mass elements 221, such as the height in the vibration direction, may satisfy a preset ratio. In some embodiments, a height ratio of the two mass elements 221 may be 3:2, 2:1, 3:4, 3:1, or the like.

It should be noted that the count of mass elements connected to the elastic element 222 may not be limited to two, which also may be three, four, or more than five. In some embodiments, the plurality of mass elements 221 may be arranged in a collinear manner or not. Taking three mass elements 221 arranged on the elastic element 222 as an example, the three mass elements 221 may not be arranged in a collinear manner on the elastic element 222. It should be understood that when the vibration assembly 220 includes three mass elements 221, connecting lines between each two of the three mass elements 221 may not overlap with each other. In some embodiments, the three mass elements 221 may be distributed in a triangle, and distances between any two mass elements 221 may be the same. In some embodiments, the three mass elements 221 may improve the sensitivity of the vibration assembly 220 in frequency intervals near at least two frequency points in the target frequency band, thereby achieving the effect of expanding the bandwidth of the frequency band and improving the sensitivity. Taking four mass elements 221 arranged on the elastic element 222 as an example, the four mass elements 221 may be arranged in an array (e.g., a circular array or a rectangular array). In some embodiments, at least two mass elements 221 among the four mass elements 221 may have different resonance peaks. In some embodiments, when the vibration assembly 220 includes four or more mass elements 221, connecting lines between center points of any two mass elements 221 on the elastic element 222 may not coincide as a straight line.

In some embodiments, the elastic element 222 and the plurality of mass elements 221 physically connected to the elastic element 222 may correspond to multiple target frequency bands in one or more different target frequency bands, so that the sensitivity of the vibration sensor 1000 in the corresponding target frequency band may be greater than the sensitivity of the acoustic transducer 210. In some embodiments, the resonance frequencies of the elastic element 222 and the plurality of mass elements 221 physically connected to the elastic element 222 may be the same or different. In some embodiments, the sensitivity of the vibration sensor 1000 after adding one or more groups of mass elements 221 and elastic elements 222 may be increased by 3 dB~30 dB compared with the acoustic transducer 210 in the target frequency band. In some embodiments, a manner for measuring the sensitivity of the vibration sensor 100 and the acoustic transducer 110 may include collecting an electrical signal (e.g., −30 dBV) of a device under the excitation of a given acceleration (e.g., 1 g and g is an acceleration of gravity). Then the sensitivity can be −30 dBV/g. In some embodiments, if the acoustic transducer 110 is an air-conduction microphone, when measuring the sensitivity, the excitation source illustrated above may be replaced with sound pressure. That is, the sound pressure in the specified frequency band may be input as the excitation to measure and collect the electrical signal of the device. It should be noted that, in some embodiments, the sensitivity of the vibration sensor 1000 after adding the vibration assembly 220 may be increased by more than 30 dB compared with that of the acoustic transducer 210, for example, the plurality of mass elements 221 connected to the elastic element 222 in a physical connection have a same resonance peak.

In some embodiments, as illustrated in FIGS. 10-14, the vibration assembly 220 may further include a supporting member 223 configured to support one or more groups of elastic elements 222 and mass elements 221. The supporting member 223 may be arranged between the substrate 211 of the acoustic transducer 210 and the vibration assembly 220. An upper surface of the supporting member 223 may be connected to the substrate 211, and a lower surface of the supporting member 223 may be connected to the elastic element 222. The first acoustic chamber 250 may be formed through the supporting member 223, the substrate 211, and the elastic element 222.

In some embodiments, the supporting member 223 may be made of an air-impermeable material. The supporting member 223 made of the air-impermeable material may cause a change of the sound pressure (or air vibration) in the supporting member 223 during the transmission of the vibration signal in the air, so that an internal vibration signal of the supporting member 223 may be transmitted to the inside of the acoustic transducer 210 through the sound inlet 2111. During the transmission process, the internal vibration signal can not diffuse outward through the supporting member 223, thereby ensuring the sound pressure intensity and improving the sound transmission effect.

In some embodiments, in a direction (i.e., the vibration direction) perpendicular to a connecting plane between the elastic element 222 and the mass element 221, the projection region of the mass element 221 may not overlap with the projection region of the supporting member 223. The arrangement illustrated above is to prevent the vibration of the elastic element 222 and the mass element 221 from being restricted by the supporting member 223. In some embodiments, a shape of a cross-section of the elastic element 222 along the vibration direction may include a circular shape, a rectangular shape, a triangular shape, an irregular shape, or the like. In some embodiments, the shape of the elastic element 222 may also be arranged based on a shape of the supporting member 223, which is not limited herein. In some embodiments, to prevent an excessive concentration of stress at a corner point caused by an excessive non-smooth curve, the elastic element 222 may be arranged as a circular shape in the embodiments of the present disclosure.

In some embodiments, as illustrated in FIG. 10, the structure and arrangement of the buffer member 240 are similar to those illustrated in FIG. 2. The buffer member 240 may include the buffer connection layer. The upper surface and the lower surface of the buffer connection layer along the vibration direction of the vibration assembly 220 may be connected to the elastic element 222 and the mass element 221 respectively, and the mass element 221 may be fixed on the elastic element 222 through the buffer connection layer. In some embodiments, the buffer connection layer may include the flexible film layer. The elastic element 222 may be connected to the mass element 221 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the mass element 221 and the elastic element 222 through the adhesive layer 242.

In some embodiments, as illustrated in FIG. 13, when the vibration assembly 220 includes a plurality of mass elements 221, the buffer connection layer of the buffer member 240 may be located between the elastic element 222 and each mass element 221, and each mass element 221 may be fixed on the elastic element 222 through the buffer connection layer respectively. In some embodiments, the buffer member 240 and the elastic element 222 may bear the impact force generated by the vibration of the mass element 221. That is, the buffer member 240 may disperse the impact force of the plurality of mass elements 221 acting on the elastic element 222 and improve the performance of the elastic element 222 against the impact of the mass elements 221, thereby improving the reliability of the vibration sensor 1000.

In some embodiments, as illustrated in FIG. 11, the structure and arrangement of the buffer member 240 are similar to those illustrated in FIG. 3. In some embodiments, the buffer member 240 may include the buffer adhesive layer 240A. The buffer adhesive layer 240A may be arranged on a region of the elastic element 222 excluding a region corresponding to the projection region of the mass element 221 along the vibration direction. In some embodiments, the buffer adhesive layer 240A and the mass element 221 may be located on the same side of the elastic element 222. In some embodiments, the buffer adhesive layer 240A and the mass element 221 may also be located on opposite sides of the elastic element 222. In some embodiments, the buffer adhesive layer 240A may also be located on two sides of the elastic element 222.

In some embodiments, as illustrated in FIG. 14, when the vibration assembly 220 includes a plurality of mass elements 221, the buffer adhesive layer 240A may be arranged in a region of the elastic element 222 excluding a region corresponding to the projection region of each of the plurality of mass elements 221 along the vibration direction. More details about the arrangement of the buffer adhesive layer 240A may be found elsewhere in the present disclosure, such as FIG. 3 and the related descriptions thereof, which are not repeated herein.

In some embodiments, as illustrated in FIG. 12A, the structure and arrangement of the buffer member 240 are similar to those illustrated in FIG. 4A. The buffer member 240 may include the first extension arm 243 arranged on the surface of the elastic element 222 where the mass element 221 is located. The first extension arm 243 and the mass element 221 may be located at the inner side of the supporting member 223. In some embodiments, an end of the first extension arm 243 may be connected to the mass element 221. In some embodiments, another end of the first extension arm 243 may be connected to the supporting member 223. The first extension arm 243 may be arranged in a spiral shape along the circumferential direction of the elastic element 222 from the mass element 221 to the edge of the elastic element 222. In some embodiments, the buffer member 240 may include the second extension arm 244. The second extension arm 244 may be on the surface of the elastic element 222 where the mass element 221 is located. The second extension arm 244 and the mass element 221 may be located at the inner side of the supporting member 223. In some embodiments, an end of the second extension arm 244 may be connected to the mass member 221. In some embodiments, another end of the second extension arm 244 may be connected to the supporting member 223. The second extension arm 244 may be arranged in a spiral shape along the circumferential direction of the elastic element 222 from the mass element 221 to the edge of the elastic element 222.

In some embodiments, under the arrangement illustrated in FIG. 12A, the surface of the elastic element 222 provided with the mass element 221 may be provided with the buffer member 240 (e.g., the first extension arm 243 and the second extension arm 243). An end of the buffer member 240 may be connected to the mass element 221. The buffer member 240 and the mass element 221 may provide the mass for the vibration assembly 220. Since the first extension arm 243 and/or the second extension arm 244 are arranged in a spiral shape along the circumferential direction of the elastic element 222 from the mass element 221 to the edge of the elastic element 222, the length of the first extension arm 243 and/or the length of the second extension arm 243 may be increased, so that when the mass element 221 vibrates, the first extension arm 243 and/or the second extension arm 244 may disperse the impact of the mass element 221 acting on the elastic element 222 to the surroundings of the mass element 221, thereby avoiding a too concentrated impact acting on the elastic element 222 caused by the mass element 221 and improving the reliability of the vibration sensor 1000.

In some embodiments, as illustrated in FIG. 12B, the structure and arrangement of the buffer member 240 are similar to those illustrated in FIG. 4B. The buffer member 240 may include a cantilever beam 240B. The cantilever beam 240B may be arranged on a side of the mass element 221. An end of the cantilever beam 240B may be connected to the supporting member 223, and another end of the cantilever beam 240B may be connected to the mass element 221. During the vibration of the vibration assembly 220, the cantilever beam 240B may vibrate under the action of the mass element 221 and the supporting member 223. In some embodiments, a gap may be formed between the cantilever beam 240B and the elastic element 222, so that the vibration of the cantilever beam 240B may not interfere with the vibration of the elastic element 222, thereby avoiding the influence on the mechanical property of the elastic element 222.

In some embodiments, under the arrangement illustrated in FIG. 12B, the supporting member 223 and the mass element 221 of the vibration assembly 220 may be connected through the cantilever beam 240B. When the mass element 221 vibrates, the elastic element 222 and the cantilever beam 240B may bear the impact force generated by the vibration of the mass element 221 during the vibration process, thereby reducing the impact acting on the elastic element 222 caused by the vibration of the mass element 221, dispersing the impact of the mass element 221 acting on the elastic element 222, preventing the elastic element 222 from being damaged, and improving the reliability of the vibration sensor 1000.

In some embodiments, as illustrated in FIG. 10, in order to arrange a plurality of groups of vibration structures in a small volume space, the vibration assembly 220 may further include one or more cantilever beam structures 224. The one or more cantilever beam structures 224 may be arranged in the first acoustic chamber 250. An end of the cantilever beam structure(s) 224 may be physically connected to a side of the supporting member 223, and the other end may be a free end. The free end of the cantilever beam structure(s) 224 may be physically connected with one or more mass blocks. Specifically, the physical connection manner between the cantilever beam structure(s) 224 and the supporting member 223 may include a connection manner such as welding, clamping, bonding, integral molding, or the like, which is not limited herein. In some embodiments, the vibration assembly 220 may not include the supporting member 223. The cantilever beam structure(s) 224 may be arranged in the sound inlet 2111 along a radial direction of the sound inlet 2111 (i.e., the vibration direction of the vibration assembly 220). A cross-section of the cantilever beam structure(s) 224 may be arranged inside the sound inlet 2111 or outside of the sound inlet 2111. The cantilever beam structure(s) 224 may not cover the sound inlet 2111 completely.

In some embodiments, the material of the cantilever beam structure(s) 224 may include metallic material and inorganic non-metallic material. The metallic material may include, but is not limited to, copper, aluminum, tin, or the like, or another alloy. The inorganic non-metallic material may include, but is not limited to, at least one of silicon, aluminum nitride, zinc oxide, lead zirconate titanate, or the like. In some embodiments, the mass element 221 may be arranged on any side of the cantilever beam structure(s) 224 along the vibration direction. In the embodiment, the illustration is provided under the condition that the mass element 221 is arranged on a side of the cantilever beam structure(s) 224 along the vibration direction that is away from the acoustic transducer (not shown in the figure).

In some embodiments, one or more mass elements 221 may be arranged on any side of the free end of the cantilever beam structure(s) 224 perpendicular to the vibration direction. The size of each mass element 221 may be partly or all the same, or all different from each other. In some embodiments, a distance between adjacent mass elements 221 may be the same or different. In some embodiments, when a plurality of mass elements 221 are arranged on the cantilever beam structure(s) 224, structural parameters of the plurality of mass elements 221 may be the same, partly the same, or different from each other. In actual usage, the structural parameters of the plurality of mass elements 221 may be designed according to a vibration modality.

In a process of a MEMS device, in some embodiments, a length of the cantilever beam structure(s) 224 may be within a range of 500 μm~1500 μm. In some embodiments, a thickness of the cantilever beam structure(s) 224 may be within a range of 0.5 μm~5 μm; In some embodiments, a side length of the mass element(s) 221 may be within a range of 50 μm~1000 μm. In some embodiments, a height of the mass element(s) 221 may be within a range of 50 μm~5000 μm. In some embodiments, the length of the cantilever beam structure(s) 224 may be within a range of 700 μm~1200 μm, and the thickness of the cantilever beam structure(s) 224 may be within a range of 0.8 μm~2.5 μm. The side length of the mass element(s) 221 may be within a range of 200 μm~600 μm, and the height of the mass element(s) 221 may be within a range of 200 μm~1000 μm.

In a macroscopic device, the length of the cantilever beam structure(s) 224 may be within a range of 1 mm~20 cm, and the thickness of the cantilever beam structure(s) 224 may be within a range of 0.1 mm~10 mm. In some embodiments, the side length of the mass element(s) 221 may be within a range of 0.2 mm~5 cm, and the height of the mass element(s) 221 may be within a range of 0.1 mm~10 mm. In some embodiments, the length of the cantilever beam structure(s) 224 may be within a range of 1.5 mm~10 mm, and the thickness of the cantilever beam structure(s) 224 may be within a range of 0.2 mm~5 mm. The side length of the mass element(s) 221 may be within a range of 0.3 mm~5 cm, and the height of the mass element(s) 221 may be within a range of 0.5 mm~5 cm.

Figure 15:
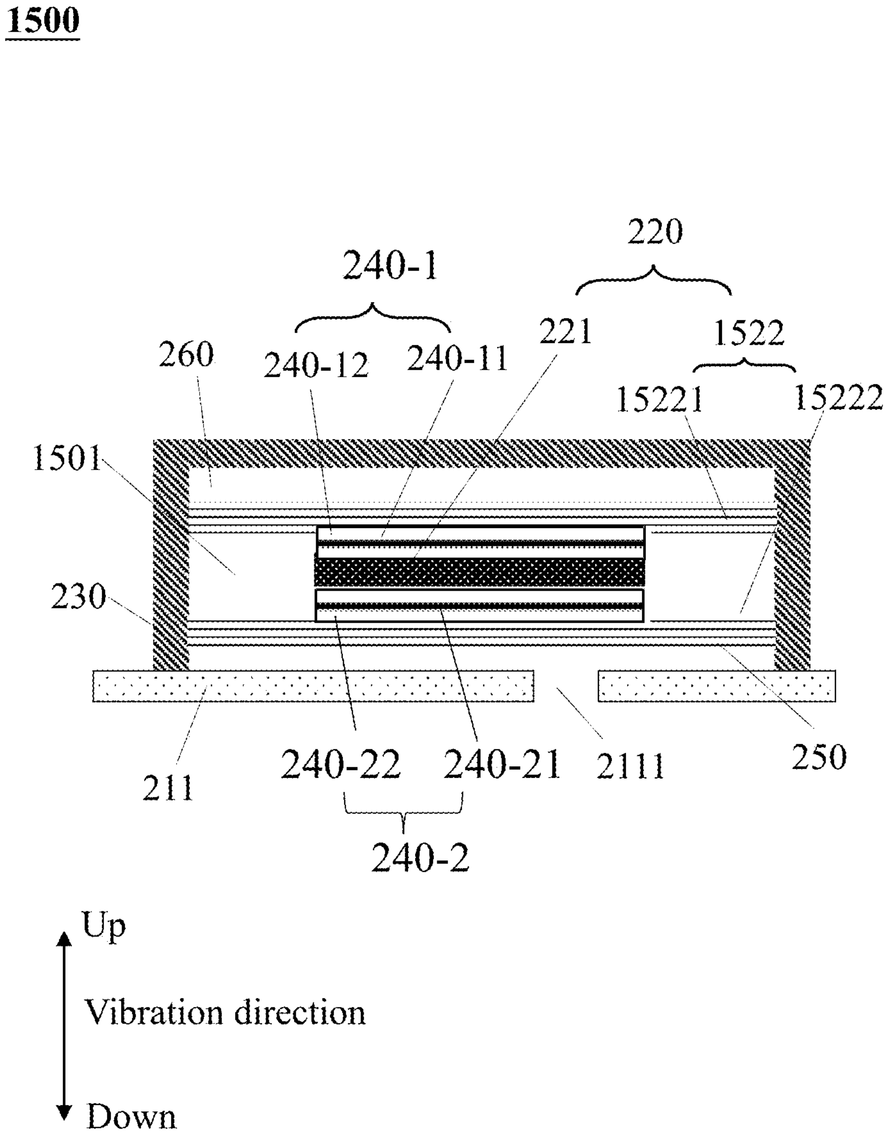
FIG. 15 is a schematic diagram illustrating an exemplary structure of a vibration sensor according to some embodiments of the present disclosure.
Figure 16:
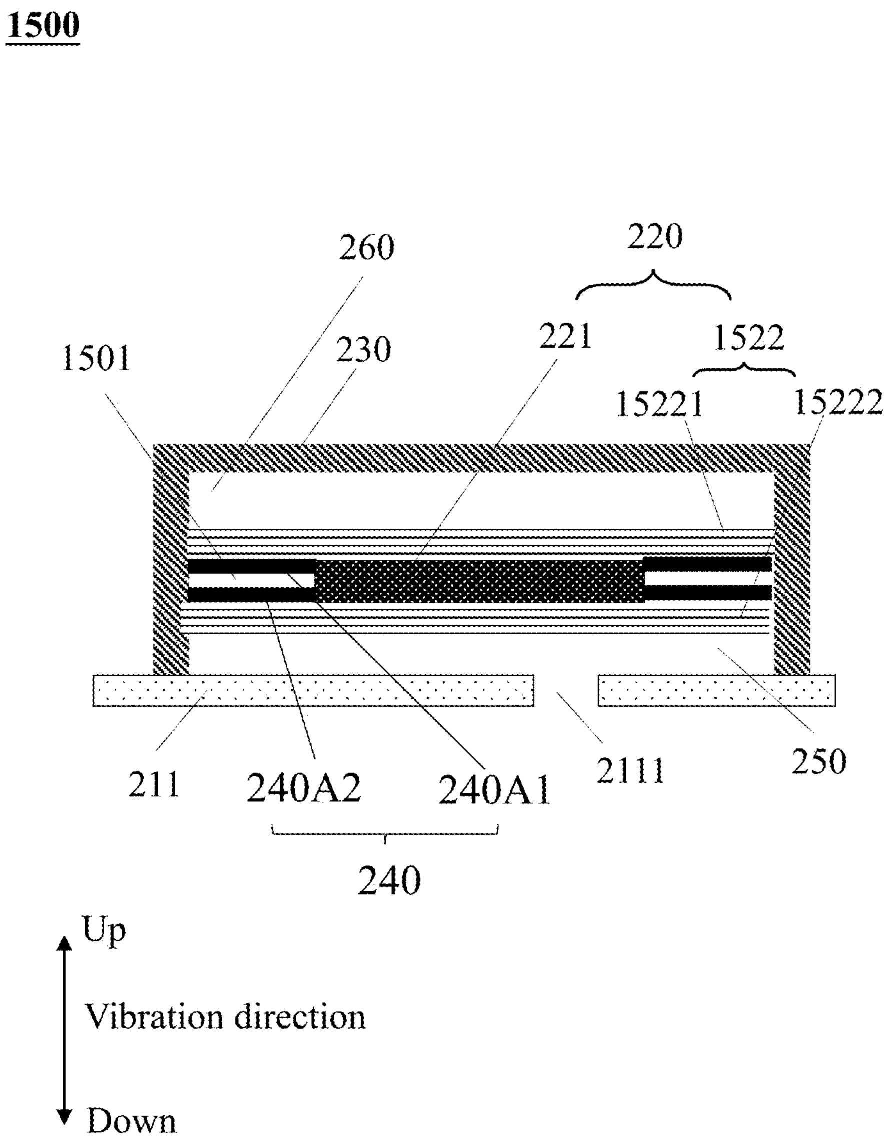
FIG. 16 is a schematic diagram illustrating an exemplary structure of a vibration sensor according to some embodiments of the present disclosure.
Figure 17A:
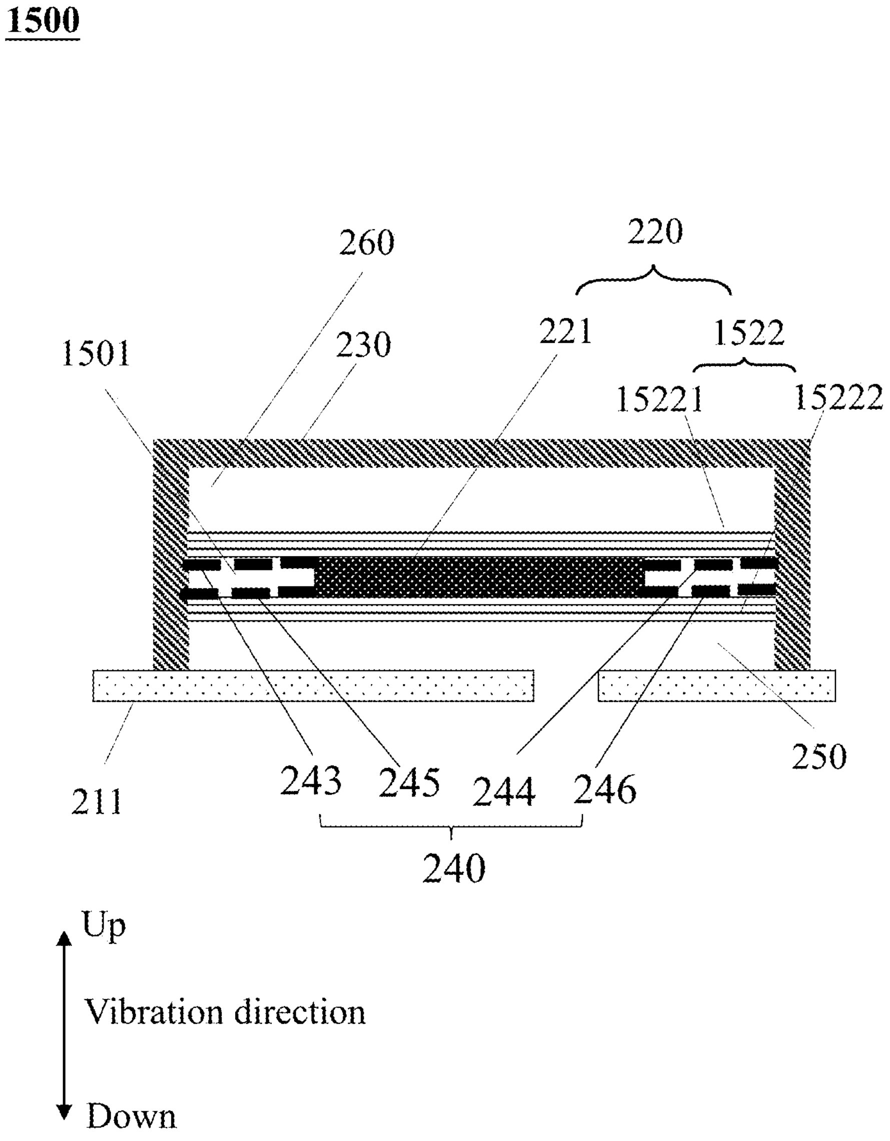
FIG. 17A is a schematic diagram illustrating an exemplary structure of a vibration sensor according to some embodiments of the present disclosure.
Figure 17B:
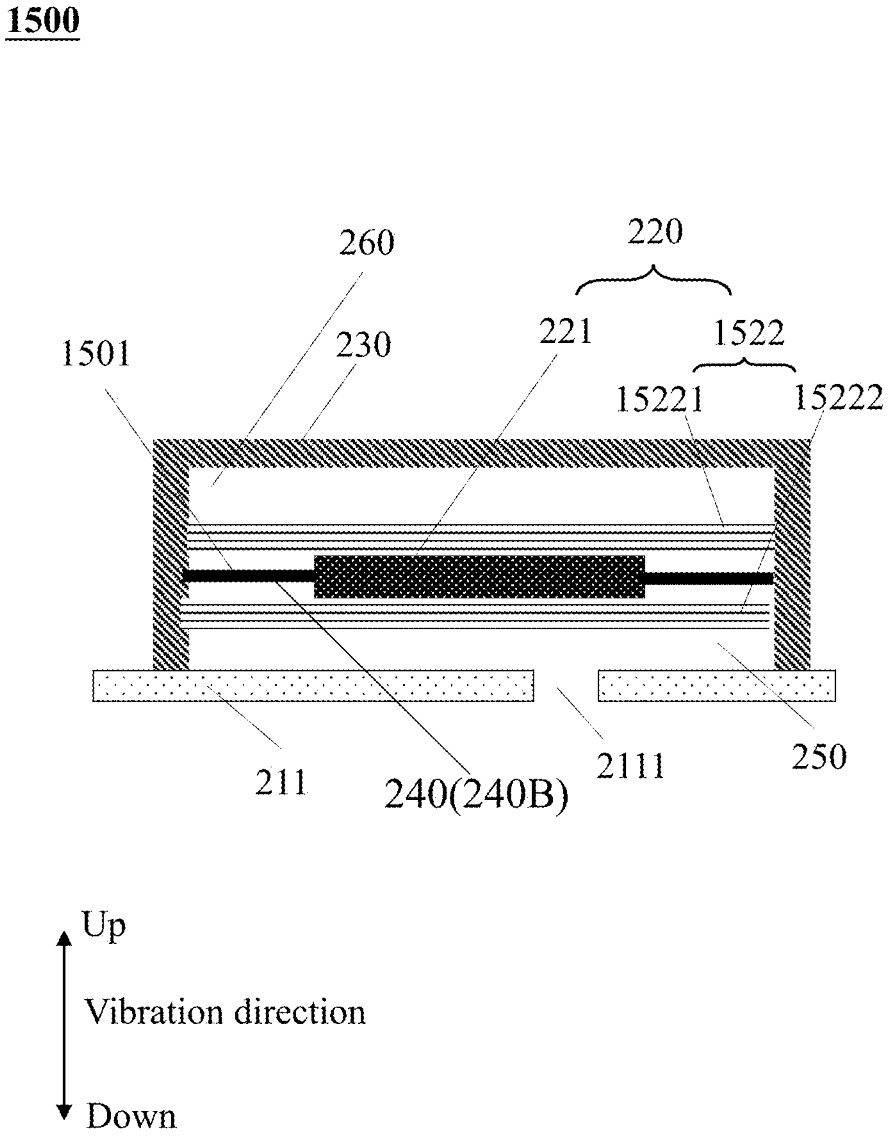
FIG. 17B is a schematic diagram illustrating an exemplary structure of a vibration sensor according to some embodiments of the present disclosure.

FIG. 15 is a schematic diagram illustrating an exemplary structure of a vibration sensor according to some embodiments of the present disclosure. FIG. 16 is a schematic diagram illustrating an exemplary structure of a vibration sensor according to some embodiments of the present disclosure. FIG. 17A is a schematic diagram illustrating an exemplary structure of a vibration sensor according to some embodiments of the present disclosure. FIG. 17B is a schematic diagram illustrating an exemplary structure of a vibration sensor according to some embodiments of the present disclosure.

In some embodiments, as illustrated in FIGS. 15-17B, the vibration sensor 1500 may include an acoustic transducer (not shown in the figures), the vibration assembly 220, and the buffer member 240. In some embodiments, the vibration assembly 220 may include the mass element 221 and an elastic element 1522. The elastic element 1522 may include a first elastic element 15221 and a second elastic element 15222. In some embodiments, the first elastic element 15221 and the second elastic element 15222 may be film-like structures. In some embodiments, the first elastic element 15221 and the second elastic element 15222 may be approximately arranged in a symmetrical manner relative to the mass element 221 along the vibration direction of the mass element 221. In some embodiments, the first elastic element 15221 and the second elastic element 15222 may be connected to the housing 230. For example, the first elastic element 15221 may be located on a side of the mass element 221 away from the substrate 211. A lower surface of the first elastic element 15221 may be connected to the upper surface of the mass element 221, and a peripheral side of the first elastic element 15221 may be connected to an inner wall of the housing 230. The second elastic element 15222 may be located on a side of the mass element 221 close to the substrate 211. An upper surface of the second elastic element 15222 may be connected to the lower surface of the mass element 221, and a peripheral side of the second elastic element 15222 may be connected to the inner wall of the housing 230. It should be noted that the film-like structures of the first elastic element 15221 and the second elastic element 15222 may be regular and/or irregular structures such as a rectangle, a circle, or the like, and shapes of the first elastic element 15221 and the second elastic element 15222 may be adaptively adjusted according to a shape of a cross-section of the housing 230.

In some embodiments, the first elastic element 15221 and the second elastic element 15222 may be arranged in a symmetrical manner with respect to the mass element 221 along the vibration direction of the mass element 221, so that a center of gravity of the mass element 221 may approximately coincide with a centroid of the elastic element 1522. Further, the size, shape, material, or thickness of the first elastic element 15221 may be the same as that of the second elastic element 15222, so that when the vibration assembly 220 vibrates in response to the vibration of the housing 230, the mass element 221 may reduce the vibration of the mass element 221 along a direction perpendicular to the vibration direction of the mass element 221, thereby reducing a response sensitivity of the vibration assembly 220 to the vibration of the housing 230 along the direction perpendicular to the vibration direction of the mass element 221 and improving a direction selectivity of the vibration sensor 1500.

In some embodiments, the response sensitivity of the vibration assembly 220 to the vibration of the housing 230 along the vibration direction of the mass element 221 may be changed (e.g., improve) by adjusting the thickness and the elastic coefficient of the elastic element 1522, the mass and size of the mass element 221, or the like.

In some embodiments, a distance between the centroid of at least one elastic element 1522 and the center of gravity of the mass element 221 along the vibration direction of the mass element 221 may be no greater than ⅓ of the thickness of the mass element 221. In some embodiments, the distance between the centroid of at least one elastic element 1522 and the center of gravity of the mass element 221 along the vibration direction of the mass element 221 may be no greater than ½ of the thickness of the mass element 221. In some embodiments, the distance between the centroid of at least one elastic element 1522 and the center of gravity of the mass element 221 along the vibration direction of the mass element 221 may be no greater than ¼ of the thickness of the mass element 221.

In some embodiments, a distance between the centroid of at least one elastic element 1522 and the center of gravity of the mass element 221 along the direction perpendicular to the vibration direction of the mass element 221 may be no greater than ⅓ of the side length or radius of the mass element 221. In some embodiments, the distance between the centroid of at least one elastic element 1522 and the center of gravity of the mass element 221 along the direction perpendicular to the vibration direction of the mass element 221 may be no greater than ½ of the side length or radius of the mass element 221. In some embodiments, the distance between the centroid of at least one elastic element 1522 and the center of gravity of the mass element 221 along the direction perpendicular to the vibration direction of the mass element 221 may be no greater than ¼ of the side length or radius of the mass element 221.

In some embodiments, when the centroid of at least one elastic element 1522 coincides or approximately coincides with the center of gravity of the mass element 221, a resonance frequency of the vibration of the vibration assembly 220 along the direction perpendicular to the vibration direction of the mass element 221 may be shifted to a high frequency without changing a resonance frequency of the vibration of the vibration assembly 220 along the vibration direction of the mass element 221. In some embodiments, when the centroid of at least one elastic element 1522 coincides or approximately coincides with the center of gravity of the mass element 221, the resonance frequency of the vibration of the vibration assembly 220 along the vibration direction of the mass element 221 may keep substantially unchanged. For example, the resonance frequency of the vibration of the vibration assembly 220 along the vibration direction of the mass element 221 may be a frequency range (e.g., 20 Hz-2000 Hz, 2000 Hz-3000 Hz, etc.) that is perceived relatively strong by a human ear. The resonance frequency of the vibration of the vibration assembly 220 along the direction perpendicular to the vibration direction of the mass element 221 may be shifted to a high frequency and located in a frequency range (e.g., 5000 Hz-9000 Hz, 10 kHz-14 kHz, etc.) that is perceived relatively weak by the human ear. Since the resonance frequency of the vibration of the vibration assembly 220 along the direction perpendicular to the vibration direction of the mass element 221 shifts to a high frequency, and the resonance frequency of the vibration of the vibration assembly 220 along the vibration direction of the mass element 221 keeps substantially unchanged, a ratio of the resonance frequency of the vibration of the vibration assembly 220 along the direction perpendicular to the vibration direction of the mass element 221 to the resonance frequency of the vibration of the vibration assembly 220 along the vibration direction of the mass element 221 may be greater than or equal to 2. In some embodiments, the ratio of the resonance frequency of the vibration of the vibration assembly 220 along the direction perpendicular to the vibration direction of the mass element 221 to the resonance frequency of the vibration of the vibration assembly 220 along the vibration direction of the mass element 221 may be greater than or equal to another value. For example, a ratio of the resonance frequency of the vibration of the vibration assembly 220 along the direction perpendicular to the vibration direction of the mass element 221 to the resonance frequency of the vibration of the vibration assembly 220 along the vibration direction of the mass element 221 may be greater than or equal to 1.5.

In some embodiments, when the first elastic element 15221 and the second elastic element 15222 are film-like structures, a size of the upper surface or the lower surface of the mass element 221 may be smaller than a size of the first elastic element 15221 and the second elastic element 15222, and a ring or rectangle with an equal interval may be formed by a side surface of the mass element 221 and the inner wall of the housing 230. In some embodiments, the thickness of the first elastic element 15221 and the second elastic element 15222 may be within a range of 0.1 um~500 um. In some embodiments, the thickness of the first elastic element 15221 and the second elastic element 15222 may be within a range of 0.05 um~200 um. In some embodiments, the thickness of the first elastic element 15221 and the second elastic element 15222 may be within a range of 300 um~800 um. In some embodiments, a thickness ratio of each elastic element (e.g., the first elastic element 15221 or the second elastic element 15222) to the mass element 221 may be within a range of 2~100. In some embodiments, the thickness ratio of each elastic element to the mass element 221 may be within a range of 10~50.

In some embodiments, the thickness ratio of each elastic element to the mass element 221 may be within a range of 20~40. In some embodiments, a thickness difference between the mass element 221 and each elastic element (e.g., the first elastic element 15221 or the second elastic element 15222) may be within a range of 9 um~500 um. In some embodiments, the thickness difference between the mass element 221 and each elastic element may be within a range of 50 um~400 um. In some embodiments, the thickness difference between the mass element 221 and each elastic element may be within a range of 100 um~300 um.

In some embodiments, a gap 1501 may be formed by the first elastic element 15221, the second elastic element 15222, the mass element 221, and the housing 230 or the acoustic transducer corresponding to the acoustic chamber. As illustrated in FIG. 15, in some embodiments, the gap 1501 may be located at the peripheral side of the mass element 221. When the mass element 221 responds to an external vibration signal and the mass element 221 vibrates relative to the housing 230, the gap 1501 may prevent the mass element 221 from colliding with the housing 230 to a certain extent when the mass element 221 vibrates. In some embodiments, the gap 1501 may include fillers, and a quality factor of the vibration sensor 1500 may be adjusted by arranging the fillers in the gap 1501. Preferably, the quality factor of the vibration sensor 1500 may be within a range of 0.7~10 by arranging the fillers in the gap 1501. Preferably, the quality factor of the vibration sensor 1500 may be within a range of 1~5 by arranging the fillers in the gap 1501. In some embodiments, the filler may be one or more of a gas, liquid (e.g., silicone oil), elastic material, or the like. An exemplary gas may include, but is not limited to, one or more of air, argon, nitrogen, carbon dioxide, or the like. An exemplary elastic material may include, but is not limited to, silicone gel, silicone rubber, or the like.

In some embodiments, the first acoustic chamber 250 may be formed by the housing 230, the second elastic element 15222, and the substrate 211 of the acoustic transducer, and a second acoustic chamber 260 may be formed between the housing 230 and the first elastic element 15221. In some embodiments, the first acoustic chamber 250 and the second acoustic chamber 260 may have air inside. When the vibration assembly 220 vibrates relative to the housing 230, the vibration assembly 220 may compress the air inside the first acoustic chamber 250 and the second acoustic chamber 260. The first acoustic chamber 250 and the second acoustic chamber 260 may be approximately regarded as two air springs, and the volume of the second acoustic chamber 260 may be greater than or equal to the volume of the first acoustic chamber 250, so that coefficients of the air springs when the air is compressed by the vibration of the vibration assembly 220 may be substantially equal, thereby improving the symmetry of the elastic elements (including the air springs) located on an upper side and a lower side of the mass element 221. In some embodiments, the volume of the first acoustic chamber 250 and the volume of the second acoustic chamber 260 may be within a range of 10 $um^3$~1000 $um^3$. Preferably, the volumes of the first acoustic chamber 250 and the second acoustic chamber 260 may be within a range of 50 $um^3$~500 $um^3$.

In some embodiments, as illustrated in FIG. 15 to FIG. 17B, the buffer member 240 may be arranged in the vibration sensor 1500, and the buffer member 240 may be connected to the vibration assembly 220, so that the buffer member 240 and the elastic element 1522 may bear the impact force generated by the vibration of the mass element 221. That is, the buffer member 240 may disperse the impact force of the mass element 221 acting on the elastic element 1522 and improve the performance of the elastic element 1522 against the impact of the mass element 221, thereby improving the reliability of the vibration sensor 1500.

In some embodiments, as illustrated in FIG. 15, the buffer member 240 may include a first buffer connection layer 240-1 and a second buffer connection layer 240-2. An upper surface and a lower surface of the first buffer connection layer 240-1 along the vibration direction of the vibration assembly 220 may be connected to the first elastic element 15221 and the mass element 221 respectively, and an upper surface and a lower surface of the second buffer connection layer 240-2 along the vibration direction of the vibration assembly 220 may be connected to the mass element 221 and the second elastic element 15222 respectively. The mass element 221 may be fixed between the first elastic element 15221 and the second elastic element 15222 through the first buffer connection layer 240-1 and the second buffer connection layer 240-2. In some embodiments, the first buffer connection layer 240-1 may include a flexible film layer. The first elastic element 15221 may be connected to the mass element 221 through the flexible film layer directly. In some embodiments, the second buffer connection layer 240-2 may include a flexible film layer. The second elastic element 15222 may be connected to the mass element 221 through the flexible film layer directly. In some embodiments, the first buffer connection layer 240-1 may include a first elastic connection sheet 240-11 and a first adhesive layer 240-12. The first adhesive layer 240-12 may be wrapped outside the first elastic connection sheet 240-11. The first buffer connection layer 240-1 may be connected between the mass element 221 and the first elastic element 15221 through the first adhesive layer 240-12. In some embodiments, the second buffer connection layer 240-2 may include a second elastic connection sheet 240-21 and a second adhesive layer 240-22. The second adhesive layer 240-22 may be wrapped outside the second elastic connection sheet 240-21. The second buffer connection layer 240-2 may be connected between the mass element 221 and the second elastic element 15222 through the second adhesive layer 240-22. In some embodiments, structural parameters of the first buffer connection layer 240-1 and the second buffer connection layer 240-2 may be set similarly to the buffer connection layer 240 in the present disclosure. More details may be found elsewhere in the present disclosure, such as FIG. 2 and the related descriptions thereof.

In some embodiments, as illustrated in FIG. 16, the buffer member 240 may include a first buffer adhesive layer 240A1 and a second buffer adhesive layer 240A2. The first buffer adhesive layer 240A1 may be arranged in a region of the first elastic element 15221 excluding a region corresponding to the projection region of the mass element 221 along the vibration direction, and the second buffer adhesive layer 240A2 may be arranged in a region of the second elastic element 15222 excluding a region corresponding to the projection region of the mass element 221 along the vibration direction. In some embodiments, the first buffer adhesive layer 240A1 and the mass element 221 may be located on the same side or opposite sides of the first elastic element 15221. In some embodiments, the first buffer adhesive layer 240A1 may also be located on two sides of the first elastic element 15221. In some embodiments, the second buffer adhesive layer 240A2 and the mass element 221 may be located on the same side or the opposite side of the second elastic element 15222. In some embodiments, the second buffer adhesive layer 240A2 may also be located on two sides of the second elastic element 15222. In some embodiments, structural parameters of the first buffer adhesive layer 240A1 and the second buffer adhesive layer 240A2 may be set similarly to the buffer adhesive layer 240A in the present disclosure. More details may be found elsewhere in the present disclosure, such as FIG. 3 and the related descriptions thereof.

In some embodiments, as illustrated in FIG. 17A, the buffer member 240 may include the first extension arm 243 and/or the second extension arm 244. In some embodiments, the first extension arm 243 may be arranged on the surface of the first elastic element 15221 where the mass element 221 is located. In some embodiments, an end of the first extension arm 243 may be connected to the mass element 221. In some embodiments, another end of the first extension arm 243 may be connected to the housing 230 or the supporting member arranged on the housing 230. The first extension arm 243 may be arranged in a spiral shape along the circumferential direction of the first elastic element 15221 from the mass element 221 to the edge of the first elastic element 15221. An end of the second extension arm 244 may be connected to the mass element 221. In some embodiments, another end of the second extension arm 244 may be connected to the housing 230 or the supporting member arranged on the housing 230. The second extension arm 244 may be arranged in a spiral shape along the circumferential direction of the first elastic element 15221 from the mass element 221 to the edge of the first elastic element 15221. In some embodiments, the connection position of the second extension arm 244 connected to the mass element 221 may be different from the connection position of the first extension arm 243 connected to the mass element 221.

In some embodiments, the buffer member 240 may further include a third extension arm 245 and/or a fourth extension arm 246. In some embodiments, the third extension arm 245 and the fourth extension arm 246 may be arranged on the surface of the second elastic element 15222 where the mass element 221 is located. In some embodiments, an end of the third extension arm 245 may be connected to the mass element 221. In some embodiments, another end of the third extension arm 245 may be connected to the housing 230 or the supporting member arranged on the housing 230. The third extension arm 245 may be arranged in a spiral shape along the circumferential direction of the second elastic element 15222 from the mass element 221 to the edge of the second elastic element 15222. An end of the fourth extension arm 246 may be connected to the mass element 221. In some embodiments, another end of the fourth extension arm 246 may be connected to the housing 230 or the supporting member arranged on the housing 230. The fourth extension arm 246 may be arranged in a spiral shape along the circumferential direction of the second elastic element 15222 from the mass element 221 to the edge of the second elastic element 15222. In some embodiments, the connection position of the third extension arm 245 connected to the mass element 221 may be different from the connection position of the fourth extension arm 246 connected to the mass element 221. More details may be found elsewhere in the present disclosure, such as FIG. 4A and the related descriptions thereof.

In some embodiments, as illustrated in FIG. 17B, the buffer member 240 may include the cantilever beam 240B.

The cantilever beam 240B may be arranged on a side of the mass element 221. An end of the cantilever beam 240B may be connected to the housing 230, and another end of the cantilever beam 240B may be connected to the mass element 221. During the vibration of the vibration assembly 220, the cantilever beam 240B may vibrate under the action of the mass element 221. In some embodiments, a gap may be formed by the cantilever beam 240B, the first elastic element 15221, and the second elastic element 15222, so that the vibration of the cantilever beam 240B may not interfere with the vibration of the first elastic element 15221 and the second elastic element 15222, thereby avoiding the influence on the mechanical property of the elastic element 1522. More details about the cantilever beam may be found elsewhere in the present disclosure, such as FIG. 4B and the related descriptions thereof.

Figure 18:
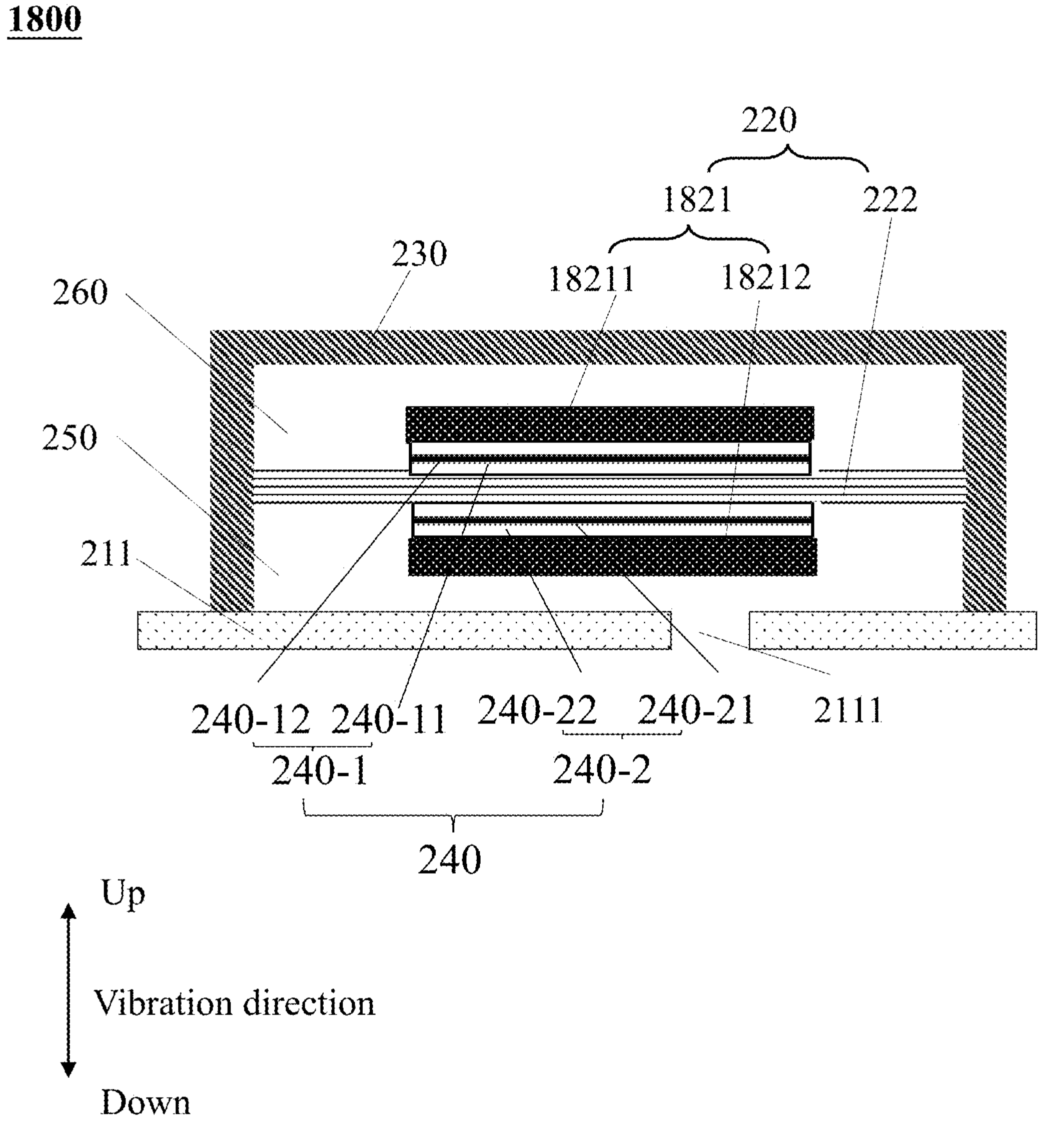
FIG. 18 is a schematic diagram illustrating an exemplary structure of a vibration sensor according to some embodiments of the present disclosure.
Figure 19:
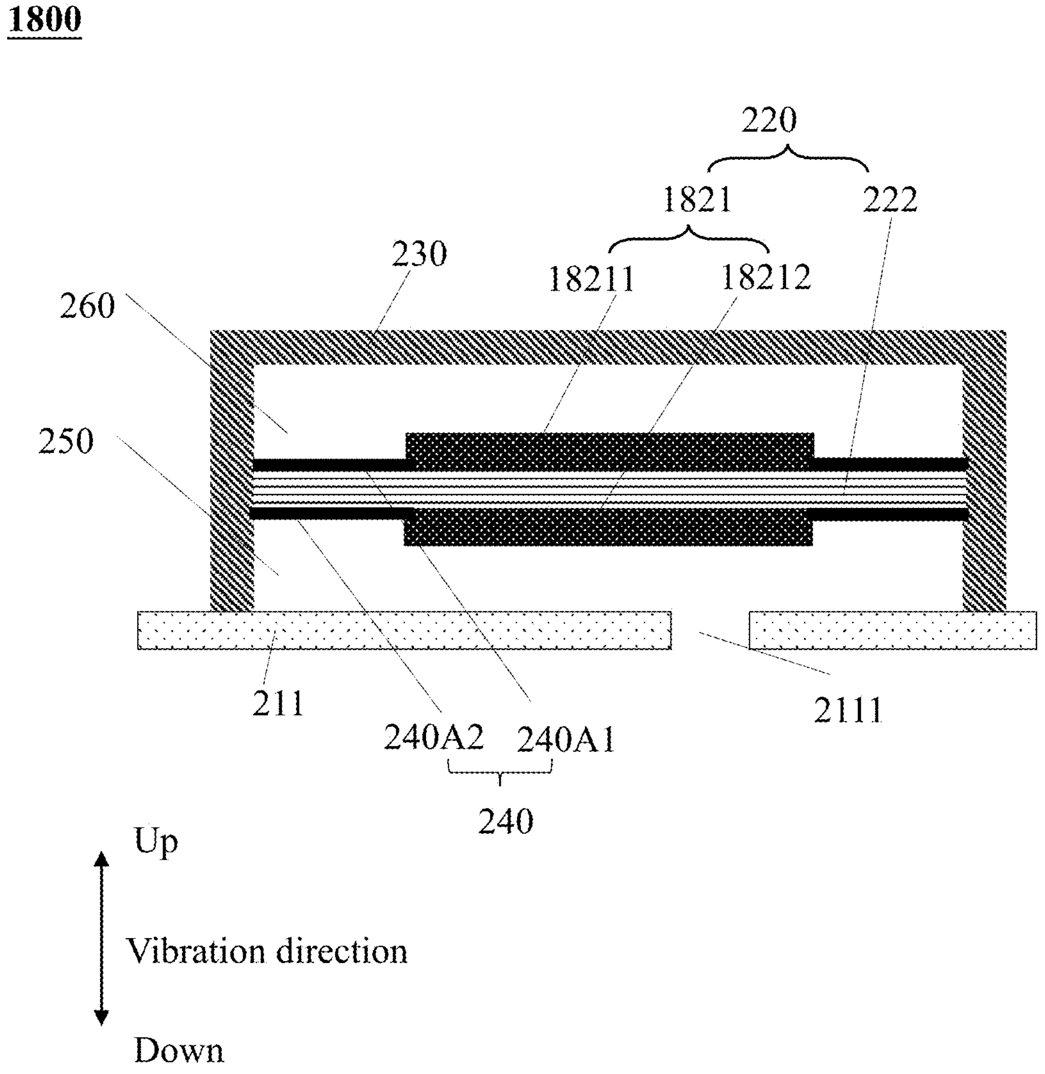
FIG. 19 is a schematic diagram illustrating an exemplary structure of a vibration sensor according to some embodiments of the present disclosure.
Figure 20A:
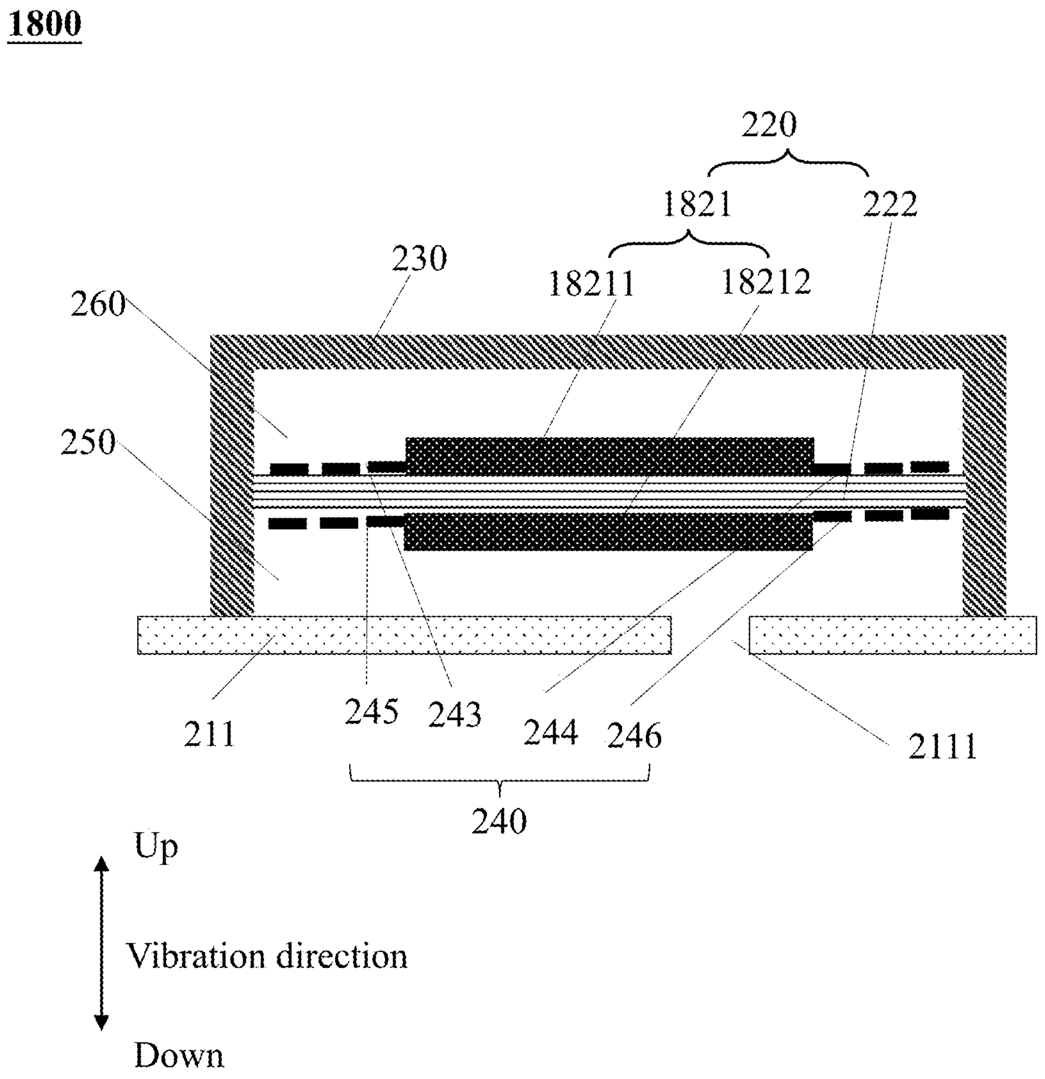
FIG. 20A is a schematic diagram illustrating an exemplary structure of a vibration sensor according to some embodiments of the present disclosure.
Figure 20B:
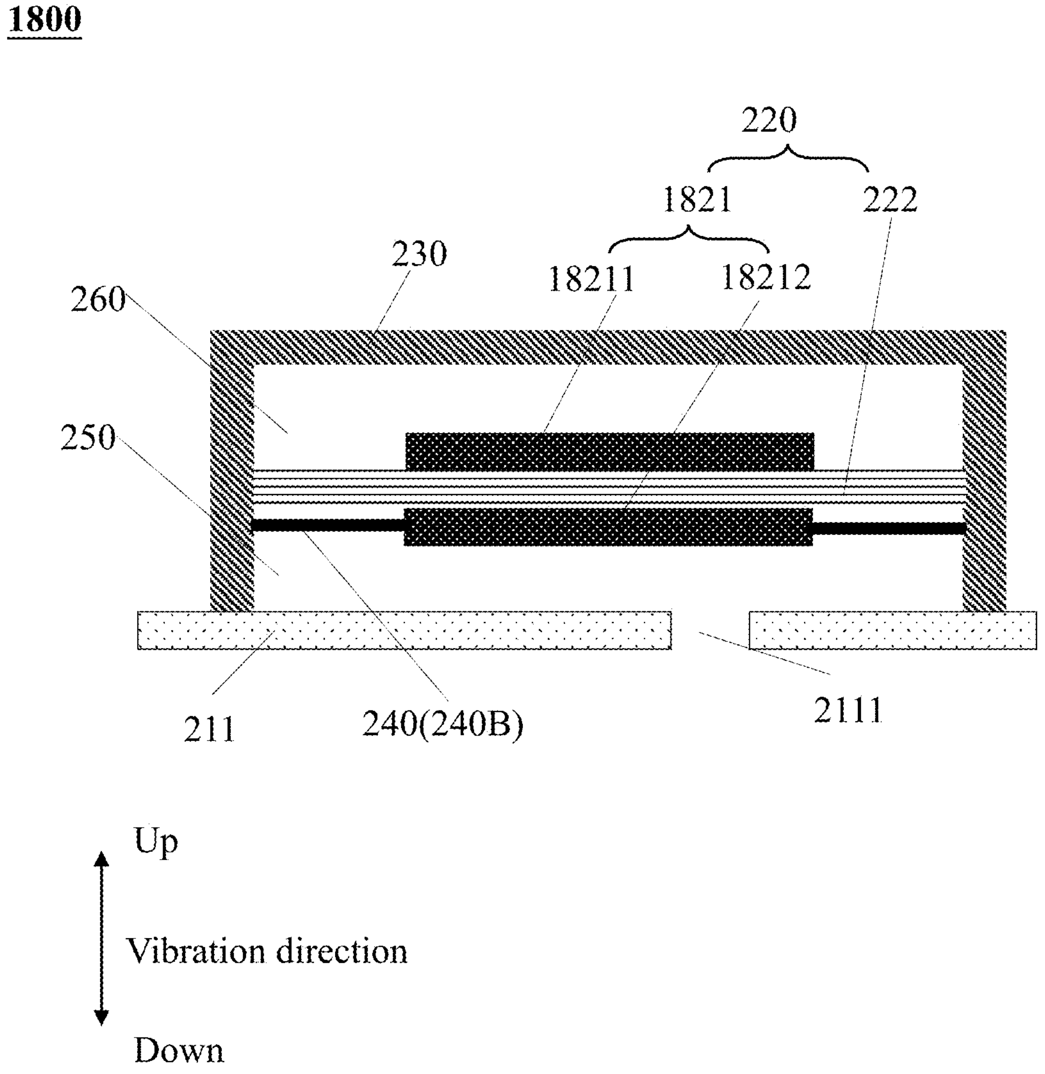
FIG. 20B is a schematic diagram illustrating an exemplary structure of a vibration sensor according to some embodiments of the present disclosure.

FIG. 18 is a schematic diagram illustrating an exemplary structure of a vibration sensor according to some embodiments of the present disclosure. FIG. 19 is a schematic diagram illustrating an exemplary structure of a vibration sensor according to some embodiments of the present disclosure. FIG. 20A is a schematic diagram illustrating an exemplary structure of a vibration sensor according to some embodiments of the present disclosure. FIG. 20B is a schematic diagram illustrating an exemplary structure of a vibration sensor according to some embodiments of the present disclosure.

A structure of a vibration sensor 1800 illustrated in FIGS. 18-20B is substantially the same as that of the vibration sensor 1500 illustrated in FIGS. 15-17B, except for the vibration assembly. The vibration assembly 220 of the vibration sensor 1800 may include at least one elastic element 222 and two mass elements (e.g., a first mass element 18211 and a second mass element 18212). In some embodiments, the mass element 1821 may include a first mass element 18211 and a second mass element 18212. The first mass element 18211 and the second mass element 18212 may be arranged in a symmetrical manner with respect to the at least one elastic element 222 along the vibration directions of the first mass element 18211 and the second mass element 18212. In some embodiments, the first mass element 18211 may be located on a side of the at least one elastic element 222 away from the substrate 211, and a lower surface of the first mass element 18211 may be connected to the upper surface of the at least one elastic element 222. The second mass element 18212 may be located on a side of the at least one elastic element 222 facing the substrate 211, and an upper surface of the second mass element 18212 may be connected to the lower surface of the at least one elastic element 222. In some embodiments, the size, shape, material, or thickness of the first mass element 18211 may be the same as that of the second mass element 18212. In some embodiments, the first mass element 18211 and the second mass element 18212 may be arranged in a symmetrical manner with respect to the at least one elastic element 222 along the vibration directions of the first mass element 18211 and the second mass element 18212, so that a center of gravity of the mass element 1821 can approximately coincide with a centroid of the at least one elastic element 222, and when the vibration assembly 220 vibrates in response to the vibration of the housing 230, the vibration of the mass element 1821 along a direction perpendicular to the vibration direction of the mass element 1821 can be reduced, thereby reducing the response sensitivity of the vibration assembly 220 to the vibration of the housing 230 along the direction perpendicular to the vibration direction of the mass element 1821 and improving the direction selectivity of the vibration sensor 1800.

In some embodiments, as illustrated in FIG. 18, the buffer member 240 may include the first buffer connection layer 240-1 and the second buffer connection layer 240-2. The upper surface and the lower surface of the first buffer connection layer 240-1 along the vibration direction of the vibration assembly 220 may be connected to the elastic element 222 and the first mass element 18211 respectively, and the first mass element 18211 may be fixed on the elastic element 222 through the first buffer connection layer 240-1. The upper surface and the lower surface of the second buffer connection layer 240-2 along the vibration direction of the vibration assembly 220 may be connected to the elastic element 222 and the second mass element 18212 respectively, and the second mass element 18212 may be fixed on the elastic element 222 through the second buffer connection layer 240-2. In some embodiments, the first buffer connection layer 240-1 may include a flexible film layer. The elastic element 222 may be connected to the first mass element 18211 through the flexible film layer directly. In some embodiments, the second buffer connection layer 240-2 may include a flexible film layer. The elastic element 222 may be connected to the second mass element 18212 through the flexible film layer directly. In some embodiments, the first buffer connection layer 240-1 may include the first elastic connection sheet 240-11 and the first adhesive layer 240-12. The first adhesive layer 240-12 may be wrapped outside the first elastic connection sheet 240-11. The first buffer connection layer 240-1 may be connected between the first mass element 18211 and the elastic element 222 through the first adhesive layer 240-12. In some embodiments, the second buffer connection layer 240-2 may include the second elastic connection sheet 240-21 and the second adhesive layer 240-22. The second adhesive layer 240-22 may be wrapped outside the second elastic connection sheet 240-21. The second buffer connection layer 240-2 may be connected between the second mass element 18212 and the elastic element 222 through the second adhesive layer 240-22. In some embodiments, structural parameters of the first buffer connection layer 240-1 and the second buffer connection layer 240-2 may be set similarly to the buffer connection layer 240 in the present disclosure. More details may be found elsewhere in the present disclosure, such as FIG. 2 and the related descriptions thereof.

In some embodiments, as illustrated in FIG. 19, the buffer member 240 may include the first buffer adhesive layer 240A1 and the second buffer adhesive layer 240A2. The first buffer adhesive layer 240A1 may be arranged in a region of the elastic element 222 that is not covered by the first mass element 18211, and the second buffer adhesive layer 240A2 may be arranged in a region of the elastic element 222 that is not covered by the second mass element 18212. In some embodiments, the structural parameters of the first buffer adhesive layer 240A1 and the second buffer adhesive layer 240A2 may be set similarly to the buffer adhesive layer 240A in the present disclosure. More details may be found elsewhere in the present disclosure, such as FIG. 3 and the related descriptions thereof.

In some embodiments, as illustrated in FIG. 20A, the buffer member 240 may include the first extension arm 243 and/or the second extension arm 244. In some embodiments, the first extension arm 243 and the second extension arm 244 may be arranged on the surface of the elastic element 222 where the first mass element 18211 is located. In some embodiments, an end of the first extension arm 243 may be connected to the first mass element 18211. In some embodiments, another end of the first extension arm 243 may be connected to the housing 230. The first extension arm 243 may be arranged in a spiral shape along the circumferential direction of the elastic element 222 from the first mass element 18211 to the edge of the elastic element 222. An end of the second extension arm 244 may be connected to the first mass element 18211. In some embodiments, another end of the second extension arm 244 may be connected to the housing 230. The second extension arm 244 may be arranged in a spiral shape along the circumferential direction of the elastic element 222 from the first mass element 18211 to the edge of the elastic element 222. In some embodiments, the connection position of the second extension arm 244 connected to the first mass element 18211 may be different from the connection position of the first extension arm 243 connected to the mass element 221.

In some embodiments, the buffer member 240 may further include the third extension arm 245 and the fourth extension arm 246. The third extension arm 245 and the fourth extension arm 246 may be arranged on the surface of the elastic element 222 where the second mass element 18212 is located. In some embodiments, an end of the third extension arm 245 may be connected to the second mass element 18212, and another end of the third extension arm 245 may be connected to the housing 230. The third extension arm 245 may be arranged in a spiral shape along the circumferential direction of the elastic element 222 from the second mass element 18212 to the edge of the elastic element 222. An end of the fourth extension arm 246 may be connected to the second mass element 18212, and another end of the fourth extension arm 246 may be connected to the housing 230. The fourth extension arm 246 may be arranged in a spiral shape along the circumferential direction of the elastic element 222 from the second mass element 18212 to the edge of the elastic element 222. In some embodiments, the connection position of the third extension arm 245 connected to the mass element 221 may be different from the connection position of the fourth extension arm 246 connected to the second mass element 18212. More details about the extension arm may be found elsewhere in the present disclosure, such as FIG. 4A and the related descriptions thereof.

In some embodiments, as illustrated in FIG. 20B, the buffer member 240 may include the cantilever beam 240B. The cantilever beam 240B may be arranged on a side of the mass element 1821 (the first mass element 18211 or the second mass element 18212). An end of the cantilever beam 240B may be connected to the housing 230 or the supporting member arranged on the housing 230, and another end of the cantilever beam 240B may be connected to the mass element 1821. For example, as illustrated in FIG. 20B, the cantilever beam 240B may be located on a side of the second mass element 18212. An end of the cantilever beam 240B may be connected to the housing 230, and another end of the cantilever beam 240B may be connected to the second mass element 18212. In some embodiments, the cantilever beam 240B may also be arranged on two sides of the elastic element 222 along the vibration direction of the mass element 1821. In some embodiments, a gap may be formed between the cantilever beam 240B and the elastic element 222, so that the vibration of the cantilever beam 240B may not interfere with the vibration of the elastic element 222, thereby avoiding an influence on the mechanical property of the elastic element 222. More details about the cantilever beam may be found elsewhere in the present disclosure, such as FIG. 4B and the related descriptions thereof.

Figure 21:
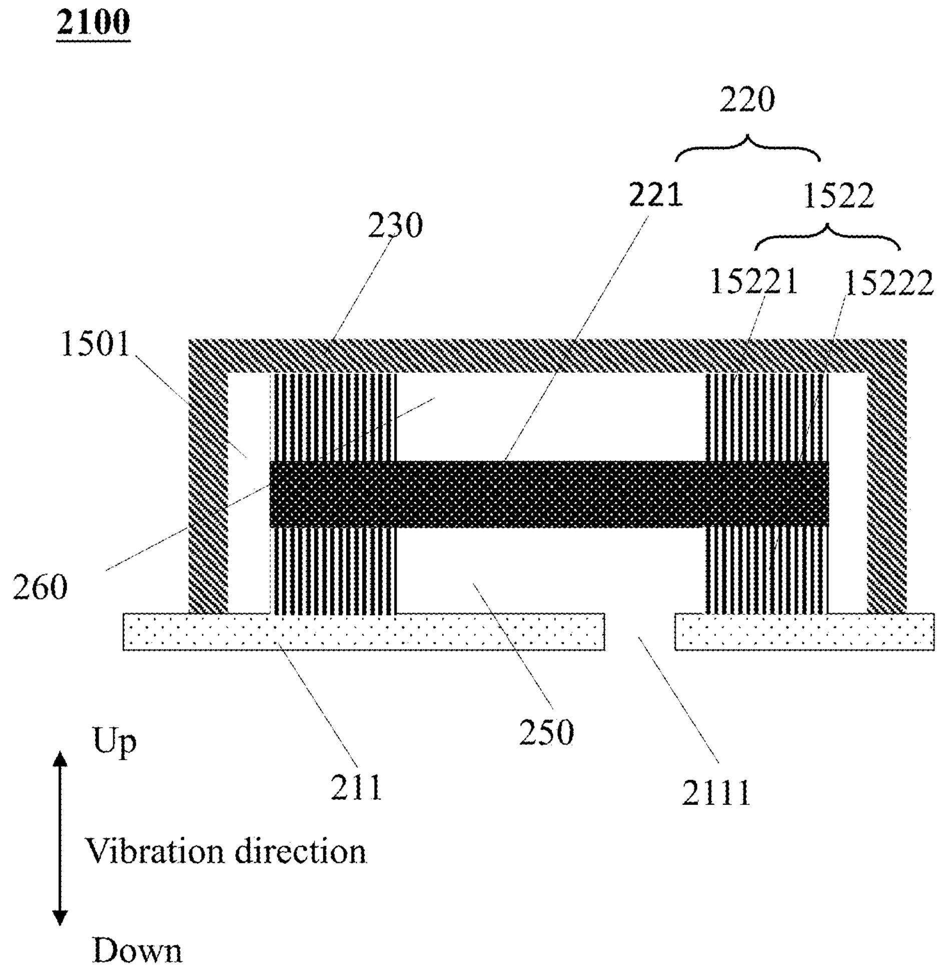
FIG. 21 is a schematic diagram illustrating an exemplary structure of a vibration sensor according to some embodiments of the present disclosure.

FIG. 21 is a schematic diagram illustrating an exemplary structure of a vibration sensor according to some embodiments of the present disclosure.

A vibration sensor 2100 illustrated in FIG. 21 is similar to the vibration sensor 1500 illustrated in FIG. 15, except for the structure and arrangement of the elastic element. In some embodiments, as illustrated in FIG. 21, the first elastic element 15221 and the second elastic element 15222 of the vibration sensor 2100 may be columnar structures. The first elastic element 15221 and the second elastic element 15222 may extend along the vibration direction of the mass element 221 respectively and may be connected to the housing 230 or the substrate 211 of the acoustic transducer. It should be noted that the columnar structures of the first elastic element 15221 and the second elastic element 15222 may be a regular and/or an irregular structure such as a cylinder, a square column, or the like. Shapes of the first elastic element 15221 and the second elastic element 15222 may be adaptively adjusted according to the shape of the cross-section of the housing 230.

In some embodiments, when the first elastic element 15221 and the second elastic element 15222 are columnar structures, the thickness of the mass element 221 may be within a range of 10 um~1000 um. In some embodiments, the thickness of the mass element 221 may be within a range of 4 um~500 um. In some embodiments, the thickness of the mass element 221 may be within a range of 600 um~1400 um. In some embodiments, the thickness of the first elastic element 15221 and the second elastic element 15222 may be within a range of 10 um~1000 um. In some embodiments, the thickness of the first elastic element 15221 and the second elastic element 15222 may be within a range of 4 um~500 um. In some embodiments, the thickness of the first elastic element 15221 and the second elastic element 15222 may be within a range of 600 um~1400 um. In some embodiments, a difference between the thickness of each element of the elastic elements 1522 (e.g., the first elastic element 15221 and the second elastic element 15222) and the thickness of the mass element 221 may be within a range of 0 um~500 um. In some embodiments, the difference between the thickness of each element of the elastic elements 1522 and the thickness of the mass element 221 may be within a range of 20 um~400 um. In some embodiments, the difference between the thickness of each element of the elastic elements 1522 and the thickness of the mass element 221 may be within a range of 50 um~200 um. In some embodiments, a ratio of the thickness of each element of the elastic elements 1522 to the thickness of the mass element 221 may be within a range of 0.01~100. In some embodiments, the ratio of the thickness of each element of the elastic elements 1522 to the thickness of the mass element 221 may be within a range of 0.5~80. In some embodiments, a ratio of the thickness of each element of the elastic elements 1522 to the thickness of the mass element 221 may be within a range of 1~40.

In some embodiments, in the vibration sensor 2100, the first elastic element 15221 and the second elastic element 15222 may be arranged in a columnar structure. Under the arrangement illustrated above, when the vibration assembly 220 vibrates, the impact force of the mass element 221 acting on the elastic element 1522 (the first elastic element 15221 and the second elastic element) may be evenly distributed on the elastic element 1522, thereby preventing the elastic element 1522 from being damaged caused by excessive concentration of the impact force acting on the elastic element 1522 and improving the reliability of the vibration sensor 2100. In some embodiments, the vibration sensor 2100 may also include a buffer member (not shown in the figure) to reduce the impact force acting on the elastic element 1522 when the mass element 221 vibrates. For example, the buffer member may include a buffer connection layer arranged between the mass element 221 and the elastic element 1522 (the first elastic element 15221 and the second elastic element 15222), so that the mass element 221 may be fixed between the elastic element 15221 and the second elastic element 15222 through the buffer connection layer.

Figure 22A:
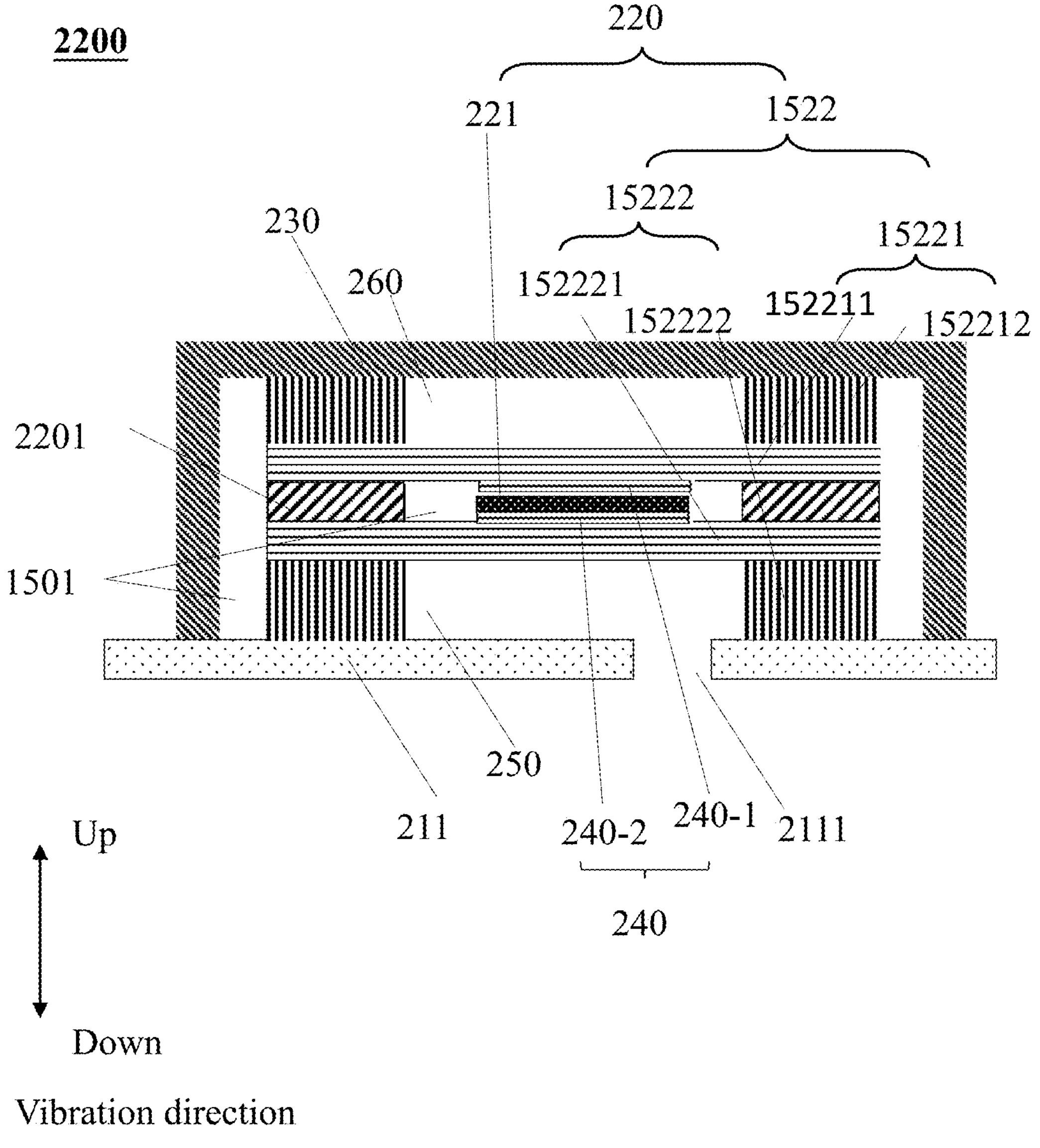
FIG. 22A is a schematic diagram illustrating an exemplary structure of a vibration sensor according to some embodiments of the present disclosure.
Figure 22B:
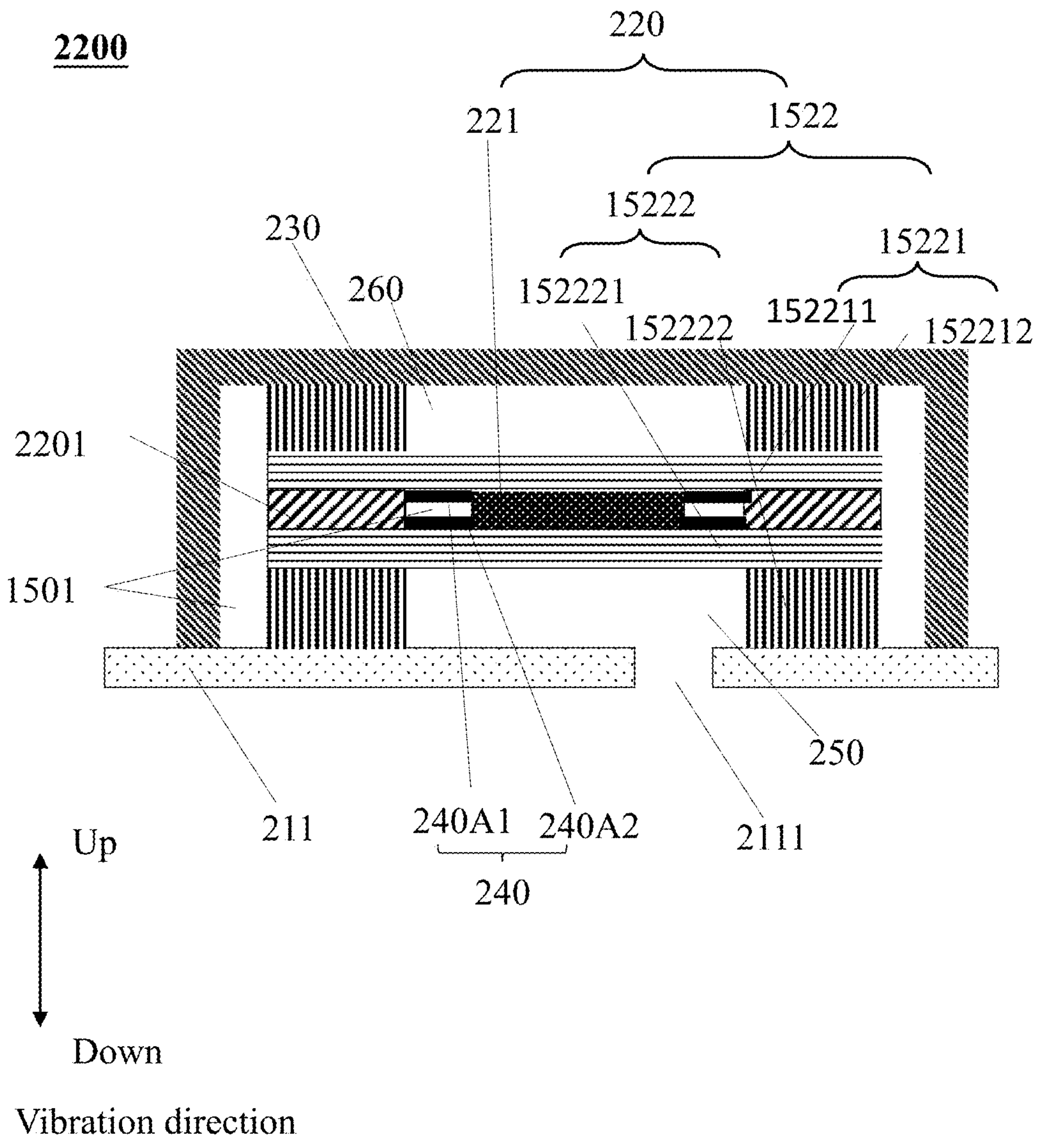
FIG. 22B is a schematic diagram illustrating an exemplary structure of a vibration sensor according to some embodiments of the present disclosure.
Figure 23:
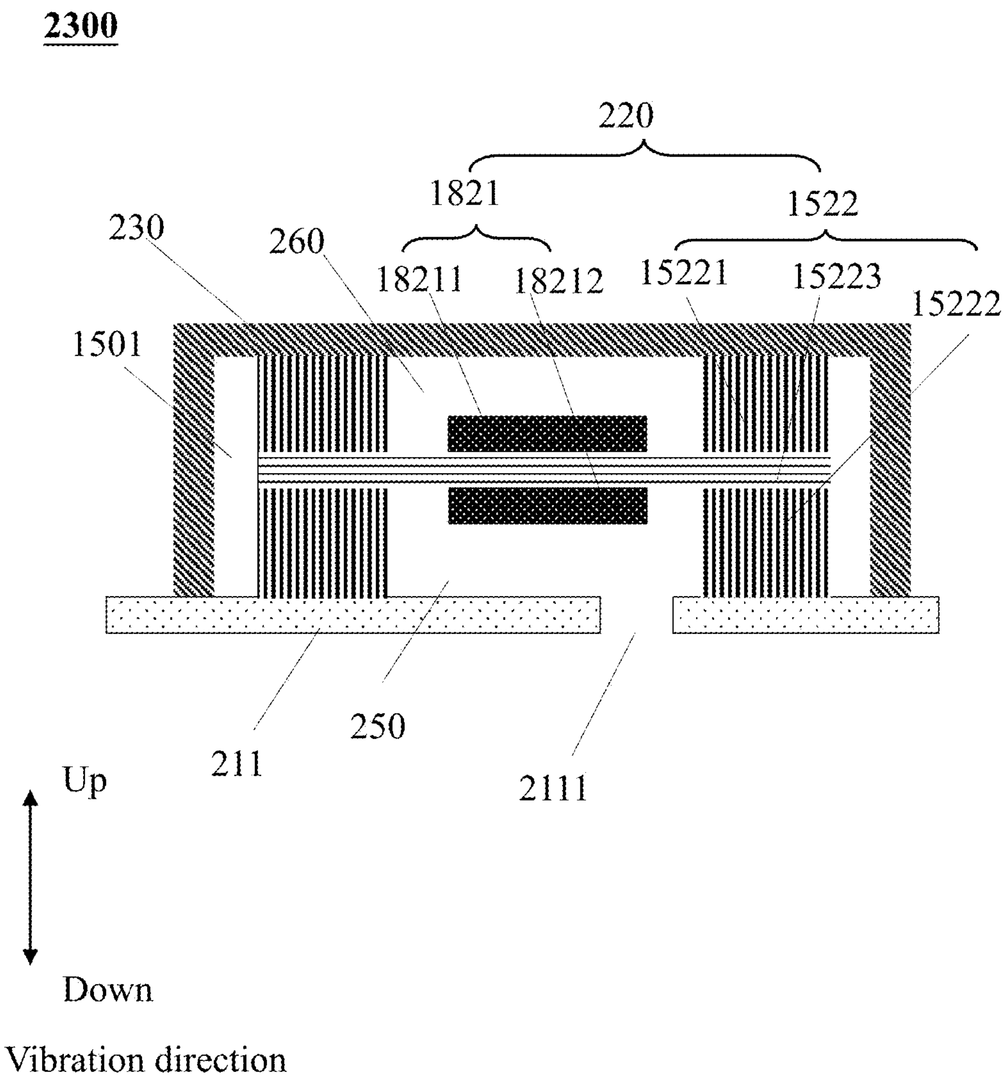
FIG. 23 is a schematic diagram illustrating an exemplary structure of a vibration sensor according to some embodiments of the present disclosure.

FIG. 22A is a schematic diagram illustrating an exemplary structure of a vibration sensor according to some embodiments of the present disclosure. FIG. 22B is a schematic diagram illustrating an exemplary structure of a vibration sensor according to some embodiments of the present disclosure. FIG. 23 is a schematic diagram illustrating an exemplary structure of a vibration sensor according to some embodiments of the present disclosure.

A vibration sensor 2200 illustrated in FIGS. 22A and 22B is similar to the vibration sensor 1500 illustrated in FIG. 15, except for the elastic element. In some embodiments, as illustrated in FIGS. 22A and 22B, the first elastic element 15221 of the vibration sensor 2200 may include a first sub-elastic element 152211 and a second sub-elastic element 152212. The first sub-elastic element 152211 may be connected to the housing 230 corresponding to the second acoustic chamber 260 through the second sub-elastic element 152212, and the first sub-elastic element 152211 may be connected to the upper surface of the mass element 221. In some embodiments, a peripheral side of the first sub-elastic element 152211 and a peripheral side of the second sub-elastic element 152212 may or may not coincide. In some embodiments, the second elastic element 15222 of the vibration sensor 2200 may include a third sub-elastic element 152221 and a fourth sub-elastic element 152222. The third sub-elastic element 152221 may be connected to the substrate 211 corresponding to the first acoustic chamber 250 through the fourth sub-elastic element 152222, and the third sub-elastic element 152221 may be connected to the lower surface of the mass element 221. In some embodiments, a peripheral side of the third sub-elastic element 152221 and a peripheral side of the fourth sub-elastic element 152222 may or may not coincide.

In some embodiments, the vibration sensor 2200 may further include a fixing sheet 2201. The fixing sheet 2201 may be arranged along the peripheral side of the mass element 221. The fixing sheet 2201 may be located between the first sub-elastic element 152211 and the third sub-elastic element 152221. An upper surface and a lower surface of the fixing sheet 2201 may be connected to the first sub-elastic element 152211 and the third sub-elastic element 152221 respectively.

In some embodiments, the material of the fixing sheet 2201 may be elastic material, such as foam, plastic, rubber, silicone, or the like. In some embodiments, the material of the fixing sheet 2201 may also be rigid material, such as metal, metal alloy, or the like. In some embodiments, the fixing sheet 2201 may realize a fixing function of the gap 1501. The fixing sheet 2201 may also be used as an additional mass element to adjust the resonance frequency of the vibration sensor 2200, thereby adjusting (e.g., reducing) the sensitivity of the vibration sensor 2200.

In some embodiments, as illustrated in FIG. 22A, the buffer member 240 may include the first buffer connection layer 240-1 and the second buffer connection layer 240-2. The upper surface and the lower surface of the first buffer connection layer 240-1 along the vibration direction of the vibration assembly 220 may be connected to the first sub-elastic element 152211 and the mass element 221 respectively. The upper surface and the lower surface of the second buffer connection layer 240-2 along the vibration direction of the vibration assembly 220 may be connected to the mass element 221 and the third sub-elastic element 152221 respectively. The mass element 221 may be fixed between the first sub-elastic element 152211 and the third sub-elastic element 152221 through the first buffer connection layer 240-1 and the second buffer connection layer 240-2. More details about the buffer connection layer may be found elsewhere in the present disclosure, such as FIG. 2, FIG. 15, and the related descriptions thereof.

In some embodiments, as illustrated in FIG. 22B, the buffer member 240 may include the first buffer adhesive layer 240A1 and the second buffer adhesive layer 240A2. The first buffer adhesive layer 240A1 may be arranged on a region of the first sub-elastic element 152211 excluding a region corresponding to projection regions of the mass element 221, the fixing sheet 2201, and the second sub-elastic element 152212 along the vibration direction. The second buffer adhesive layer 240A2 may be arranged on a region of the third sub-elastic element 152221 excluding a region corresponding to projection regions of the mass element 221, the fixing sheet 2201, and the fourth sub-elastic element 152222 along the vibration direction. In some embodiments, the first buffer adhesive layer 240A1 (or the second buffer adhesive layer 240A2) and the mass element 221 may be located on the same side or opposite sides of the first sub-elastic element 152211 (or the third sub-elastic element 152221). In some embodiments, the first buffer adhesive layer 240A1 (or the second buffer adhesive layer 240A2) may also be located on two sides of the first sub-elastic element 152211 (or the third sub-elastic element 152221).

In some embodiments, as illustrated in FIG. 23, the vibration sensor 2300 is similar to the vibration sensor 1800 illustrated in FIG. 18, except for the structure and connection manner of the elastic element. The elastic element 1522 of the vibration sensor 2300 may include the first elastic element 15221, the second elastic element 15222, and a third elastic element 15223. The third elastic element 15223 may be connected to the housing 230 and the substrate 211 through the first elastic element 15221 and the second elastic element 15222.

In some embodiments, the vibration sensor 2300 illustrated in FIG. 23 may also include a buffer member (not shown in the figure) to reduce the impact force acting on the third elastic element 15223 during the vibration of the mass element 1821 (the first mass element 18211 and the second mass element 18212). The structure and arrangement of the buffer member are substantially the same as those of the vibration sensor 1800. More details may be found elsewhere in the present disclosure, such as FIGS. 18-20B and the related descriptions thereof.

Figure 24:
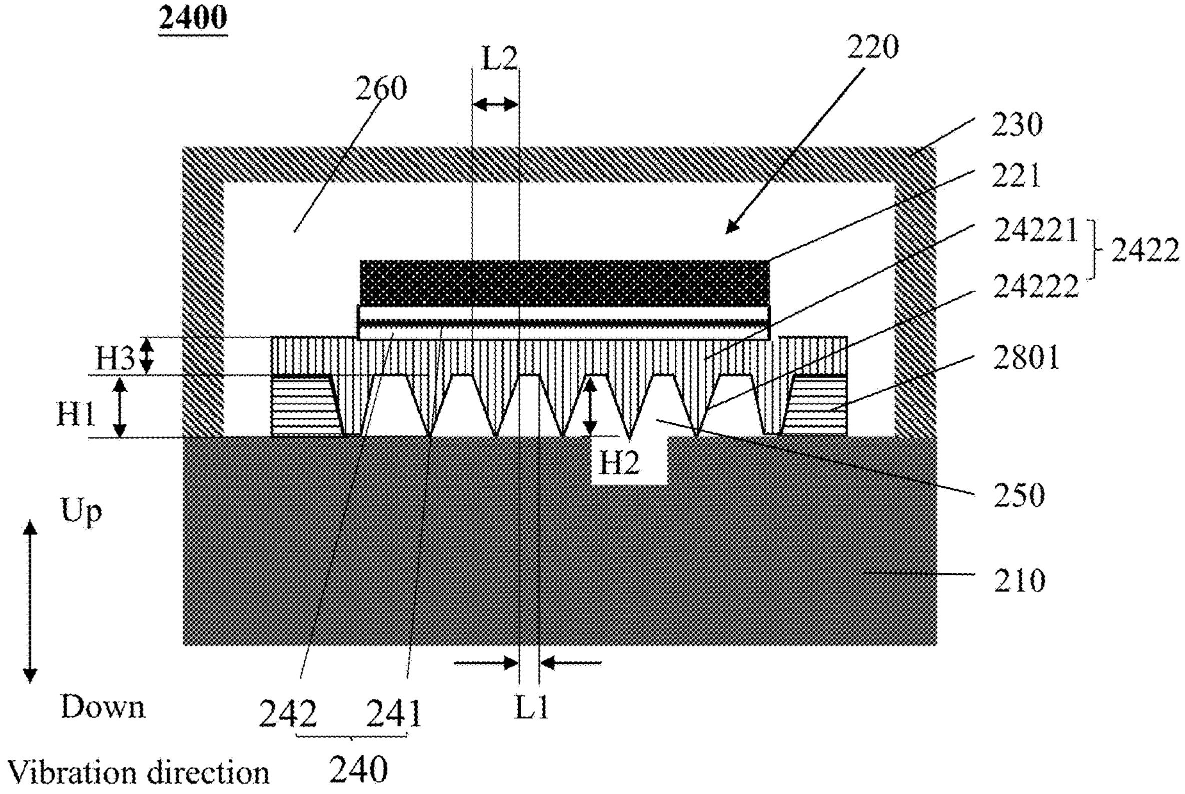
FIG. 24 is a schematic diagram illustrating an exemplary structure of a vibration sensor according to some embodiments of the present disclosure.
Figure 25:
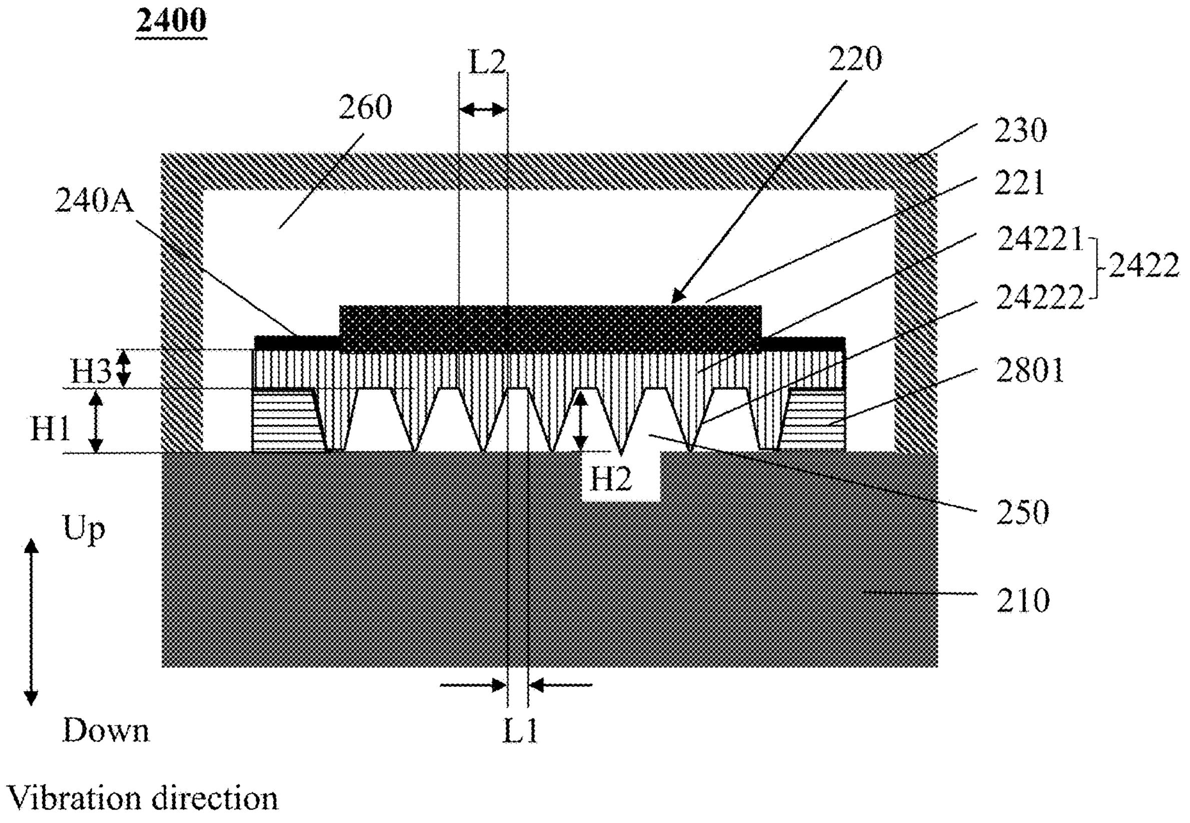
FIG. 25 is a schematic diagram illustrating an exemplary structure of a vibration sensor according to some embodiments of the present disclosure.
Figure 26:
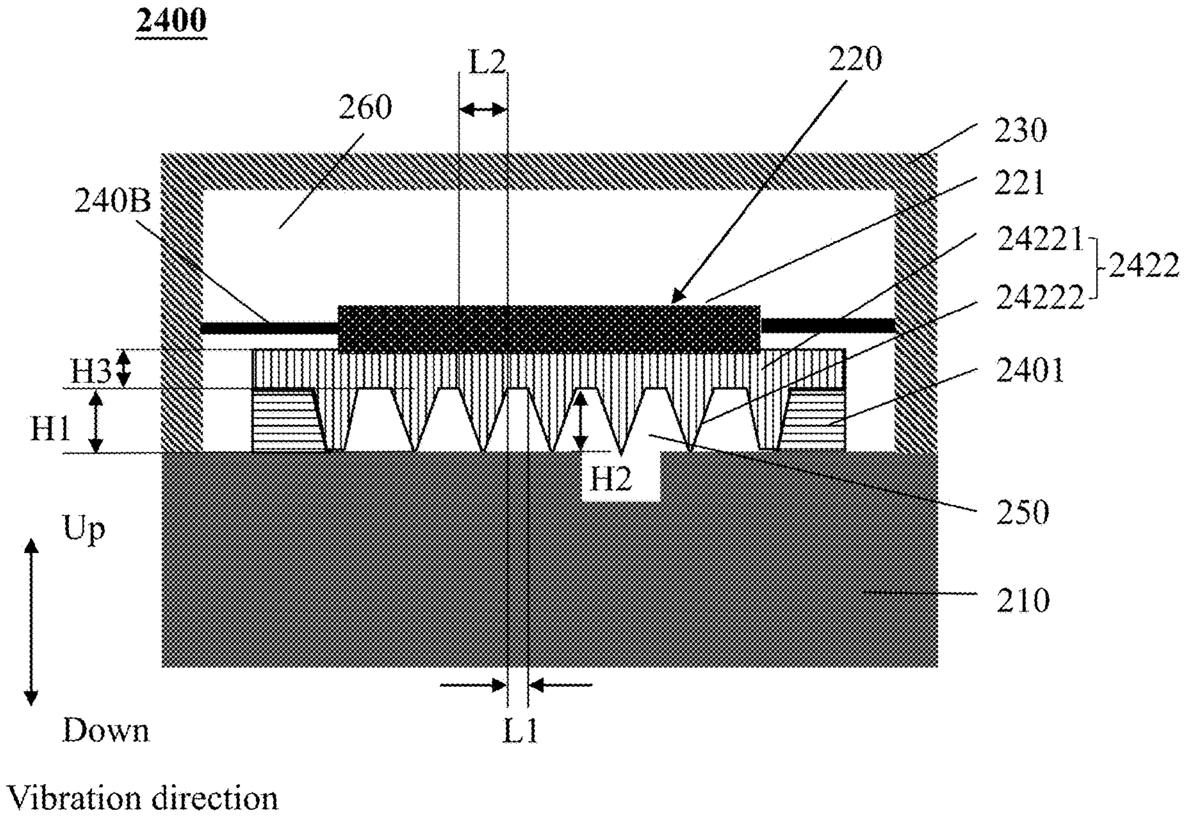
FIG. 26 is a schematic diagram illustrating an exemplary structure of a vibration sensor according to some embodiments of the present disclosure.

FIG. 24 is a schematic diagram illustrating an exemplary structure of a vibration sensor according to some embodiments of the present disclosure. FIG. 25 is a schematic diagram illustrating an exemplary structure of a vibration sensor according to some embodiments of the present disclosure. FIG. 26 is a schematic diagram illustrating an exemplary structure of a vibration sensor according to some embodiments of the present disclosure.

In some embodiments, an elastic element 2422 of the vibration assembly 220 illustrated in FIGS. 24-26 is arranged opposite to the acoustic transducer 210, and the first acoustic chamber 250 is formed between the elastic element 2422 and the acoustic transducer 210. In some embodiments, the elastic element 2422 may include an elastic film 24221. A side of the elastic film 24221 facing the first acoustic chamber 250 may be provided with a convex structure 24222. The convex structure 24222 and the elastic film 24221 may form the first acoustic chamber 250 with the acoustic transducer 210. The elastic film 24221 may form a first side wall of the first acoustic chamber 250, and the upper surface of the acoustic transducer 210 perpendicular to the vibration direction of the vibration assembly 220 may form a second side wall of the first acoustic chamber 250.

In some embodiments, an outer edge of the elastic film 24221 may be physically connected to the acoustic transducer 210. In some embodiments, a connection position between the top of the convex structure 24222 arranged on a periphery of the elastic film 24221 and the surface of the acoustic transducer 210 may be sealed by a sealing member 2401, so that the convex structure 24222, the elastic film 24221, the sealing member 2401, and the acoustic transducer 210 may form a closed first acoustic chamber 250. It can be understood that the arrangement of a location of the sealing member 2401 is not limited herein. In some embodiments, the sealing member 2401 may not be limited to be arranged at the connection position between the top of the convex structure 24222 and the surface of the acoustic transducer 210, but may also be arranged on the periphery (i.e., a side of the convex structure 24222 away from the first acoustic chamber 250) of the convex structure 24222 which is configured to form the first acoustic chamber 250. In some embodiments, to further improve the sealing performance, a sealing structure may also be arranged inside the first acoustic chamber 250. The connection position between the elastic element 2422 and the acoustic transducer 210 may be sealed through the sealing member 2401 to ensure the sealing of the entire first acoustic chamber 250, thereby effectively improving the reliability and stability of the vibration sensor 2400. In some embodiments, the sealing member 2401 may be made of material such as silica gel, rubber, or the like, to further improve the sealing performance of the sealing member 2401. In some embodiments, a type of the sealing member 2401 may include one or more of a sealing ring, a sealing gasket, and a sealing strip.

In some embodiments, the convex structure 24222 may be arranged on at least a partial region of a side (i.e., the lower surface of the elastic film 24221) of the elastic film 24221 facing the first acoustic chamber 250. In some embodiments, the convex structure 24222 may be arranged on the overall region of the side (i.e., the lower surface of the elastic film 24221) of the elastic film 24221 facing the first acoustic chamber 250. In some embodiments, a ratio of an area of the lower surface of the elastic film 24221 occupied by the convex structure 24222 to the area of the lower surface of the elastic film 24221 may be less than ¾. In some embodiments, the ratio of the area occupied by the convex structure 24222 to the area of the lower surface of the elastic film 24221 may be less than ⅔. In some embodiments, the ratio of the area occupied by the convex structure 24222 to the area of the lower surface of the elastic film 24221 may be less than ½. In some embodiments, the ratio of the area occupied by the convex structure 24222 to the area of the lower surface of the elastic film 24221 may be less than ¼. In some embodiments, the ratio of the area occupied by the convex structure 24222 to the area of the lower surface of the elastic film 24221 may be less than ⅙.

In some embodiments, the convex structure 24222 may have a certain elasticity. Since the convex structure 24222 has elasticity, an elastic deformation of the convex structure 24222 may occur when pressed by an external force. In some embodiments, the top of the convex structure 24222 may abut against a side wall (i.e., the second side wall of the first acoustic chamber 250) of the first acoustic chamber 250 opposite to the elastic element 2422. In some embodiments, the top of the convex structure 24222 refers to an end of the convex structure 24222 away from the elastic film 24221. When the convex structure 24222 abuts the second side wall of the first acoustic chamber 250, the vibration of the elastic element 2422 may drive the convex structure 24222 to move. The convex structure 24222 may be pressed against the second side wall of the first acoustic chamber 250 so that the elastic deformation of the convex structure 24222 occurs. The elastic deformation may cause the convex structure 24222 to protrude further into the first acoustic chamber 250, thereby reducing the volume of the first acoustic chamber 250. Therefore, the volume change of the first acoustic chamber 250 may be further increased, thereby improving the sensitivity of the vibration sensor 2400.

In some embodiments, the volume $V_0$ of the first acoustic chamber 250 may be related to the density of the convex structure 24222 that is used to make up the first acoustic chamber 250. It should be understood that when the interval between adjacent convex structures 24222 is smaller, it indicates that the density of the convex structures 24222 is higher, and thus the volume $V_0$ of the first acoustic chamber 250 formed by the convex structure 24222 is smaller. The interval between adjacent convex structures 24222 refers to a distance between centers of the adjacent convex structures 24222. The center herein may be understood as a centroid on a cross-section of the convex structure 24222. For the convenience of description, the interval between adjacent convex structures 24222 may be represented by L1 in FIG. 24, that is, a distance between the tops or centers of the adjacent convex structures. In some embodiments, the interval L1 between adjacent convex structures 24222 may be within a range of 1 μm-2000 μm. In some embodiments, the interval L1 between adjacent convex structures 24222 may be within a range of 4 μm-1500 μm. In some embodiments, the interval L1 between adjacent convex structures 24222 may be within a range of 8 μm-1000 μm. In some embodiments, the interval L1 between adjacent convex structures 24222 may be within a range of 10 μm-500 μm.

In some embodiments, the volume $V_0$ of the first acoustic chamber 250 may be related to a width of the convex structure 24222. The width of the convex structure 24222 may be understood as a size of the convex structure 24222 along the direction perpendicular to the vibration direction of the mass element 221. For the convenience of description, the size of the convex structure 24222 along the direction perpendicular to the vibration direction of the mass element 221 may be represented by L2 in FIG. 24. In some embodiments, the width L2 of a single convex structure 24222 may be within a range of 1 μm-1000 μm. In some embodiments, the width L2 of a single convex structure 24222 may be within a range of 2 μm-800 μm. In some embodiments, the width L2 of a single convex structure 24222 may be within a range of 3 μm-600 μm. In some embodiments, the width L2 of a single convex structure 24222 may be within a range of 6 μm-400 μm. In some embodiments, the width L2 of a single convex structure 24222 may be within a range of 10 μm-300 μm.

For vibration sensors 2400 of different types and/or sizes, a ratio of the width L2 of the convex structure 24222 to the interval L1 between adjacent convex structures 24222 may be within a certain range. In some embodiments, the ratio of the width L2 of the convex structure 24222 to the interval L1 between adjacent convex structures 24222 may be within a range of 0.05~20. In some embodiments, the ratio of the width L2 of the convex structure 24222 to the interval L1 between adjacent convex structures 24222 may be within a range of 0.1~20. In some embodiments, the ratio of the width L2 of the convex structure 24222 to the interval L1 between adjacent convex structures 24222 may be within a range of 0.1~10. In some embodiments, the ratio of the width L2 of the convex structure 24222 to the interval L1 between adjacent convex structures 24222 may be within a range of 0.5~8. In some embodiments, the ratio of the width L2 of the convex structure 24222 to the interval L1 between adjacent convex structures 24222 may be within a range of 1~6. In some embodiments, the ratio of the width L2 of the convex structure 24222 to the interval L1 between adjacent convex structures 24222 may be within a range of 2~4.

In some embodiments, the volume $V_0$ of the first acoustic chamber 250 may be related to a height H1 of the convex structure 24222. The height of the convex structure 24222 may be understood as a size of the convex structure 24222 along the vibration direction of the mass element 221 when the convex structure 24222 is in a natural state (e.g., the convex structure 24222 is not compressed to generate the elastic deformation). For the convenience of description, the size of the convex structure 24222 along the vibration direction of the mass element 221 may be represented by H1 in FIG. 24. In some embodiments, the height H1 of the convex structure 24222 may be within a range of 1 μm~1000 μm. In some embodiments, the height H1 of the convex structure 24222 may be within a range of 2 μm~800 μm. In some embodiments, the height H1 of the convex structure 24222 may be within a range of 4 μm~600 μm. In some embodiments, the height H1 of the convex structure 24222 may be within a range of 6 μm~500 μm. In some embodiments, the height H1 of the convex structure 24222 may be within a range of 8 μm~400 μm. In some embodiments, the height H1 of the convex structure 24222 may be within a range of 10 μm~300 μm.

In some embodiments, a difference between the height of the first acoustic chamber 250 and the height of the convex structure 24222 may be within a certain range. For example, at least a portion of the convex structure 24222 may not be in contact with acoustic transducer 210. A certain gap may be formed between the convex structure 24222 and the surface of the acoustic transducer 210. The gap between the convex structure 24222 and the surface of the acoustic transducer 210 refers to a distance between the top of the convex structure 24222 and the surface of the acoustic transducer 210. The gap may be formed during the process of preparing the convex structure 24222 or installing the elastic element 2422. The height of the first acoustic chamber 250 may be understood as a size of the first acoustic chamber 250 in a natural state (e.g., the vibration or elastic deformation of the first side wall and the second side wall thereof does not occur) along a first direction. For the convenience of description, the size of the first acoustic chamber 250 along the vibration direction of the mass element 221 may be represented by H2 in FIG. 24. In some embodiments, the difference between the height H1 of the convex structure 24222 and the height H2 of the first acoustic chamber 250 may be within 20%. In some embodiments, the difference between the height H1 of the convex structure 24222 and the height H2 of the first acoustic chamber 250 may be within 15%. In some embodiments, the difference between the height H1 of the convex structure 24222 and the height H2 of the first acoustic chamber 250 may be within 10%. In some embodiments, the difference between the height H1 of the convex structure 24222 and the height H2 of the first acoustic chamber 250 may be within 5%. In some embodiments, the gap between the convex structure 24222 and the surface of the acoustic transducer 210 may be within 10 μm. In some embodiments, the gap between the convex structure 24222 and the surface of the acoustic transducer 210 may be within 5 μm. In some embodiments, the gap between the convex structure 24222 and the surface of the acoustic transducer 210 may be within 1 μm.

When the vibration sensor 2400 is working, the elastic element 2422 may generate vibration or elastic deformation after receiving an external signal (e.g., a vibration signal) and drive the convex structure 24222 to move along the vibration direction of the mass element 221, so that the first acoustic chamber 250 may shrink or expand, and the volume change of the first acoustic chamber 250 may be expressed as ΔV1. Since the vibration amplitudes of the elastic element 2422 and the convex structure 24222 along the vibration direction of the mass element 221 are small, for example, the vibration amplitude of the convex structure 24222 along the vibration direction of the mass element 221 is usually less than 1 μm, the convex structures 24222 may not be in contact with the surface of the acoustic transducer 210, and thus ΔV1 may be irrelevant to the convex structures 24222, and ΔV1 may have a smaller value.

For vibration sensors 2400 of different types and/or sizes, a ratio or a difference between the height H1 of the convex structure 24222 and the thickness (the thickness of the elastic film 24221 may be represented by H3 in FIG. 24) of the elastic film 24221 may be within a certain range. In some embodiments, the ratio of the height H1 of the convex structure 24222 to the thickness H3 of the elastic film 24221 may be within a range of 0.5~500. In some embodiments, the ratio of the height H1 of the convex structure 24222 to the thickness H3 of the elastic film 24221 may be within a range of 1~500. In some embodiments, the ratio of the height H1 of the convex structure 24222 to the thickness H3 of the elastic film 24221 may be within a range of 1200. In some embodiments, the ratio of the height H1 of the convex structure 24222 to the thickness H3 of the elastic film 24221 may be within a range of 1~100. In some embodiments, the ratio of the height H1 of the convex structure 24222 to the thickness H3 of the elastic film 24221 may be within a range of 10~90. In some embodiments, the ratio of the height H1 of the convex structure 24222 to the thickness H3 of the elastic film 24221 may be within a range of 20~80. In some embodiments, the ratio of the height H1 of the convex structure 24222 to the thickness H3 of the elastic film 24221 may be within a range of 40~60.

For vibration sensors 2400 of different types and/or sizes, a ratio of the projection area of the mass element 221 along the vibration direction of the mass element 221 to a projection area of the first acoustic chamber 250 along the vibration direction of the mass element 221 may be within a certain range. In some embodiments, the ratio of the projection area of the mass element 221 along the vibration direction of the mass element 221 to the projection area of the first acoustic chamber 250 along the vibration direction of the mass element 221 may be within a range of 0.05~0.95. In some embodiments, the ratio of the projection area of the mass element 221 along the vibration direction of the mass element 221 to the projection area of the first acoustic chamber 250 along the vibration direction of the mass element 221 may be within a range of 0.2~0.9. In some embodiments, the ratio of the projection area of the mass element 221 along the vibration direction of the mass element 221 to the projection area of the first acoustic chamber 250 along the vibration direction of the mass element 221 may be within a range of 0.4~0.7. In some embodiments, the ratio of the projection area of the mass element 221 along the vibration direction of the mass element 221 to the projection area of the first acoustic chamber 250 along the vibration direction of the mass element 221 may be within a range of 0.5~0.6.

In some embodiments, as illustrated in FIG. 24, the structure and arrangement of the buffer member 240 are similar to those illustrated in FIG. 2. The buffer member 240 may include a buffer connection layer. The upper surface and the lower surface of the buffer connection layer along the vibration direction of the vibration assembly 220 may be connected to the elastic film 24221 and the mass element 221 respectively, and the mass element 221 may be fixed on the elastic element 222 (the elastic film 24221) through the buffer connection layer. In some embodiments, the buffer connection layer may include a flexible film layer. The elastic element 222 may be connected to the mass element 221 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the mass element 821 and the elastic element 222 through the adhesive layer 242. More details about the buffer connection layer may be found elsewhere in the present disclosure, such as FIG. 2 and the related descriptions thereof.

In some embodiments, as illustrated in FIG. 25, the structure and arrangement of the buffer member 240 are similar to those illustrated in FIG. 3. In some embodiments, the buffer member 240 may include the buffer adhesive layer 240A. The buffer adhesive layer 240A may be arranged on a region of the elastic element 222 excluding a region corresponding to the projection region of the mass element 221 along the vibration direction. As illustrated in FIG. 25, the buffer adhesive layer 240A may be located on the upper surface of the elastic film 24221 where the mass element 221 is located, and the buffer adhesive layer 240A may be arranged on a region of the elastic film 24221 that is not covered by the mass element 221. More details about the buffer adhesive layer may be found elsewhere in the present disclosure, such as FIG. 3 and the related descriptions thereof.

In some embodiments, as illustrated in FIG. 26, the structure and arrangement of the buffer member 240 are similar to those illustrated in FIG. 4B. In some embodiments, the buffer member 240 may include the cantilever beam 240B. The cantilever beam 240B may be arranged on a side of the mass element 221. An end of the cantilever beam 240B may be connected to the housing 230 or the supporting member arranged on the housing 230, and another end of the cantilever beam 240B may be connected to the mass element 221. In some embodiments, a gap may be formed between the cantilever beam 240B and the elastic film 24221 of the elastic element 2422, so that the vibration of the cantilever beam 240B may not interfere with the vibration of the elastic element 2422, thereby avoiding an influence on the mechanical property of the elastic element 2422. More details about the cantilever beam may be found elsewhere in the present disclosure, such as FIG. 4B and the related descriptions thereof.

Figure 27:
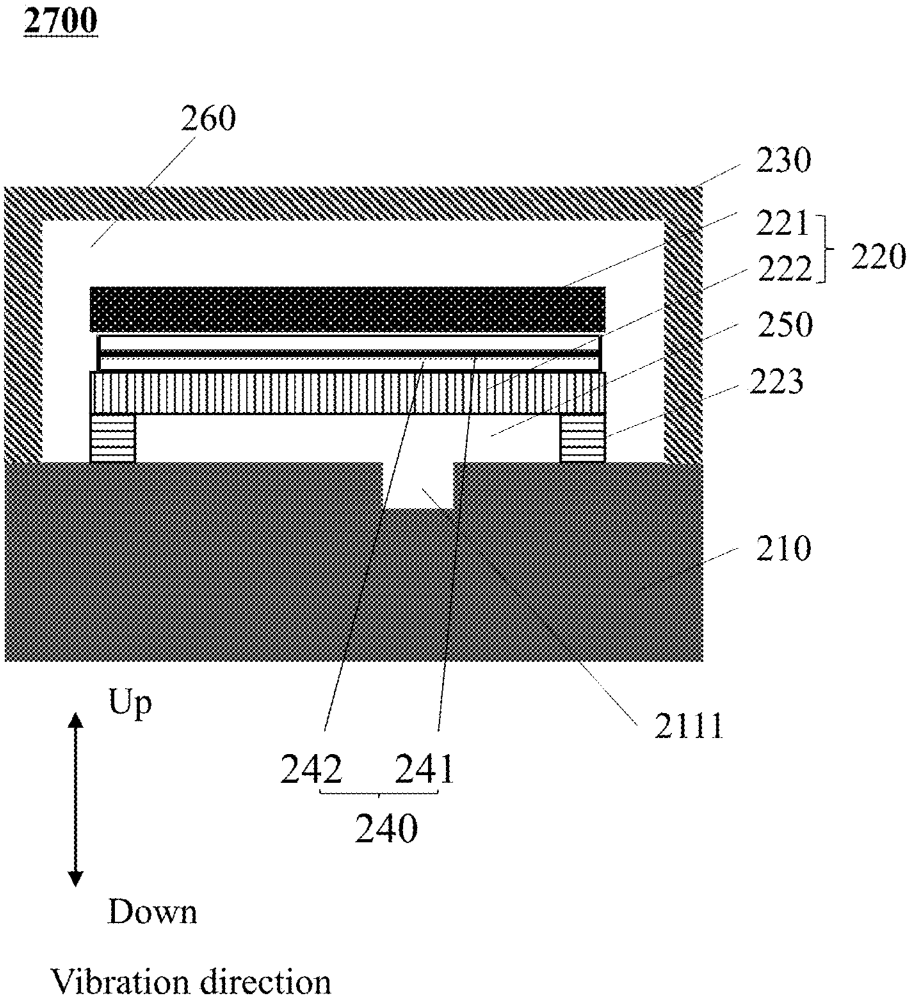
FIG. 27 is a schematic diagram illustrating an exemplary structure of a vibration sensor according to some embodiments of the present disclosure.

FIG. 27 is a schematic diagram illustrating an exemplary structure of a vibration sensor according to some embodiments of the present disclosure.

In some embodiments, a structure of a vibration sensor 2700 illustrated in FIG. 27 is substantially the same as that of the vibration sensor 200 illustrated in FIGS. 2-4B, except for the vibration assembly. In some embodiments, the vibration assembly 220 of the vibration sensor 2700 may include the mass element 221, the elastic element 222, and the supporting member 223. The mass element 221 and the supporting member 223 may be physically connected to two sides of the elastic element 222, respectively. For example, the mass element 221 and the supporting member 223 may be connected to the upper surface and the lower surface of the elastic element 222, respectively. The supporting member 223 may be physically connected to the acoustic transducer 210. For example, an upper end of the supporting member 223 may be connected to the lower surface of the elastic element 222, and a lower end of the supporting member 223 may be connected to the acoustic transducer 210. The supporting member 223, the elastic element 222, and the acoustic transducer 210 may form the first acoustic chamber 250. In some embodiments, when the vibration assembly 220 responds to the vibration signal of the housing 230, a compression deformation of a contact region between the elastic element 222 and the supporting member 223 may occur during the vibration process of the mass element 221. The compression deformation of the elastic element 222 may cause the volume of the first acoustic chamber 250 to be changed, and the acoustic transducer 210 may generate an electrical signal based on the volume change of the first acoustic chamber 250.

In some embodiments, an area of a cross-section of the mass element 221 perpendicular to the vibration direction of the vibration assembly 220 may be greater than an area of a cross-section of the first acoustic chamber 250 perpendicular to the vibration direction of the vibration assembly 220. In some embodiments, an area of a cross-section of the elastic element 222 perpendicular to the vibration direction of the vibration assembly 220 may be greater than the area of the cross-section of the first acoustic chamber 250 perpendicular to the vibration direction of the vibration assembly 220.

In some embodiments, the area of the cross-section of the mass element 221 perpendicular to the vibration direction of the vibration assembly 220 is greater than the area of the cross-section of the first acoustic chamber 250 perpendicular to the vibration direction of the vibration assembly 220, which indicates that the mass element 221 may completely cover an opening of the upper end of the first acoustic chamber 250. In some embodiments, the area of the cross-section of the elastic element 222 perpendicular to the vibration direction of the vibration assembly 220 is greater than the area of the cross-section of the first acoustic chamber 250 perpendicular to the vibration direction of the vibration assembly 220, which indicates that the elastic element 222 may completely cover the opening of the upper end of the first acoustic chamber 250. The arrangement of the area of the cross-section of the mass element 221 perpendicular to the vibration direction of the vibration assembly 220 and the area of the cross-section of the elastic element 222 perpendicular to the vibration direction of the vibration assembly 220 may ensure that a deformation region of the vibration assembly 220 is a contact region between the elastic element 222 and the supporting member 223.

It should be noted that when the area of the cross-section of the first acoustic chamber 250 perpendicular to the vibration direction of the vibration assembly 220 changes with different heights, the area of the cross-section of the first acoustic chamber 250 perpendicular to the vibration direction of the vibration assembly 220 described in the present disclosure refers to an area of a cross-section of a side of the first acoustic chamber 250 close to the elastic element 222 and perpendicular to the vibration direction of the vibration assembly 220.

In some embodiments, when the mass element 221 vibrates, only the contact region between the elastic element 222 and the supporting member 223 undergoes compression deformation. The contact portion between the elastic element 222 and the supporting member 223 may be equivalent to a spring, and the supporting member 223 may be provided to increase the sensitivity of the vibration sensor 2700.

In some embodiments, the first acoustic chamber 250 may be in communication with the sound inlet 2111 of the acoustic transducer 210 directly to form an acoustic connection between the first acoustic chamber 250 and the acoustic transducer 210.

In some embodiments, the supporting member 223 may be a rigid material (e.g., metal, plastic, etc.) used to support the elastic element 222 and the mass element 221. By arranging the supporting member 223 as a rigid material, the rigid supporting member 223 may cooperate with the elastic element 222 and the mass element 221 to change the volume of the first acoustic chamber 250. The rigid supporting member 223 may be easy to process, so that a supporting member 223 with a smaller thickness may be processed, which is more convenient to precisely limit the height of the first acoustic chamber 250 (e.g., the height of the first acoustic chamber 250 may be smaller), thereby improving the sensitivity of the vibration sensor 3300.

In some embodiments, the thickness of the supporting member 223 may refer to a distance between the lower surface and the upper surface of the supporting member 223. In some embodiments, the thickness of the supporting member 223 may be greater than a first thickness threshold (e.g., 1 um). In some embodiments, the thickness of the supporting member 223 may be less than a second thickness threshold (e.g., 1000 um). For example, the thickness of the supporting member 223 may be within a range of 1 um~1000 um. For another example, the thickness of the supporting member 223 may be within a range of 5 um~600 um. For another example, the thickness of the supporting member 223 may be within a range of 10 um~200 um.

In some embodiments, the height of the first acoustic chamber 250 may be equal to the thickness of the supporting member 223. In other embodiments, the height of the first acoustic chamber 250 may be smaller than the thickness of the supporting member 223.

In some embodiments, the supporting member 223 may include a ring structure. When the supporting member 223 includes the ring structure, the first acoustic chamber 250 may be located in a hollow portion of the ring structure, and the elastic element 222 may be arranged above the ring structure and close the hollow portion of the ring structure to form the first acoustic chamber 250.

It should be understood that the ring structure may include a circular ring structure, a triangular ring structure, a rectangular ring structure, a hexagonal ring structure, an irregular ring structure, or the like. In the present disclosure, the ring structure may include an inner edge and an outer edge surrounding the inner edge. The shape of the inner edge may be the same as the shape of the outer edge of the ring structure. For example, the inner edge and the outer edge of the ring structure may be in a shape of circular, and the ring structure may be a circular ring structure. As another example, the inner edge and the outer edge of the ring structure may be in a shape of a hexagon, and the ring structure may be a hexagonal ring structure. The shape of the inner edge may be different from the shape of the outer edge of the ring structure. For example, the inner edge of the ring structure may be in a shape of circular, and the outer edge of the ring structure may be in a shape of rectangular.

In some embodiments, an outer edge of the mass element 221 and an outer edge of the elastic element 222 may be located on the supporting member 223. Merely by way of example, when the supporting member 223 includes the ring structure, the outer edge of the mass element 221 and the outer edge of the elastic element 222 may be located on an upper surface of the ring structure, or the outer edge of the mass element 221 and the outer edge of the elastic element 222 may be flush with the outer ring of the ring structure. In some embodiments, the outer edge of the mass element 221 and the outer edge of the elastic element 222 may be located outside the supporting member 223. For example, when the supporting member 223 includes the ring structure, the outer edge of the mass element 221 and the outer edge of the elastic element 222 may be located outside the outer ring of the ring structure.

In some embodiments, a difference between an inner diameter and an outer diameter of the ring structure may be greater than a first difference threshold (e.g., 1 um). In some embodiments, the difference between the inner diameter and the outer diameter of the ring structure may be less than a second difference threshold (e.g., 300 um). For example, the difference between the inner diameter and the outer diameter of the ring structure may be within a range of 1 um~300 um. For another example, the difference between the inner diameter and the outer diameter of the ring structure may be within a range of 5 um~200 um. For another example, the difference between the inner diameter and the outer diameter of the ring structure may be within a range of 10 um~100 um. The difference between the inner diameter and the outer diameter of the ring structure may be limited, so that an area of the contact region between the elastic element 222 and the supporting member 223 may be limited. Therefore, by setting the difference between the inner diameter and the outer diameter of the ring structure within the above range, the sensitivity of the vibration sensor 2700 may be improved.

In some embodiments, as illustrated in FIG. 27, the structure and arrangement of the buffer member 240 are similar to those illustrated in FIG. 2. The buffer member 240 may include the buffer connection layer. The upper surface and the lower surface of the buffer connection layer along the vibration direction of the vibration assembly 220 may be connected to the elastic element 222 and the mass element 221 respectively, and the mass element 821 may be fixed on the elastic element 222 through the buffer connection layer. In some embodiments, the buffer connection layer may include the flexible film layer. The elastic element 222 may be connected to the mass element 221 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the mass element 221 and the elastic element 222 through the adhesive layer 242. In some embodiments, by arranging the buffer member 240 in the vibration sensor 2700, during the vibration process of the vibration assembly 220, the impact force generated by the vibration of the mass element 221 may act on the elastic element 222 through the buffer member 240, so that the buffer member 240 can reduce the impact force of the mass element 221 acting on the elastic element 222 and improve the performance of the elastic element 222 against the impact of the mass element 221, thereby preventing the elastic element 222 from being damaged caused by a greater impact of the mass element 221 and improving the reliability of the vibration sensor 2700. More details about the buffer connection layer may be found elsewhere in the present disclosure, such as FIG. 2 and the related descriptions thereof.

Figure 28:
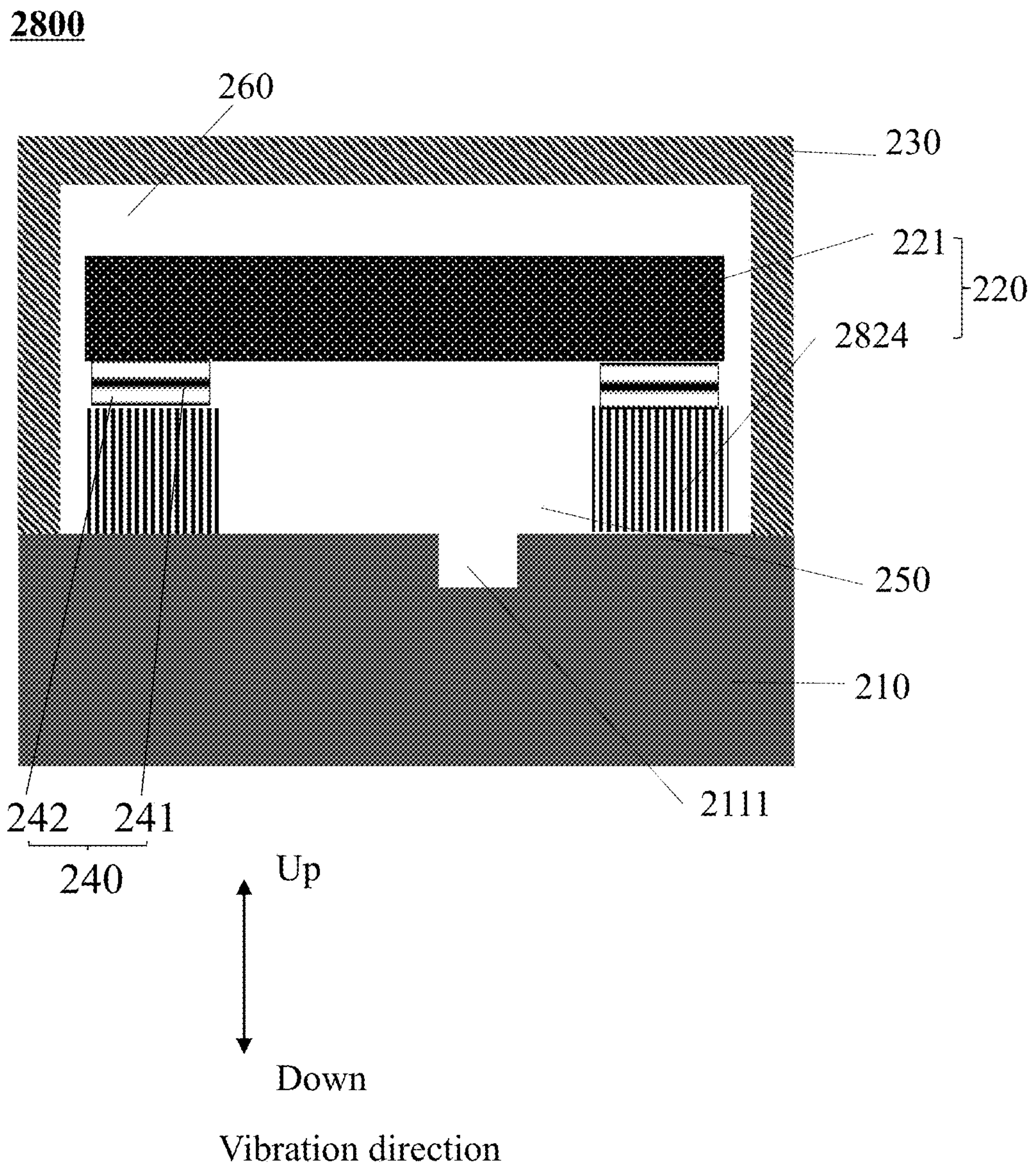
FIG. 28 is a schematic diagram illustrating an exemplary structure of a vibration sensor according to some embodiments of the present disclosure.

FIG. 28 is a schematic diagram illustrating an exemplary structure of a vibration sensor according to some embodiments of the present disclosure.

Figure 30:
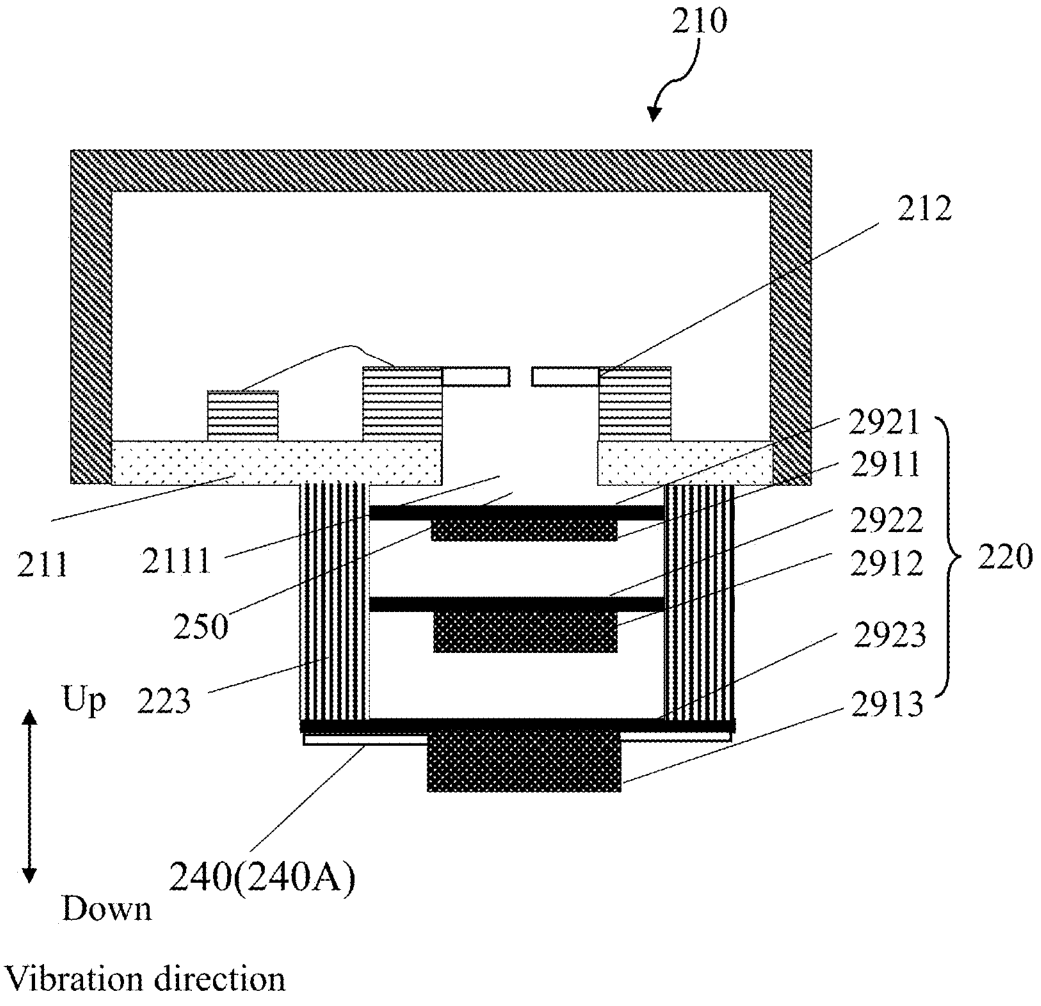
FIG. 30 is a schematic diagram illustrating an exemplary structure of a vibration sensor according to some embodiments of the present disclosure.
Figure 33:
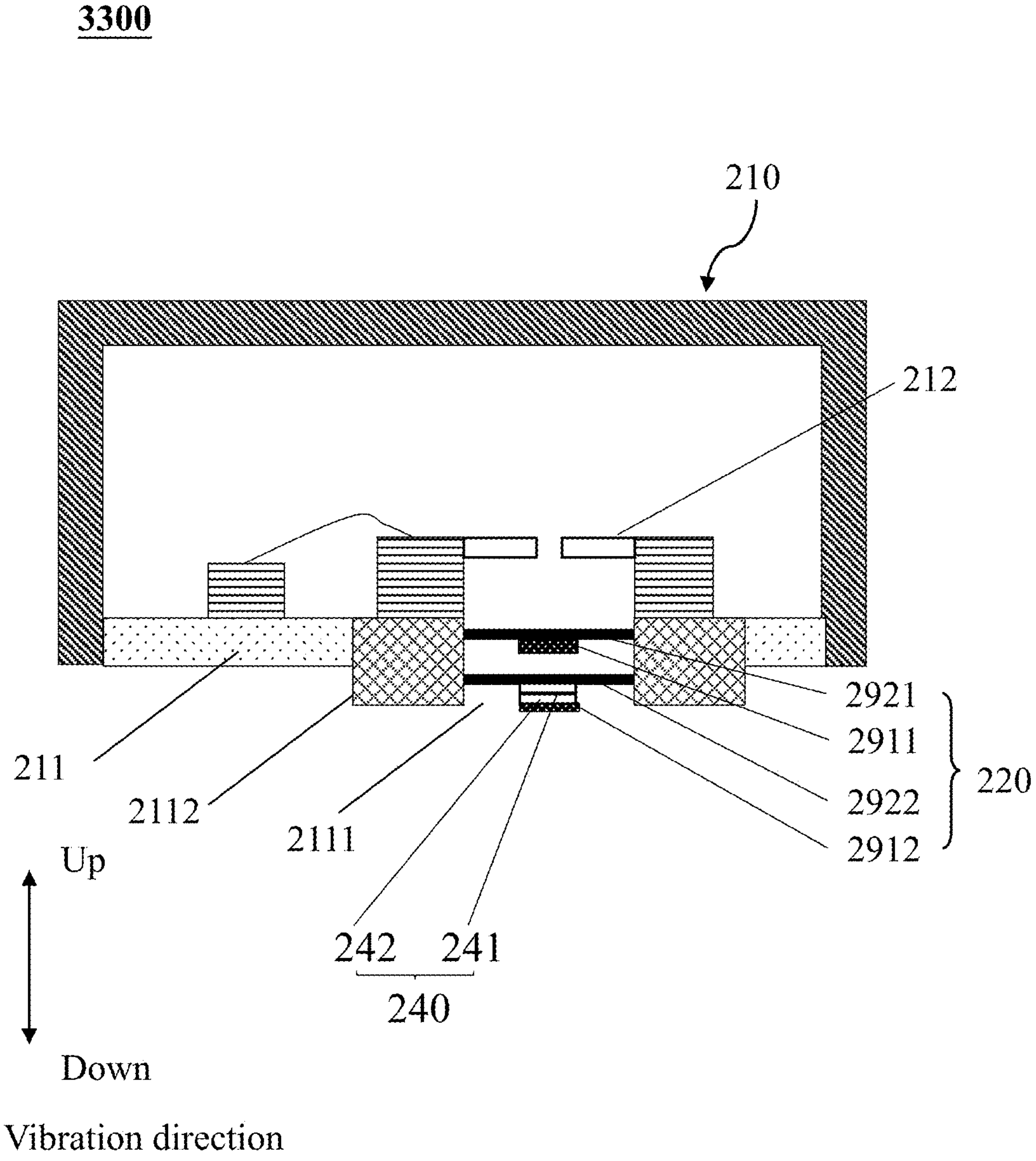
FIG. 33 is a schematic diagram illustrating an exemplary structure of a vibration sensor according to some embodiments of the present disclosure.

A vibration sensor 2800 illustrated in FIG. 28 is similar to the vibration sensor 2700 illustrated in FIG. 27, except for the elastic element and the supporting member. In some embodiments, for the vibration sensor 2800, structures of the supporting member 223 and the elastic element 222 of the vibration sensor 2700 may be replaced with an elastic supporting member 2824. That is, the vibration assembly 220 of the vibration sensor 2800 may include the mass element 221 and the elastic supporting member 2824. In some embodiments, the elastic supporting member 2824 may be a material with certain elasticity. For example, the material with certain elasticity may include a polymer elastic material such as polytetrafluoroethylene, polydimethylsiloxane, or the like. In some embodiments, as illustrated in FIG. 33 and FIG. 30, the thickness of the supporting member 223 may be smaller than a thickness of the elastic supporting member 2824, so that the size of the first acoustic chamber 250 of the vibration sensor 2700 may be smaller and the sensitivity of the vibration sensor 2700 may be higher. Taking a ring-shaped supporting member 223 and a ring-shaped elastic supporting member 2824 as an example, due to the lower processing difficulty of the supporting member 223, the area of the cross-section of the supporting member 223 perpendicular to the vibration direction of the vibration assembly 220 may be smaller than an area of the cross-section of the elastic supporting member 2824 perpendicular to the vibration direction of the vibration assembly 220, so that an area of compression deformation can be smaller, resulting in a smaller equivalent stiffness of the vibration assembly 220 of the vibration sensor 2700, which means a lower resonance frequency.

In some embodiments, as illustrated in FIG. 28, the structure and arrangement of the buffer member 240 are similar to those illustrated in FIG. 27. The buffer member 240 may include the buffer connection layer. The upper surface and the lower surface of the buffer connection layer along the vibration direction of the vibration assembly 220 may be connected to the mass element 821 and the elastic supporting member 2824 respectively, and the mass element 821 may be fixed on the elastic supporting member 2824 through the buffer connection layer. In some embodiments, the buffer connection layer may include the flexible film layer. The elastic element 222 may be connected to the mass element 221 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the mass element 221 and the elastic element 222 through the adhesive layer 242.

Figure 29:
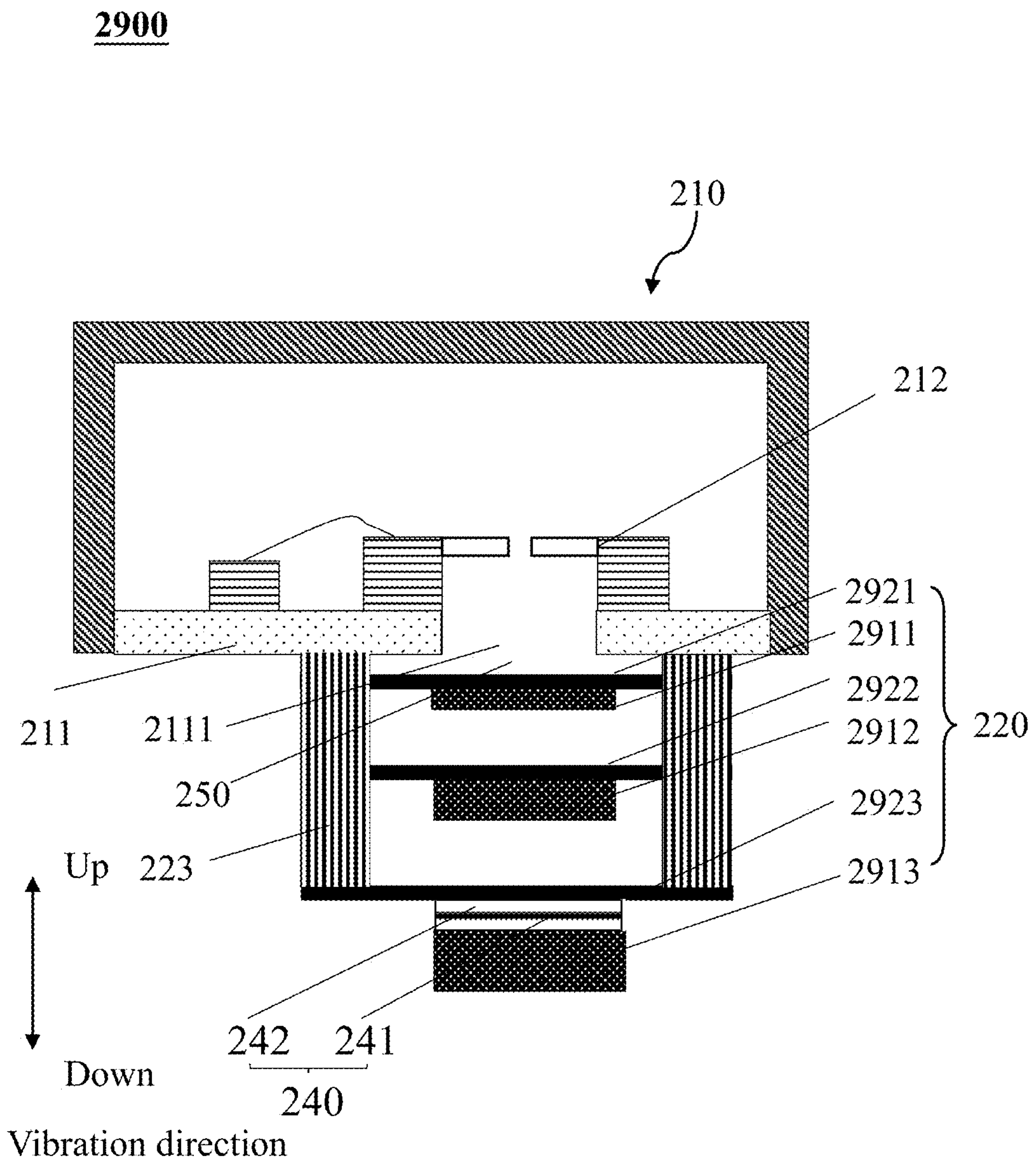
FIG. 29 is a schematic diagram illustrating an exemplary structure of a vibration sensor according to some embodiments of the present disclosure.
Figure 31:
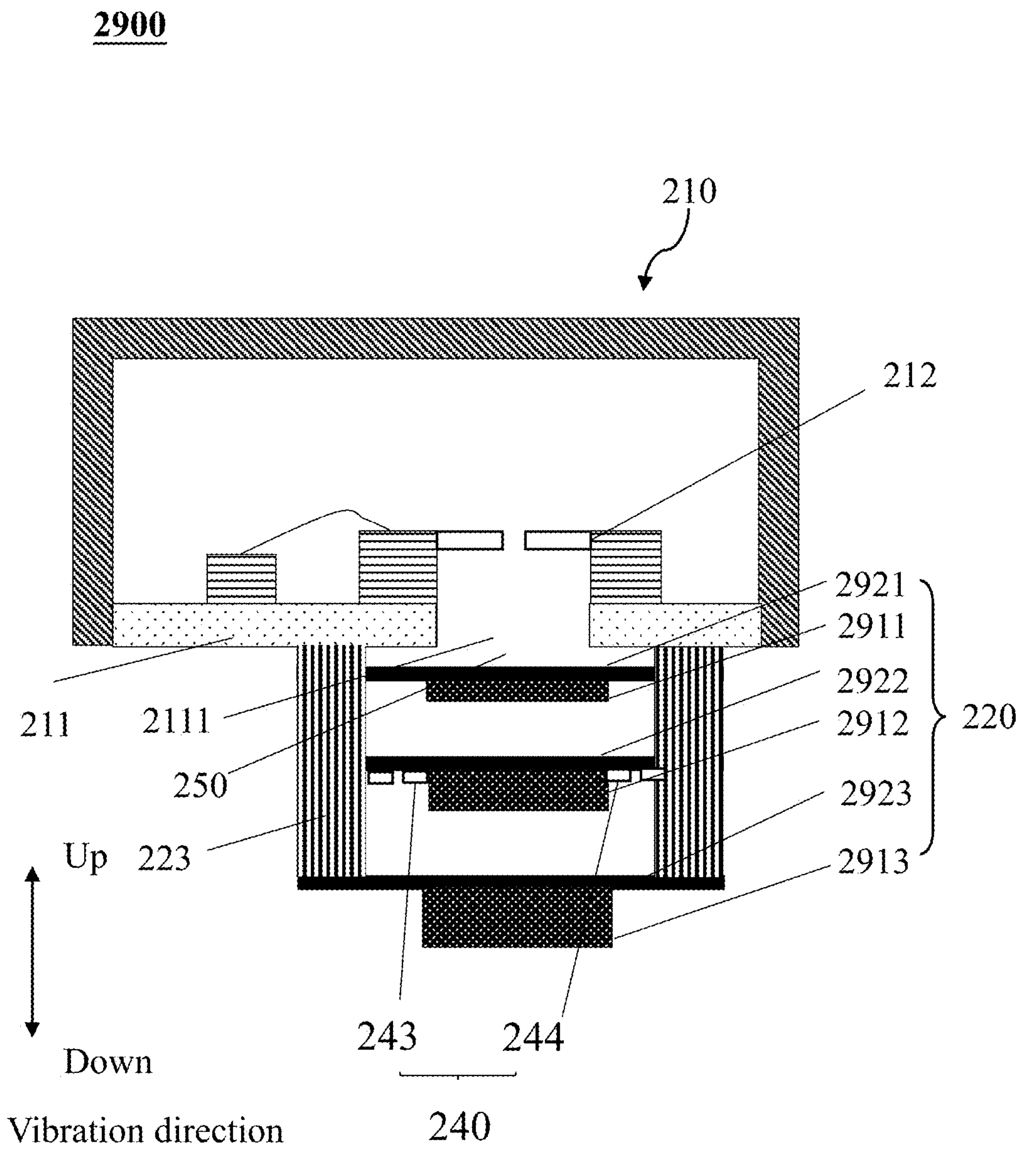
FIG. 31 is a schematic diagram illustrating an exemplary structure of a vibration sensor according to some embodiments of the present disclosure.
Figure 32:
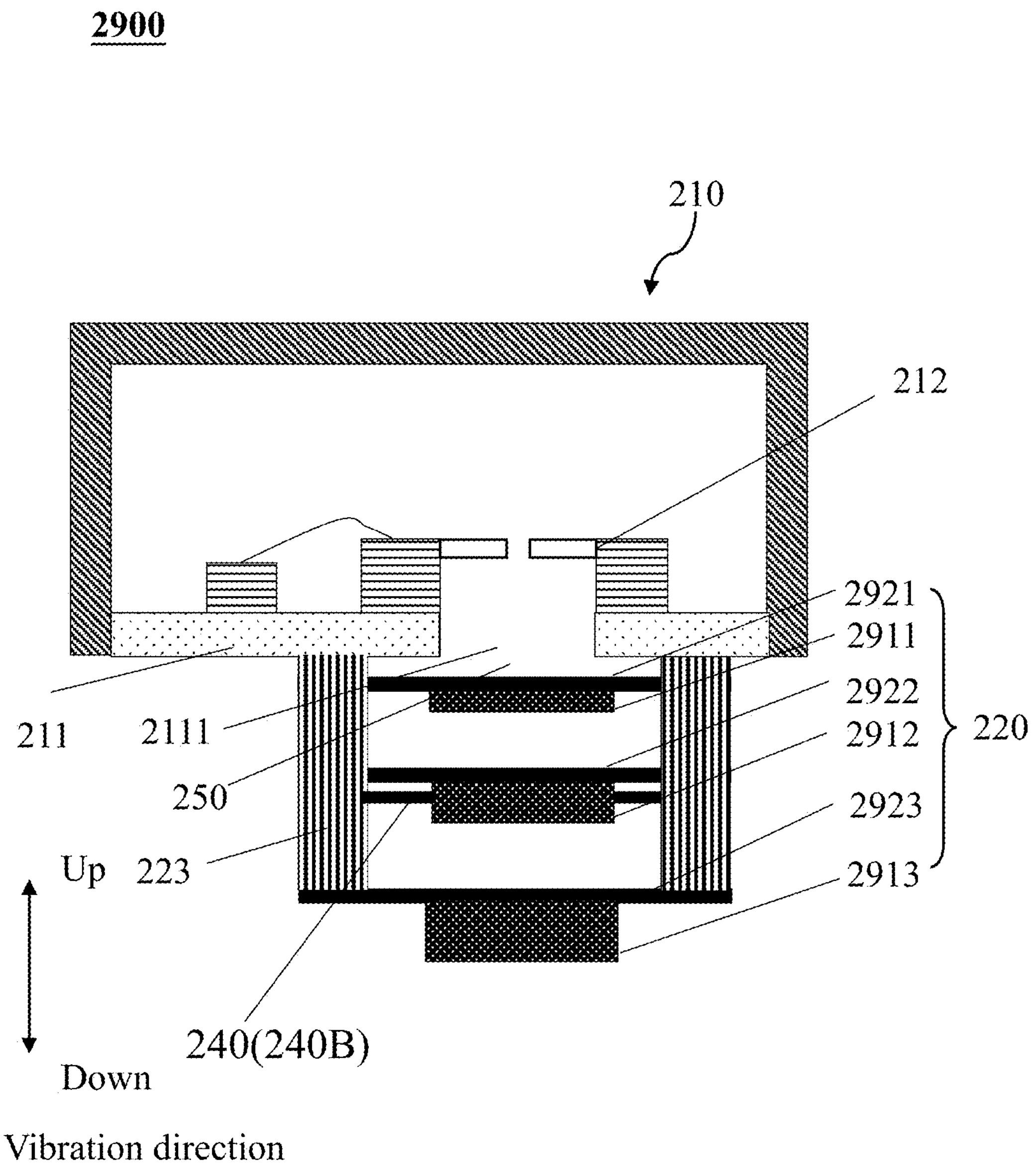
FIG. 32 is a schematic diagram illustrating an exemplary structure of a vibration sensor according to some embodiments of the present disclosure.

FIG. 29 is a schematic diagram illustrating an exemplary structure of a vibration sensor according to some embodiments of the present disclosure. FIG. 30 is a schematic diagram illustrating an exemplary structure of a vibration sensor according to some embodiments of the present disclosure. FIG. 31 is a schematic diagram illustrating an exemplary structure of a vibration sensor according to some embodiments of the present disclosure. FIG. 32 is a schematic diagram illustrating an exemplary structure of a vibration sensor according to some embodiments of the present disclosure.

A vibration sensor 2900 illustrated in FIGS. 29-32 is similar to the vibration sensor 1000 illustrated in FIG. 10, except for the vibration assembly. In some embodiments, the vibration assembly 220 of the vibration sensor 2900 may include one or more groups of elastic elements and mass elements. In some embodiments, the elastic element(s) may be a diaphragm, and the mass element(s) may be a mass block. That is, the vibration assembly 220 of the vibration sensor 2900 may include one or more groups of diaphragms and mass blocks. The one or more groups of elastic elements may include a first elastic element 2921 (i.e., a first diaphragm), a second elastic element 2922 (i.e., a second diaphragm), and a third elastic element 2923 (i.e., a third diaphragm) arranged in sequence along the vibration direction of the vibration assembly 220. The one or more groups of mass elements may include a first mass element 2911 (i.e., a first mass block), a second mass element 2912 (i.e., a second mass block), and a third mass element 2913 (i.e., a third mass block) arranged in sequence along the vibration direction of the vibration assembly 220. The first elastic element 2921 may be connected to the first mass element 2911, the second elastic element 2922 may be connected to the second mass element 2912, and the third elastic element 2923 may be connected to the third mass element 2913.

In some embodiments, a distance between any two adjacent elastic elements among the first elastic element 2921, the second elastic element 2922, and the third elastic element 2923 may be not less than a maximum amplitude of the two adjacent elastic elements. The arrangement illustrated above may ensure that the elastic element may not interfere with an adjacent elastic element during the vibration, thereby avoiding an influence on the transmission effect of the vibration signal. In some embodiments, when the vibration assembly 220 includes a plurality of groups of elastic elements and mass elements, the elastic elements may be arranged along the vibration direction of the vibration assembly 220 in sequence, and the distance between adjacent elastic elements may be the same or different. In some embodiments, gaps between adjacent elastic elements may form a plurality of chambers, and the plurality of chambers between the adjacent elastic elements may accommodate air and allow the elastic elements to vibrate therein.

In some embodiments, the vibration assembly 220 may further include a limiting structure (not shown in the figure), which is used to ensure that the distance between adjacent elastic elements in the vibration assembly 220 may be not less than the maximum amplitude of the adjacent elastic elements. In some embodiments, the limiting structure may be connected to the edge of the elastic element(s). The limiting structure may not interfere with the vibration of the elastic element(s) by controlling the damping of the limiting structure.

In some embodiments, the mass element in each group of the elastic element and the mass element (which is also referred to as a group of vibration structures) may include a plurality of mass elements and the plurality of mass elements may be arranged on two sides of the elastic element respectively. Merely by way of example, assuming that a group of vibration assemblies includes two mass elements, the two mass elements may be symmetrically arranged on two sides of the elastic element. In some embodiments, the mass elements in the plurality of groups of vibration assemblies may be located on the same side of the elastic elements. The mass elements may be arranged at the outer side or inner side of the elastic elements. A side of the elastic element(s) close to the acoustic transducer 210 may be the inner side, and a side away from the acoustic transducer 210 may be the outer side. It should be noted that in some embodiments, the mass elements in the plurality of groups of vibration assemblies may be located on different sides of the elastic elements. For example, the first mass element 2911 and the second mass element 2912 may be located on the outer side of the corresponding elastic element, and the third mass element 2913 may be located on the inner side of the corresponding elastic element.

In some embodiments, the elastic element(s) may be configured as a film-like structure that is capable of allowing air to pass through. In some embodiments, the elastic element(s) may be the air-permeable membrane. The elastic element(s) may be configured to allow air to pass through, so that the vibration signal may cause the vibration assembly 220 to vibrate and further penetrate the air-permeable membrane so as to be received by the acoustic transducer, thereby improving the sensitivity in the target frequency band. In some embodiments, the materials and sizes of the plurality of elastic elements in the vibration assembly 220 may be different or the same. Merely by way of example, a radius of the third elastic element 2923 may be greater than a radius of the first elastic element 2921 or a radius of the second elastic element 2922.

In some embodiments, when the elastic element(s) is configured to be air-impermeable, the material of the elastic element(s) may be a polymer film, such as polyurethane, epoxy resin, acrylic ester, or the like, or a metal film, such as copper, aluminum, tin, or other alloys, or composite films, or the like. In some embodiments, the air-impermeable elastic element(s) may also be obtained by processing (e.g., covering the air-permeable holes) the air-permeable membrane.

In some embodiments, the elastic element(s) may be a film material with through holes. Specifically, a diameter of the through hole(s) may be within a range of 0.01 μm~10 μm. Preferably, the diameter of the through hole(s) may be within a range of 0.1 μm~5 μm, such as 0.2 μm, 0.5 μm, 0.8 μm, 1 μm, 2 μm, or the like. In some embodiments, the diameters of the through holes on the plurality of elastic elements in the vibration assembly 220 may be the same or different, and the diameters of the through holes on a single elastic element may be the same or different. In some embodiments, the diameter of the through hole(s) may also be greater than 5 μm. When the diameter of the through hole(s) is greater than 5 μm, any other material (e.g., silica gel, etc.) may be arranged on the elastic element(s) to cover part of the through hole(s) or a part of a region of the through hole(s) without affecting the air permeability.

In some embodiments, under a condition that the vibration assembly 220 is provided with a plurality of elastic elements, the elastic element farthest from the acoustic transducer 210 may be configured not to allow air to pass through. As illustrated in FIG. 29, the third elastic element 2923 may be configured not to allow air to pass through. Under the arrangement illustrated above, a closed space may be formed between the third elastic element 2923, the acoustic transducer 210, and the supporting member 223, which may better respond to vibration information. It should be noted that, in some embodiments, the elastic element farthest from the acoustic transducer 210 may be configured to allow air to pass through, merely by way of example, when a conductive housing is arranged on the outside of the sound inlet 2111, an accommodation space may be enclosed by the conductive housing and the acoustic transducer 210, and the air in the accommodation space may well reflect the vibration information.

In some embodiments, the vibration assembly 220 may further include the supporting member 223 configured to support the one or more groups of the elastic elements and the mass elements. The supporting member 223 may be physically connected to the acoustic transducer 210 (e.g., the substrate 211), and the one or more groups of the elastic elements and the mass elements may be connected to the supporting member 223. In some embodiments, the supporting member 223 may be connected with the elastic element(s) to achieve fixed support to control the distance between adjacent elastic elements, thereby ensuring the transmission effect of the vibration signal.

In some embodiments, the supporting member 223 may have a hollow tubular structure with openings at two ends, and a cross-section of the tubular structure may be in a shape of rectangular, triangular, circular, or another shape. In some embodiments, an area of the cross-section of the tubular structure may be the same everywhere, or may not be completely the same. For example, an end near the acoustic transducer 210 may have a greater area of the cross-section. In some embodiments, the one or more groups of the mass elements and the elastic elements in the vibration assembly 220 may be installed at an opening of the supporting member 223.

In some embodiments, the elastic element may be embedded on the inner wall of the supporting member 223 or embedded in the supporting member 223. In some embodiments, the elastic element may vibrate in the space inside the supporting member 223 and the elastic element may completely cover the opening of the supporting member 223. That is, the area of the elastic element may be greater than or equal to an opening area of the supporting member. Under the arrangement illustrated above, the air vibration (e.g., sound waves) in the external environment may pass through the elastic element as completely as possible, so that the vibration may be picked up by a sound pickup device 212, which may effectively improve the sound pickup quality.

In some embodiments, the supporting member 223 may be made of air-impermeable material, and the air-impermeable supporting member 223 may cause the vibration signal in the air so as to change the sound pressure (or the air vibration) in the supporting member 223 during a transmission process and transmit the vibration signal in the supporting member 223 to the acoustic transducer 210 through the sound inlet 2111, which may not escape outward through the supporting member 223 during the transmission process, thereby ensuring the sound pressure intensity and improving the sound transmission effect. In some embodiments, the supporting member 223 may include, but is not limited to, one or more of metal, alloy material (e.g., aluminum alloy, chrome-molybdenum steel, scandium alloy, magnesium alloy, titanium alloy, magnesium-lithium alloy, nickel alloy, etc.), hard plastic, foam, or the like.

In some embodiments, each group of the one or more groups of the elastic elements and the mass elements may correspond to a target frequency band in one or more different target frequency bands, so that the sensitivity of the vibration sensor 2900 in the corresponding target frequency band may be greater than the sensitivity of the acoustic transducer 210. In some embodiments, the sensitivity of the vibration sensor 2900 after adding the one or more groups of the mass elements and the elastic elements may be increased by 3 dB~30 dB compared with the acoustic transducer 210 in the target frequency band. It should be noted that, in some embodiments, the sensitivity of the vibration sensor 2900 after adding the one or more groups of the mass elements and the elastic elements may be improved by more than 30 dB compared with the acoustic transducer 210. For example, the plurality of groups of the mass elements and the elastic elements may have the same resonance peak.

In some embodiments, the resonance frequencies of the one or more groups of the mass elements and the elastic elements may be within a range of 1 kHz~10 kHz. In some embodiments, the resonance frequencies of the one or more groups of the mass elements and the elastic elements may be within a range of 1 kHz~5 kHz. In some embodiments, resonance frequencies of at least two groups of the plurality of groups of the mass elements and the elastic elements may be different. In some embodiments, a difference between two adjacent resonance frequencies in the resonance frequencies of the plurality of groups of the mass elements and the elastic elements may be less than 2 kHz. The two adjacent resonance frequencies refer to two resonance frequencies that are numerically adjacent in the magnitude of the resonance frequencies. Since the sensitivity of the vibration sensor 2900 corresponding to a frequency other than the resonance frequency is decreased rapidly, the vibration sensor 2900 may have a higher sensitivity in a wider frequency band while the sensitivity may not fluctuate greatly by controlling the difference between the resonance frequencies. In some embodiments, the difference between two adjacent resonance frequencies in the resonance frequencies of the plurality of groups of the mass elements and the elastic elements may be no more than 1.5 kHz. In some embodiments, the difference between two adjacent resonance frequencies in the resonance frequencies of the plurality of groups of the mass elements and the elastic elements may be no more than 1 kHz, such as 500 Hz, 700 Hz, 800 Hz, or the like. In some embodiments, the difference between two adjacent resonance frequencies in the resonance frequencies of the plurality of groups of the mass elements and the elastic elements may be no more than 500 Hz.

It should be noted that, in some embodiments, the plurality of groups of the elastic elements and the mass elements may have the same resonance frequency, so that the sensitivity in the target frequency band may be greatly improved. Merely by way of example, when the vibration sensor 2900 is mainly used to detect the mechanical vibration within a range of 5 kHz to 5.5 kHz, the resonance frequencies of the plurality of groups of the elastic elements and the mass elements may be configured as values within a detection range (e.g., 5.3 kHz), so that the vibration sensor 2900 may have higher sensitivity within the detection range compared with a condition that merely one group of the elastic elements and the mass elements is provided. It should be noted that a count of groups of the elastic elements and the mass elements illustrated in FIG. 29 is only for an illustration purpose, which does not limit the scope of the present disclosure. For example, the count of groups of the elastic elements and the mass elements may be one, two, four, or the like.

In some embodiments, as illustrated in FIG. 29, the vibration sensor 2900 may include the buffer member 240. The buffer member 240 may be used to reduce the impact force on the elastic element when the mass element vibrates. In some embodiments, the buffer member 240 may be arranged between a group of the mass element and the elastic element (the third mass element 2913 and the third elastic element 2923 in FIG. 29) farthest from the sound inlet 2111. The buffer member 240 may include the buffer connection layer. The upper surface and the lower surface of the buffer connection layer along the vibration direction of the vibration assembly 220 may be connected to the third elastic element 2923 and the third mass element 2913 respectively, and the third mass element 2913 may be fixed on the third elastic element 2923 through the buffer connection layer. In some embodiments, the buffer connection layer may include the flexible film layer. The third elastic element 2923 may be connected to the third mass element 2913 through the flexible film layer directly. In some embodiments, the buffer connection layer may include the elastic connection sheet 241 and the adhesive layer 242. The adhesive layer 242 may be wrapped outside the elastic connection sheet 241. The buffer member 240 may be connected between the third mass element 2913 and the third elastic element 2923 through the adhesive layer 242. In some embodiments, the buffer member 240 may also be arranged between any one or more groups of the mass elements and the elastic elements in the one or more groups of the mass elements and the elastic elements, such as arranged between the first mass element 2911 and the first elastic element 2921 or the second mass element 2912 and the second elastic element 2922. In some embodiments, the buffer member 240 may also be arranged between the mass element and the elastic element in each group of the vibration assembly 220 simultaneously. More details about the buffer connection layer may be found elsewhere in the present disclosure, such as FIG. 2 and the related descriptions thereof.

In some embodiments, as illustrated in FIG. 30, the buffer member 240 may include the buffer adhesive layer 240A. The buffer adhesive layer 240A may be arranged on a region of the elastic element corresponding to a region that is not covered by the mass element. In some embodiments, the buffer adhesive layer 240A and the mass element may be located on the same side of the elastic element. In some embodiments, the buffer adhesive layer 240A and the mass element may also be located on opposite sides of the elastic element. In some embodiments, the buffer adhesive layer 240A may also be located on two sides of the elastic element. In some embodiments, the buffer adhesive layer 240A may be arranged on a region of the elastic element (the third elastic element 2923 in FIG. 29) farthest from the sound inlet 2111 corresponding to a region that is not covered by the corresponding mass element (the third mass element 2913) in the same group. In some embodiments, the buffer adhesive layer 240A may also be arranged on a region of any elastic element in the one or more groups of the mass elements and the elastic elements corresponding to a region that is not covered by the corresponding mass element in the same group. In some embodiments, the buffer adhesive layer 240A may also be arranged on a region of each elastic element in the vibration assembly 220 corresponding to a region that is not covered by the corresponding mass element in the same group.

In some embodiments, when the elastic element of the vibration assembly 220 is the air-permeable membrane, the buffer adhesive layer 240A may also be configured as an air-permeable adhesive layer, so that the elastic element and the buffer adhesive layer 240A can be configured to allow air to pass through, the vibration signal can cause the vibration assembly 220 to generate vibration, and the vibration signal can further penetrate the air-permeable membrane and the air-permeable adhesive layer so as to be received by the acoustic transducer, thereby improving the sensitivity of the vibration sensor 2900.

In some embodiments, the buffer adhesive layer 240A may reduce the impact force on the elastic element when the mass element vibrates. In addition, by arranging the buffer adhesive layer 240A or not and setting parameters (e.g., the thickness) of the buffer adhesive layer 240A, the plasticity of the elastic element can be adjusted, thereby improving the performance of the vibration sensor 2900.

More details about the buffer adhesive layer may be found elsewhere in the present disclosure, such as FIG. 3 and the related descriptions thereof.

In some embodiments, as illustrated in FIG. 31, the buffer member 240 may include the first extension arm 243 and/or the second extension arm 244. In some embodiments, the first extension arm 243 and the second extension arm 244 may be arranged on the surface of the elastic element where the mass element is located. In some embodiments, the extension arm may be arranged on the surface of the elastic element farthest from the sound inlet 2111 among the one or more elastic elements where the mass element is located. In some embodiments, the extension arm may be arranged on the surface of any one of the one or more elastic elements where the mass element is located. In some embodiments, the extension arm may also be arranged on the surface of each of the one or more elastic elements where the mass element is located. Taking the extension arm arranged on the surface of the second elastic element 2922 where the second mass element 2912 is located as an example, an end of the first extension arm 243 may be connected to the second mass element 2912. In some embodiments, another end of the first extension arm 243 may be connected to the supporting member 223. The first extension arm 243 may be arranged in a spiral shape along the circumferential direction of the second elastic element 2922 from the second mass element 2912 to the edge of the second elastic element 2922. An end of the second extension arm 244 may be connected to the second mass element 2912. In some embodiments, another end of the second extension arm 244 may be connected to the supporting member 223. The second extension arm 244 may be arranged in a spiral shape along the circumferential direction of the second elastic element 2922 from the second mass element 2912 to the edge of the second elastic element 2922. In some embodiments, the connection position of the second extension arm 244 connected to the mass element 221 may be different from the connection position of the first extension arm 243 connected to the second mass element 2912. More details about the extension arm may be found elsewhere in the present disclosure, such as FIG. 4A and the related descriptions thereof.

In some embodiments, as illustrated in FIG. 32, the buffer member 240 may include the cantilever beam 240B. The cantilever beam 240B may be arranged on a side of the mass element. An end of the cantilever beam 240B may be connected to the supporting member 223, and another end of the cantilever beam 240B may be connected to the mass element. In some embodiments, the cantilever beam 240B may be arranged on a side of the mass element farthest from the sound inlet 2111 among the one or more mass elements. In some embodiments, the cantilever beam 240B may be arranged on a side of any one of the one or more mass elements. In some embodiments, the cantilever beam 240B may be arranged on a side of each of the one or more mass elements. More details about the cantilever beam may be found elsewhere in the present disclosure, such as FIG. 4B and the related descriptions thereof.

Figure 34:
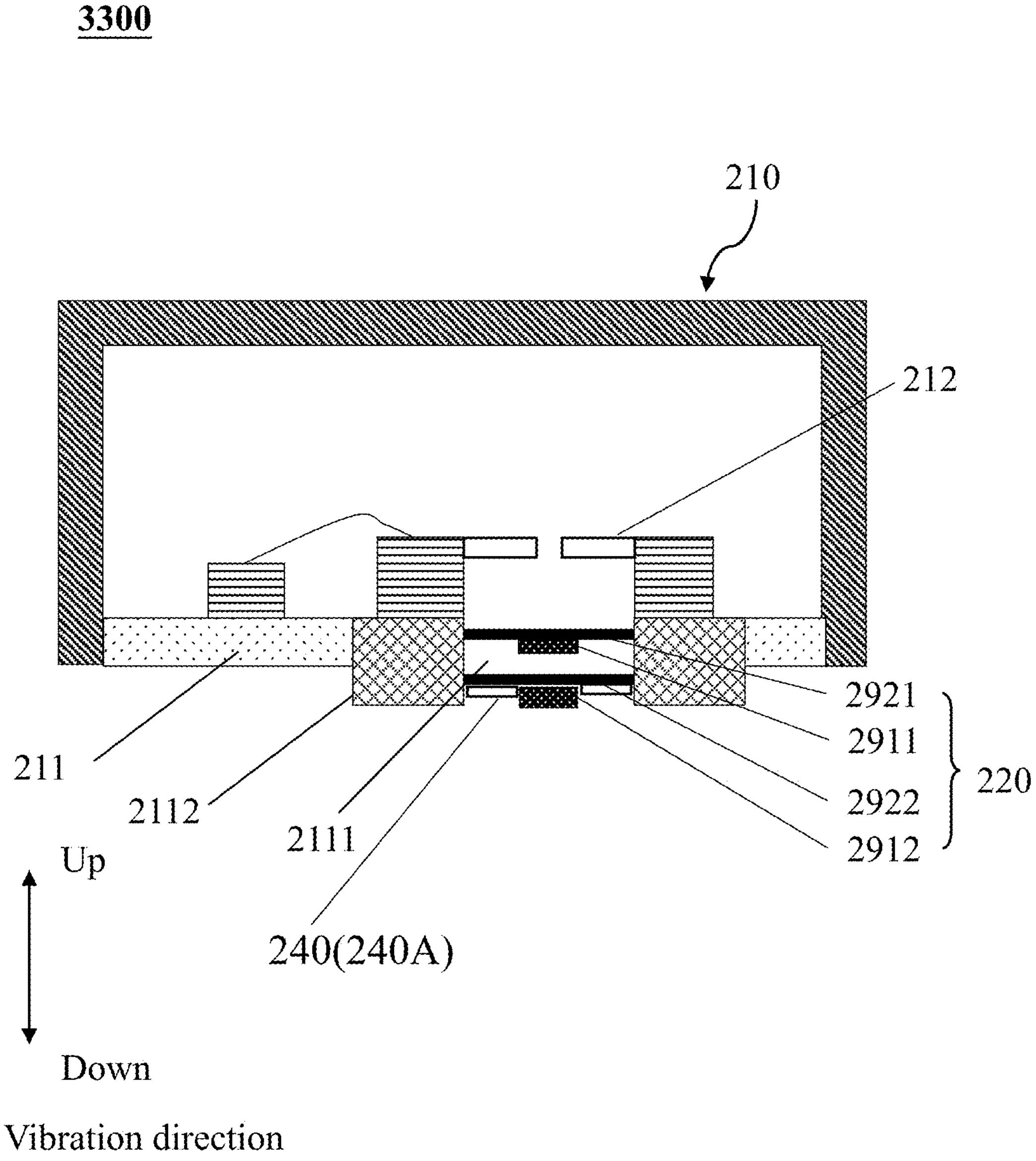
FIG. 34 is a schematic diagram illustrating an exemplary structure of a vibration sensor according to some embodiments of the present disclosure.
Figure 35:
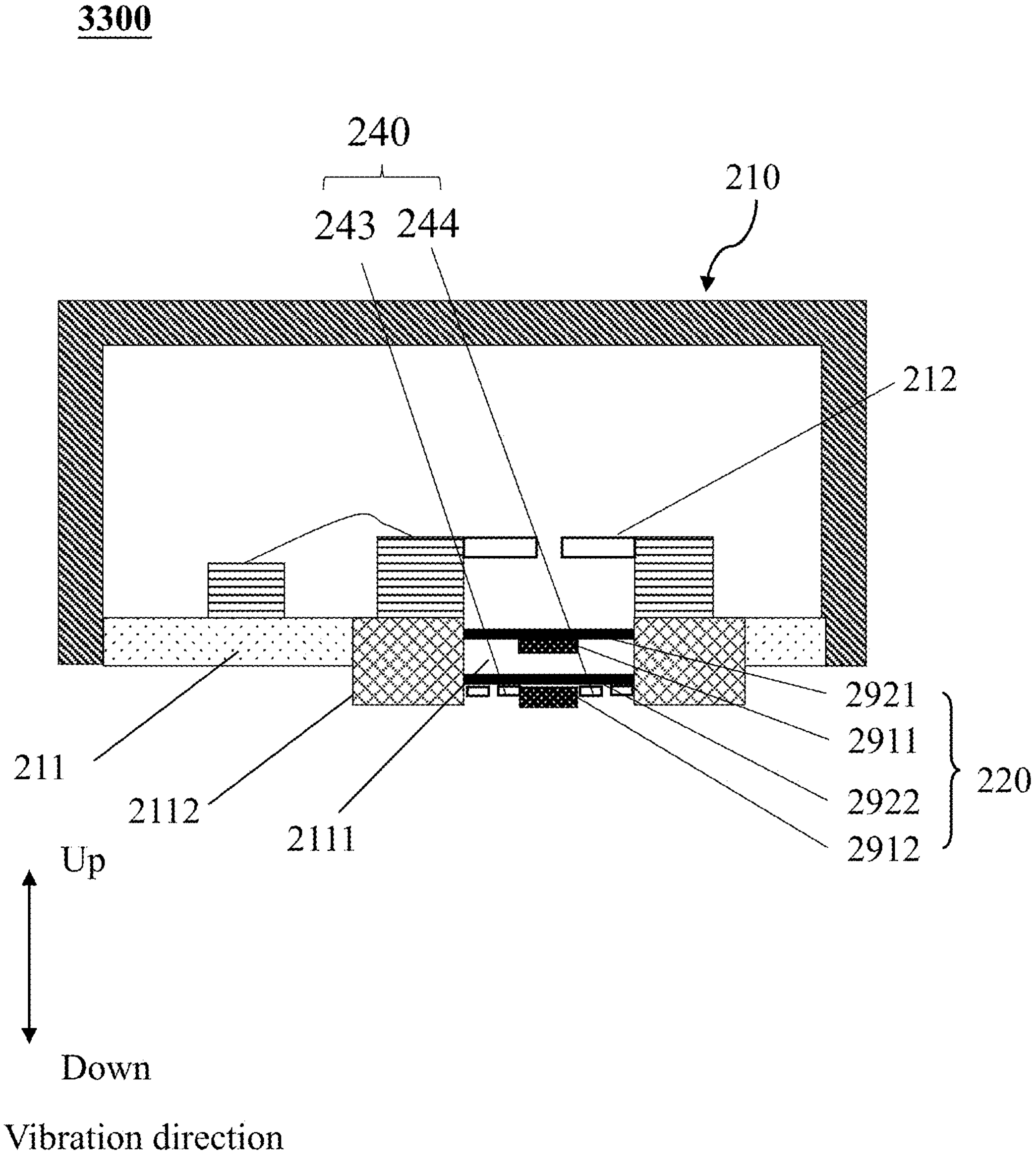
FIG. 35 is a schematic diagram illustrating an exemplary structure of a vibration sensor according to some embodiments of the present disclosure.
Figure 36:
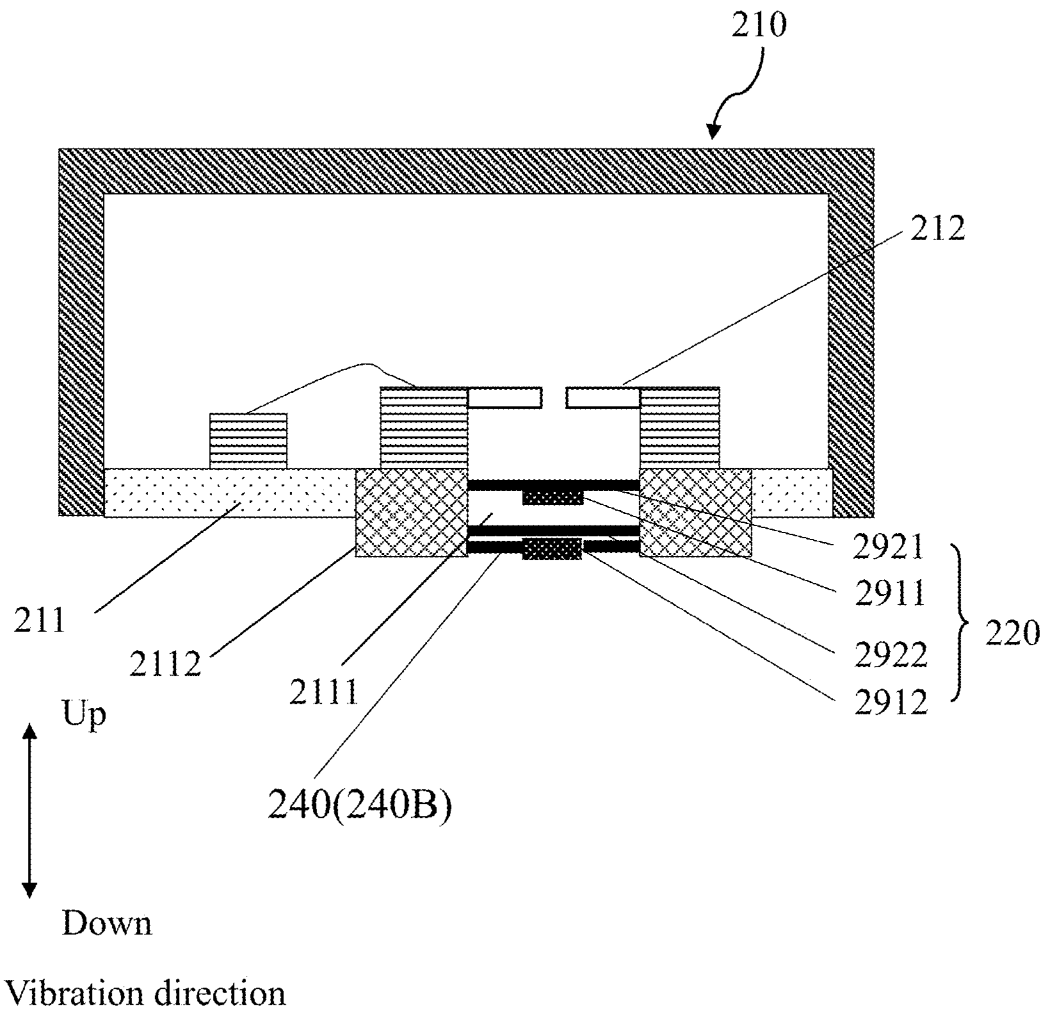
FIG. 36 is a schematic diagram illustrating an exemplary structure of a vibration sensor according to some embodiments of the present disclosure.

FIG. 33 is a schematic diagram illustrating an exemplary structure of a vibration sensor according to some embodiments of the present disclosure. FIG. 34 is a schematic diagram illustrating an exemplary structure of a vibration sensor according to some embodiments of the present disclosure. FIG. 35 is a schematic diagram illustrating an exemplary structure of a vibration sensor according to some embodiments of the present disclosure. FIG. 36 is a schematic diagram illustrating an exemplary structure of a vibration sensor according to some embodiments of the present disclosure.

A vibration sensor 3300 illustrated in FIGS. 33-36 is substantially the same as the vibration sensor 2900 illustrated in FIG. 29, except that the positions of the vibration assemblies are different. In some embodiments, the vibration assembly 220 of the vibration sensor 3300 may be arranged in the sound inlet 2111 parallel to a radial cross-section (i.e., perpendicular to the vibration direction of the vibration assembly 220) of the sound inlet 2111. The elastic element of the vibration assembly 220 may include the first elastic element 2921 and the second elastic element 2922 arranged in the sound inlet 2111 parallel to the radial cross-section of the sound inlet 2111, and the mass element may include the first mass element 2911 and the second mass element 2912 arranged in the sound inlet 2111 parallel to the radial cross-section of the sound inlet 2111. In some embodiments, the sound inlet 2111 may include a guiding tube 2112. The guiding tube 2112 may be made of air-impermeable material, and a function of the guiding tube 2112 may be similar to that of the supporting member 223 in the vibration sensor 2900. In some embodiments, to ensure the free vibration of the mass element, the mass element may not be in contact with the inner wall of the sound inlet 2111 or the guiding tube 2112. It should be noted that the arrangement of the guiding tube 2112 is merely a specific embodiment, which does not limit the scope of the present disclosure. For example, in some embodiments, the guiding tube 2112 may not be arranged, and one or more groups of elastic elements and mass elements may be connected to the sound inlet 2111 directly, or the supporting member may be arranged in the sound inlet 2111 to support the one or more groups of the elastic elements and the mass elements.

In some embodiments, the first mass element 2911 and the second mass element 2912 may generate resonance simultaneously in response to the vibration of the external environment. The resonance generated by the first elastic element 2921 and the second elastic element 2922 and the resonance generated by the first mass element 2911 and the second mass element 2912 in communication with the external vibration signal may be transmitted to the acoustic transducer 210 through the guiding tube 2112 and be converted into an electrical signal, thereby realizing the process of converting a strengthened vibration signal in one or more target frequency bands into the electrical signal. It should be noted that the count of groups of the elastic elements and the mass elements illustrated in FIG. 37 being two is merely for illustration purpose and does not limit the scope of the present disclosure. For example, the count of groups of the elastic elements and the mass elements may be one, three, or the like.

In some embodiments, as illustrated in FIG. 33, the structural arrangement of the buffer member 240 is substantially the same as that illustrated in FIG. 29. The buffer member 240 may include the buffer connection layer and the buffer connection layer may be used to reduce the impact force on the elastic element when the mass element vibrates. In some embodiments, the buffer connection layer may be arranged between one group of the mass elements and the elastic elements (the second mass element 2912 and the second elastic element 2922 in FIG. 33) that is farthest from the sound pickup device 212. In some embodiments, the buffer connection layer may also be arranged between any one or more groups of the mass elements and the elastic elements among the one or more groups of the mass elements and the elastic elements. In some embodiments, the buffer connection layer may also be arranged between each group of the mass elements and the elastic elements of the vibration assembly 220. More details about the buffer connection layer may be found elsewhere in the present disclosure, such as FIG. 29 and the related descriptions thereof.

In some embodiments, as illustrated in FIG. 34, the structural arrangement of the buffer member 240 is substantially the same as that illustrated in FIG. 30. The buffer member 240 may include the buffer adhesive layer 240A. The buffer adhesive layer 240A may be arranged on a region of the elastic element corresponding to a region that is not covered by the mass element. More details about the buffer adhesive layer 240A may be found elsewhere in the present disclosure, such as FIG. 30 and the related descriptions thereof.

In some embodiments, as illustrated in FIG. 35, the structural arrangement of the buffer member 240 is substantially the same as that illustrated in FIG. 31. The buffer member 240 may include the first extension arm 243 and/or the second extension arm 244. In some embodiments, the first extension arm 243 and the second extension arm 244 may be arranged on the surface of the elastic element where the mass element is located. In some embodiments, the extension arm may be arranged on the surface of the elastic element farthest from the sound pickup device 212 among the one or more elastic elements where the mass element is located. In some embodiments, the extension arm may be arranged on the surface of any one of the one or more elastic elements where the mass element is located. In some embodiments, the extension arm may also be arranged on the surface of each of the one or more elastic elements where the mass element is located. Taking the extension arm arranged on the surface of the second elastic element 2922 where the second mass element 2912 is located as an example, an end of the first extension arm 243 may be connected to the second mass element 2912. In some embodiments, another end of the first extension arm 243 may be connected to the guiding tube 2112. The first extension arm 243 may be arranged in a spiral shape along the circumferential direction of the second elastic element 2922 from the second mass element 2912 to the edge of the second elastic element 2922. An end of the second extension arm 244 may be connected to the second mass element 2912. In some embodiments, another end of the second extension arm 244 may be connected to the guiding tube 2112. The second extension arm 244 may be arranged in a spiral shape along the circumferential direction of the second elastic element 2922 from the second mass element 2912 to the edge of the second elastic element 2922. In some embodiments, the connection position of the second extension arm 244 connected to the mass element 221 may be different from the connection position of the first extension arm 243 connected to the second mass element 2912. More details about the first extension arm 243 and/or the second extension arm 244 may be found elsewhere in the present disclosure, such as FIG. 31 and the related descriptions thereof.

In some embodiments, as illustrated in FIG. 36, the structural arrangement of the buffer member 240 is substantially the same as that illustrated in FIG. 32. The buffer member 240 may include the cantilever beam 240B. The cantilever beam 240B may be located on a side of the mass element. An end of the cantilever beam 240B may be connected to the guiding tube 2112, and another end of the cantilever beam 240B may be connected to the mass element. A gap may be formed between the cantilever beam 240B and the corresponding elastic element, so that the cantilever beam 240B may not interfere with the vibration of the elastic element, thereby avoiding the influence on the mechanical property of the elastic element. More details about the cantilever beam 240B may be found elsewhere in the present disclosure, such as FIG. 32 and the related descriptions thereof.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure, or characteristic related to at least one embodiment of the present disclosure. Therefore, it should be emphasized and noted that two or more references to "an embodiment" or "an alternative embodiment" in different places in this specification do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or circumstances, including any new and useful process, machine, product, or combination of substances, or any combination of them Any new and useful improvements. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component" or "system". In addition, aspects of the present disclosure may appear as a computer product located in one or more computer-readable media, the product including computer-readable program code.

A computer storage medium may contain a propagated data signal embodying a computer program code, for example, in a baseband or as part of a carrier wave. The propagated signal may have various manifestations, including electromagnetic form, optical form, etc., or a suitable combination. The computer storage medium may be any computer-readable medium other than the computer-readable storage medium, and the medium may be connected to an instruction to execute a device, device, or device to communicate, spread, or transmit a program for use. The program coding located on the computer storage medium can be transmitted through any appropriate media, including radio, cables, fiber cables, RF, or similar media, or any of the above-mentioned media combinations.

The computer program code required for the operation of the various parts of this application may be written in any one or more programming languages, including object-oriented programming languages such as Java, Scala, Smalltalk, Eiffel, JADE, Emerald, C++, C#, VB.NET, Python, etc., conventional procedural programming languages such as C language, Visual Basic, Fortran 2003, Perl, COBOL 2002, PHP, ABAP, dynamic programming languages such as Python, Ruby, Groovy, or other programming languages, etc. The program code may be run entirely on the user's computer or as an independent software package on the user's computer, or partly on the user's computer and partly on a remote computer, or entirely on the remote computer or server. In the latter case, the remote computer may be connected to the user's computer through any network form, such as a local area network (LAN) or a wide area network (WAN), or to an external computer (for example, via the Internet), or in a cloud computing environment, or as a service such as a Software as a Service (SaaS).

Moreover, unless otherwise stated in the claims, the order of the processing elements and sequences of the present disclosure, the use of digital letters, or other names are not intended to limit the order of the disclosure processes and methods. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the number of components and attributes are used, and it should be understood that such numbers used in the present disclosure of the embodiments, in some examples, use the modifiers "about," "approximately," or "substantially." Unless otherwise stated, the "about," "approximately," or "substantially" indicates that the stated number allows for a variation of ±20%. Accordingly, in some embodiments, the numerical parameters used in the present disclosure and claims are approximations that can vary depending upon the desired features of individual embodiments. In some embodiments, the numerical parameters should take into account the specified significant digits and use a general digit retention method. Notwithstanding that the numerical ranges and parameters setting forth the broad scope of some embodiments of the application are approximations, the numerical values set forth in the specific embodiments are reported as precisely as practicable.

The entire contents of each patent, patent application, patent application publication, and other material, such as article, book, specification, publication, document, etc., cited in the present disclosure are hereby incorporated by reference into the present disclosure. Application history documents that are inconsistent with or conflict with the content of the present disclosure are excluded, as are documents (currently or hereafter appended to the present disclosure) that limit the broadest scope of the claims of the present disclosure. It should be noted that if there is any inconsistency or conflict between the descriptions, definitions, and/or terms used in the accompanying materials of the present disclosure and the contents thereof, the descriptions, definitions, and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A vibration sensor, comprising:

a vibration assembly including a mass element and an elastic element, the mass element being connected to the elastic element;

a first acoustic chamber, wherein the elastic element constitutes one of sidewalls of the first acoustic chamber, and in response to an external vibration signal, the vibration assembly vibrates such that a volume of the first acoustic chamber changes;

an acoustic transducer being in communication with the first acoustic chamber, wherein in response to a volume change of the first acoustic chamber, the acoustic transducer generates an electrical signal; and a buffer member being connected to the mass element or the elastic element, the buffer member reducing an impact force of the mass element acting on the elastic element during a vibration process of the vibration assembly, wherein the acoustic transducer has a first resonance frequency, the vibration assembly has a second resonance frequency, and the second resonance frequency is less than the first resonance frequency;

wherein the vibration assembly includes a plurality of groups of diaphragms and mass blocks, and for each group of the plurality of groups of diaphragms and mass blocks, a mass block is physically connected to a diaphragm, the plurality of groups of diaphragms and mass blocks are arranged at intervals along a vibration direction of the diaphragm.

2. The vibration sensor of claim 1, wherein the buffer member includes a buffer connection layer, the buffer connection layer is arranged between the mass element and the elastic element, and the mass element is fixed on the elastic element through the buffer member.

3. The vibration sensor of claim 1, wherein the vibration sensor includes a housing, and the housing receives the external vibration signal and transmits the external vibration signal to the vibration assembly, wherein the housing forms an acoustic chamber, the vibration assembly is located within the acoustic chamber and divides the acoustic chamber into the first acoustic chamber and a second acoustic chamber;

the vibration assembly further includes a supporting member arranged along a circumferential direction of the elastic element, an end of the supporting member is connected to the elastic element, and another end of the supporting member is connected to the housing or the acoustic transducer.

4. The vibration sensor of claim 3, wherein the buffer member includes a first extension arm, the first extension arm is arranged on a surface of the elastic element where the mass element is arranged, and the first extension arm and the mass element are located at an inner side of the supporting member, and an end of the first extension arm is connected to the mass element, and the first extension arm is arranged in a spiral shape along the circumferential direction of the elastic element from the mass element to an edge of the elastic element.

5. The vibration sensor of claim 4, wherein the buffer member further includes a second extension arm, the second extension arm is arranged on the surface of the elastic element where the mass element is arranged, and the second extension arm is located at the inner side of the supporting member, and an end of the second extension arm is connected to the mass element, and the second extension arm is arranged in a spiral shape along the circumferential direction of the elastic element from the mass element to the edge of the elastic element.

6. The vibration sensor of claim 3, wherein the buffer member includes a cantilever beam, an end of the cantilever beam is connected to the supporting member, and another end of the cantilever beam is connected to the mass element.

7. The vibration sensor of claim 6, wherein a thickness of the cantilever beam along the vibration direction of the vibration assembly is less than a thickness of the mass element along the vibration direction of the vibration assembly.

8. The vibration sensor of claim 6, wherein a gap exists between the cantilever beam and the mass element.

9. The vibration sensor of claim 1, wherein the vibration assembly includes a plurality of mass elements, the plurality of mass elements are connected to the elastic element, a count of the plurality of mass elements is greater than or equal to 3, and the plurality of mass elements are in a non-collinear arrangement.

10. The vibration sensor of claim 1, wherein at least two groups of the plurality of groups of diaphragms and mass blocks have different resonance frequencies.

11. The vibration sensor of claim 1, wherein the elastic element is arranged opposite to the acoustic transducer, a side of the elastic element facing the first acoustic chamber is arranged with a convex structure, the elastic element drives the convex structure to move in response to the external vibration signal, and the movement of the convex structure changes the volume of the first acoustic chamber.

12. The vibration sensor of claim 11, wherein the convex structure abuts against a sidewall of the first acoustic chamber opposite to the elastic element.

13. The vibration sensor of claim 12, wherein the convex structure has elasticity, in response to the movement of the convex structure, the convex structure generates an elastic deformation, and the elastic deformation changes the volume of the first acoustic chamber.

14. The vibration sensor of claim 1, wherein the vibration assembly further includes a supporting member, the mass element and the supporting member are physically connected to two sides of the elastic element respectively, the supporting member is physically connected to the acoustic transducer, and the supporting member, the elastic element, and the acoustic transducer form the first acoustic chamber.

15. The vibration sensor of claim 14, wherein an area of a cross-section of the mass element perpendicular to the vibration direction of the vibration assembly is greater than an area of a cross-section of the first acoustic chamber perpendicular to the vibration direction of the vibration assembly, an area of a cross-section of the elastic element perpendicular to the vibration direction of the vibration assembly is greater than the area of the cross-section of the first acoustic chamber perpendicular to the vibration direction of the vibration assembly, and the mass element is configured to cause a compression deformation of a region where the elastic element contacts with the supporting member in response to the external vibration signal, and the elastic element vibrates to change the volume of the first acoustic chamber.

16. The vibration sensor of claim 15, wherein the supporting member includes a ring structure, the area of the cross-section of the mass element perpendicular to the vibration direction of the vibration assembly is greater than or equal to an area of a cross-section of an outer ring of the ring structure perpendicular to the vibration direction of the vibration assembly, and the area of the cross-section of the elastic element perpendicular to the vibration direction of the vibration assembly is greater than or equal to the area of the cross-section of the outer ring of the ring structure perpendicular to the vibration direction of the vibration assembly.

17. The vibration sensor of claim 16, wherein the area of the cross-section of the mass element perpendicular to the vibration direction of the vibration assembly is equal to the area of the cross-section of the elastic element perpendicular to the vibration direction of the vibration assembly.

18. The vibration sensor of claim 1, wherein each group of the plurality of groups of diaphragms and mass blocks correspond to a target frequency band in one or more different target frequency bands, and a sensitivity of the vibration sensor in a corresponding target frequency band is greater than a sensitivity of the acoustic transducer.

19. The vibration sensor of claim 1, wherein the mass element in each group of diaphragms and mass blocks includes a plurality of mass elements, and the plurality of mass elements are arranged on two sides of the elastic element, respectively.

20. The vibration sensor of claim 1, wherein in the plurality of groups of diaphragms and mass blocks, the diaphragm farthest from the acoustic transducer is configured not to allow air to pass through.

* * * * *